(12) United States Patent
Hasegawa et al.

(10) Patent No.: US 11,327,357 B2
(45) Date of Patent: May 10, 2022

(54) LIQUID CRYSTAL DISPLAY DEVICE

(71) Applicant: SHARP KABUSHIKI KAISHA, Sakai (JP)

(72) Inventors: Masahiro Hasegawa, Sakai (JP); Akira Sakai, Sakai (JP); Takako Koide, Sakai (JP); Yuichi Kawahira, Sakai (JP); Koji Murata, Sakai (JP); Kiyoshi Minoura, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/213,113

(22) Filed: Mar. 25, 2021

(65) Prior Publication Data
US 2021/0215968 A1    Jul. 15, 2021

Related U.S. Application Data

(62) Division of application No. 16/584,519, filed on Sep. 26, 2019, now Pat. No. 10,989,954.
(Continued)

(51) Int. Cl.
*G02F 1/1335*    (2006.01)
*G02F 1/13363*   (2006.01)

(52) U.S. Cl.
CPC .... *G02F 1/133528* (2013.01); *G02F 1/13363* (2013.01); *G02F 1/133634* (2013.01); *G02F 1/133531* (2021.01)

(58) Field of Classification Search
CPC .......... G02F 1/133528; G02F 1/13363; G02F 1/133634; G02F 1/133531
See application file for complete search history.

(56) References Cited

U.S. PATENT DOCUMENTS

2006/0055845 A1   3/2006   Hisatake
2008/0074595 A1*  3/2008   Nakatsugawa ..... G02F 1/13363
                                                    349/117
(Continued)

FOREIGN PATENT DOCUMENTS

CN      1826552 A       8/2006
JP      2009-192611 A   8/2009
(Continued)

OTHER PUBLICATIONS

Restriction/Election Requirement of U.S. Appl. No. 16/584,519 dated Sep. 29, 2020.
(Continued)

*Primary Examiner* — Nathanael R Briggs
(74) *Attorney, Agent, or Firm* — ScienBiziP, P.C.

(57) ABSTRACT

A liquid crystal display device of the present invention includes in the following order from a viewing surface side a first polarizer, a first positive A plate having an in-plane retardation of 120 nm or greater and 155 nm or smaller, a positive C plate having a thickness retardation of 80 nm or greater and 100 nm or smaller, a first substrate, a second positive A plate having an in-plane retardation of 120 nm or greater and 155 nm or smaller, a horizontally aligned liquid crystal layer, a second substrate, a viewing angle compensation layer, and a second polarizer. The device further includes between the first polarizer and the first positive A plate a positive C plate having a thickness retardation of 30 nm or greater and 80 nm or smaller.

6 Claims, 40 Drawing Sheets

Related U.S. Application Data

(60) Provisional application No. 62/739,114, filed on Sep. 28, 2018.

(56) References Cited

U.S. PATENT DOCUMENTS

2009/0257012 A1* 10/2009 Sabae .................. G02B 5/3033
   349/118
2012/0026421 A1* 2/2012 Park ....................... C09K 19/02
   349/43

FOREIGN PATENT DOCUMENTS

| | | |
|---|---|---|
| JP | 2009-251442 A | 10/2009 |
| JP | 2009-251443 A | 10/2009 |

OTHER PUBLICATIONS

Notice of Allowance of U.S. Appl. No. 16/584,519 dated Dec. 30, 2020.

* cited by examiner

Transmittance contour

Transmittance contour

Transmittance contour

Transmittance contour

Transmittance contour

Transmittance contour

Transmittance contour

Transmittance contour

Transmittance contour

Transmittance contour

Transmittance contour

Transmittance contour

Transmittance contour

Transmittance contour

Transmittance contour

Transmittance contour

Transmittance contour

Transmittance contour

Transmittance contour

Transmittance contour

Transmittance contour

Transmittance contour

LIQUID CRYSTAL DISPLAY DEVICE

CROSS-REFERENCE TO RELATED APPLICATIONS

The present application is a divisional application of U.S. patent application Ser. No. 16/584,519 filed on Sep. 26, 2019, which claims priority under 35 U.S.C. § 119 to U.S. Provisional Application No. 62/739,114 filed on Sep. 28, 2018, the contents of which are incorporated herein by reference in their entirety.

BACKGROUND OF THE INVENTION

Field of the Invention

The present invention relates to liquid crystal display devices. The present invention specifically relates to a liquid crystal display device including a horizontally aligned liquid crystal layer.

Description of Related Art

Liquid crystal display devices use a liquid crystal composition for display. According to a typical display mode, voltage is applied to a liquid crystal composition sealed between a pair of substrates to change the alignment of liquid crystal molecules in the liquid crystal composition according to the applied voltage, whereby the amount of light transmitted is controlled. Such liquid crystal display devices have advantageous features such as thin profile, lightweight, and low power consumption, and are thus used in a wide range of fields.

As a technique related to liquid crystal display devices, JP 2009-251443 A discloses a liquid crystal display device including a laminated optical film that includes a polarizer; a first optical compensation layer which has a refractive index ellipsoid showing a relationship of nx>ny>nz; and a second optical compensation layer which has a refractive index ellipsoid showing a relationship of nz>nx>ny, wherein the polarizer and the first optical compensation layer are placed so that an absorption axis of the polarizer is parallel to or perpendicular to a slow axis of the first optical compensation layer, and the polarizer and the second optical compensation layer are placed so that an absorption axis of the polarizer is parallel to or perpendicular to a slow axis of the second optical compensation layer.

JP 2009-251442 A discloses a liquid crystal display device including a laminated optical film that includes a polarizer; a first optical compensation layer which has a refractive index ellipsoid showing a relationship of nx>ny=nz; and a second optical compensation layer which has a refractive index ellipsoid showing a relationship of nz>nx>ny, wherein the polarizer and the first optical compensation layer are placed so that an absorption axis of the polarizer is parallel to or perpendicular to a slow axis of the first optical compensation layer, and the polarizer and the second optical compensation layer are placed so that an absorption axis of the polarizer is parallel to or perpendicular to a slow axis of the second optical compensation layer.

JP 2009-192611 A discloses a liquid crystal display device including a laminated optical film that includes a polarizer; a first optical compensation layer which has a refractive index ellipsoid showing a relationship of nz nx>ny; and a second optical compensation layer which has a refractive index ellipsoid showing a relationship of nx=ny>nz in the stated order, wherein the polarizer and the first optical compensation layer are placed so that an absorption axis of the polarizer is parallel to a slow axis of the first optical compensation layer.

BRIEF SUMMARY OF THE INVENTION

A horizontal alignment mode, which controls the alignment of liquid crystal molecules by rotating the liquid crystal molecules mainly in a plane parallel to the substrate surface, is drawing attention as a display mode of liquid crystal display devices because it can easily provide wide viewing angle characteristics. For example, many recent liquid crystal display devices such as smartphones and tablet personal computers use a horizontal alignment mode such as an in-plane switching (IPS) mode or a fringe field switching (FFS) mode.

Such a horizontal alignment mode liquid crystal display device includes, in the following order from the viewing surface side, a first polarizer, a first substrate provided with a color filter (CF) layer, a horizontally aligned liquid crystal layer (hereinafter, also simply referred to as a liquid crystal layer), pixel electrodes, a second substrate provided with a common electrode and thin film transistors (TFTs), and a second polarizer.

In order to reduce reflection of external light, the horizontal alignment mode liquid crystal display device may further include between the first polarizer and the first substrate an out-cell retardation layer including a positive A plate and a positive C plate, which are both $\lambda/4$ plates, thereby providing a circularly polarizing plate consisting of the first polarizer and the out-cell retardation layer. The horizontal alignment mode liquid crystal display device unfortunately fails to switch between on and off when circularly polarized light is incident on the liquid crystal layer. Accordingly, an in-cell retardation layer that is a $\lambda/4$ plate needs to be disposed on the liquid crystal layer side of the first substrate to convert the circularly polarized light into linearly polarized light again before being incident on the liquid crystal layer. In order to achieve this structure, the in-cell retardation layer and the out-cell retardation layer need to be arranged with their slow axes perpendicular to each other to cancel out the each other's retardations.

The in-cell retardation layer is, for example, a positive A plate whose three principal refractive indices nx, ny, and nz satisfy the relation: nx>ny=nz. The positive A plate is preferably a film obtained by curing polymerizable liquid crystal with ultraviolet (UV) rays because such a film can be a thin film. In the above formula, "nx" represents the refractive index in the direction at which the in-plane refractive index is maximum (i.e., slow axis direction), "ny" represents the refractive index in the direction perpendicular to the slow axis in a plane, and "nz" represents the refractive index in the thickness direction. The refractive indices herein each indicate the value to light with a wavelength of 550 nm at 23° C., unless otherwise stated.

In order to cancel the retardation of the in-cell retardation layer that is a positive A plate, a negative A plate, whose three principal refractive indices nx, ny, and nz satisfy the relation nx=nz>ny, is preferred to be used as the out-cell retardation layer. The negative A plate can cancel the retardation of the positive A plate at all the azimuths.

Unfortunately, materials for the negative A plate tend to be torn, i.e., are fragile. In order to overcome this fragileness, the present inventors used as an out-cell retardation layer a laminate including a positive C plate, whose three principal refractive indices nx, ny, and nz satisfy the relation:

nx=ny<nz, and a positive A plate, so that the out-cell retardation layer worked as a negative A plate in appearance.

Differently from the negative A plate, the laminate including a positive A plate and a positive C plate unfortunately fails to completely cancel the retardation of the in-cell retardation layer that is a positive A plate at almost all the azimuths. This incompleteness causes light leakage when viewed from oblique directions in the black display state to reduce the contrast ratio (CR) viewing angle in the black display state in a horizontally aligned liquid crystal display device including the in-cell retardation layer that is a positive A plate and the out-cell retardation layer that is a laminate including a positive A plate and a positive C plate. The following gives specific description of this with reference to simulation results.

FIG. 35 is a schematic cross-sectional view of a liquid crystal display device of Comparative Embodiment 1. FIG. 36 is a schematic cross-sectional view of a liquid crystal display device of Comparative Embodiment 2.

As shown in FIG. 35, a liquid crystal display device 1R of Comparative Embodiment 1 includes, in the following order from the viewing surface side, a first polarizer 1P, a viewing angle compensation layer 30, a first substrate including a CF layer (not shown), a horizontally aligned liquid crystal layer 1L, pixel electrodes, a second substrate including a common electrode and TFTs (not shown), and a second polarizer 2P. The viewing angle compensation layer 30 is a first laminate 31 including, in the following order from the first polarizer 1P side, a positive A plate 31A and a positive C plate 31C. The liquid crystal display device 1R of Comparative Embodiment 1 is a horizontal alignment mode liquid crystal display device including the viewing angle compensation layer 30. In the schematic cross-sectional views, the "+A-Plate" means a positive A plate, the "+C-Plate" means a positive C plate, the "FFS-LC" means a FFS mode liquid crystal layer that is a horizontally aligned liquid crystal layer, the angles of the first and second polarizers indicate the azimuth angles of their absorption axes, the angle of the liquid crystal layer indicates the alignment azimuth (slow axis) of liquid crystal molecules in the black display state, and the angles of the other layers indicate the azimuth angles of their slow axes.

As shown in FIG. 36, a liquid crystal display device 1R of Comparative Embodiment 2 has the same structure as the liquid crystal display device 1R of Comparative Embodiment 1 except that the device includes an out-cell retardation layer 21 between the viewing angle compensation layer 30 and the first substrate and an in-cell retardation layer 22 between the first substrate and the horizontally aligned liquid crystal layer 1L. The out-cell retardation layer 21 is a laminate including, in the following order from the first polarizer 1P side, a first positive A plate 1A and a positive C plate 1C. The in-cell retardation layer 22 is a second positive A plate 2A.

In each of Comparative Embodiments 1 and 2, the second substrate in the liquid crystal display device 1R has pixel electrodes with slits on the common electrode that has a sheet shape. In Comparative Embodiments 1 and 2, the liquid crystal display device 1R generates a fringe electric field between the pixel electrodes and the common electrode with voltage applied, whereby liquid crystal molecules in the liquid crystal layer 1L rotate. The voltage applied between the pixel electrodes and the common electrode is controlled to change the retardation of the liquid crystal layer 1L, whereby light is controlled to be transmitted or not.

In Comparative Embodiments 1 and 2, the liquid crystal display device 1R is a FFS mode liquid crystal display device.

In each of the liquid crystal display device 1R of Comparative Embodiment 1 and the liquid crystal display device 1R of Comparative Embodiment 2, the transmittance viewing angle in the black display state with light having a wavelength of 550 nm was simulated at all the azimuths within the range of the polar angle of 0° to 80°, using a LCD-Master available from Shintec Co., Ltd.

FIG. 37 is a simulation result of the transmittance viewing angle in the black display state of the liquid crystal display device of Comparative Embodiment 1. FIG. 38 is a simulation result of the transmittance viewing angle in the black display state of the liquid crystal display device of Comparative Embodiment 2. FIG. 37 and FIG. 38 show that light leakage when viewed from oblique directions in the black display state is more observed and the CR viewing angle in the black display state is smaller in the liquid crystal display device 1R of Comparative Embodiment 2, which includes the out-cell retardation layer 21 and the in-cell retardation layer 22, than in the liquid crystal display device 1R of Comparative Embodiment 1, which does not include the out-cell retardation layer 21 and the in-cell retardation layer 22. In other words, differently from a negative A plate, the out-cell retardation layer 21 that is a laminate including a positive A plate and a positive C plate fails to completely cancel the retardation of the in-cell retardation layer 22 that is a positive A plate at all the azimuths. This incompleteness causes light leakage when viewed from oblique directions in the black display state to reduce the CR viewing angle in the black display state in a horizontally aligned liquid crystal display device that includes the in-cell retardation layer that is a positive A plate and the out-cell retardation layer that is a laminate including a positive A plate and a positive C plate.

JP 2009-251443 A, JP 2009-251442 A, and JP 2009-A disclose techniques related to liquid crystal display devices including a vertically aligned liquid crystal layer but fail to disclose techniques related to liquid crystal display devices including a horizontally aligned liquid crystal layer. The present inventors studied a case where the vertically aligned liquid crystal layer in the liquid crystal display device of JP 2009-251443 A, JP 2009-251442 A, or JP 2009-192611 A was replaced by a horizontally aligned liquid crystal layer. When the vertically aligned liquid crystal layer in JP 2009-251443 A, JP 2009-251442 A, or JP 2009-192611 A is replaced by a horizontally aligned liquid crystal layer, positive A plates are disposed to sandwich the horizontally aligned liquid crystal layer and circularly polarized light is incident on the horizontally aligned liquid crystal layer. Such a display device cannot switch between on and off even when circularly polarized light is incident on the horizontally aligned liquid crystal layer. The study thus revealed that the liquid crystal display device, in which the vertically aligned liquid crystal layer in JP 2009-251443 A, JP 2009-251442 A, or JP 2009-192611 A is replaced by a horizontally aligned liquid crystal layer, cannot provide monochrome display.

The present invention has been made under the current situation in the art and aims to provide a liquid crystal display device capable of reducing reflection of external light and suppressing light leakage when viewed from oblique directions in the black display state.

(1) Another embodiment of the present invention is a liquid crystal display device including in the following order from a viewing surface side: a first polarizer; a first positive A plate having an in-plane retardation of 120 nm or greater and 155 nm or smaller; a positive C plate having a thickness retardation of 80 nm or greater and 100 nm or smaller; a first substrate; a second positive A plate having an in-plane retardation of 120 nm or greater and 155 nm or smaller; a horizontally aligned liquid crystal layer; a second substrate; a viewing angle compensation layer; and a second polarizer, the liquid crystal display device further including between the first polarizer and the first positive A plate a positive C plate having a thickness retardation of 30 nm or greater and 80 nm or smaller.

(2) In an embodiment of the present invention, the liquid crystal display device includes the structure (1), and the viewing angle compensation layer is a laminate including in the following order from a second polarizer side a positive A plate having an in-plane retardation of 130 nm or greater and 150 nm or smaller and a positive C plate having a thickness retardation of 80 nm or greater and 100 nm or smaller.

(3) In an embodiment of the present invention, the liquid crystal display device includes the structure (1), and the viewing angle compensation layer is a laminate including in the following order from a second polarizer side a biaxial retardation layer having an in-plane retardation of 80 nm or greater and 100 nm or smaller and an NZ coefficient of 1.3 or greater and 1.5 or smaller and a biaxial retardation layer having an in-plane retardation of 50 nm or greater and 70 nm or smaller and an NZ coefficient of −1.2 or greater and −0.8 or smaller.

(4) In an embodiment of the present invention, the liquid crystal display device includes the structure (1), and the viewing angle compensation layer is a laminate including in the following order from a second polarizer side a biaxial retardation layer having an in-plane retardation of 100 nm or greater and 130 nm or smaller and an NZ coefficient of 1.1 or greater and 1.3 or smaller and a biaxial retardation layer having an in-plane retardation of 10 nm or greater and 30 nm or smaller and an NZ coefficient of −4.5 or greater and −3.5 or smaller.

(5) In an embodiment of the present invention, the liquid crystal display device includes the structure (1), and the viewing angle compensation layer is a λ/2 plate having an in-plane retardation of 230 nm or greater and 320 nm or smaller and an NZ coefficient of 0.4 or greater and 0.6 or smaller.

(6) Another embodiment of the present invention is a liquid crystal display device including in the following order from a viewing surface side: a first polarizer; a viewing angle compensation layer; a first positive A plate having an in-plane retardation of 120 nm or greater and 155 nm or smaller; a positive C plate having a thickness retardation of 80 nm or greater and 100 nm or smaller; a first substrate; a second positive A plate having an in-plane retardation of 120 nm or greater and 155 nm or smaller; a horizontally aligned liquid crystal layer; a second substrate; and a second polarizer, the liquid crystal display device further including between the viewing angle compensation layer and the first positive A plate a positive C plate having a thickness retardation of 30 nm or greater and 80 nm or smaller.

(7) In an embodiment of the present invention, the liquid crystal display device includes the structure (6), and the viewing angle compensation layer is a laminate including from a first polarizer side a positive A plate having an in-plane retardation of 130 nm or greater and 150 nm or smaller and a positive C plate having a thickness retardation of 80 nm or greater and 100 nm or smaller.

(8) In an embodiment of the present invention, the liquid crystal display device includes the structure (6), and the viewing angle compensation layer is a laminate including from a first polarizer side a biaxial retardation layer having an in-plane retardation of 80 nm or greater and 100 nm or smaller and an NZ coefficient of 1.3 or greater and 1.5 or smaller and a biaxial retardation layer having an in-plane retardation of 50 nm or greater and 70 nm or smaller and an NZ coefficient of −1.2 or greater and −0.8 or smaller.

(9) In an embodiment of the present invention, the liquid crystal display device includes the structure (6), and the viewing angle compensation layer is a laminate including from a first polarizer side a biaxial retardation layer having an in-plane retardation of 100 nm or greater and 130 nm or smaller and an NZ coefficient of 1.1 or greater and 1.3 or smaller and a biaxial retardation layer having an in-plane retardation of 10 nm or greater and 30 nm or smaller and an NZ coefficient of −4.5 or greater and −3.5 or smaller.

(10) In an embodiment of the present invention, the liquid crystal display device includes the structure (6), and the viewing angle compensation layer is a λ/2 plate having an in-plane retardation of 230 nm or greater and 320 nm or smaller and an NZ coefficient of 0.4 or greater and 0.6 or smaller.

(11) Another embodiment of the present invention is a liquid crystal display device including in the following order from a viewing surface side: a first polarizer; a viewing angle compensation layer; a first positive A plate having an in-plane retardation of 120 nm or greater and 155 nm or smaller; a positive C plate having a thickness retardation of 80 nm or greater and 100 nm or smaller; a first substrate; a second positive A plate having an in-plane retardation of 120 nm or greater and 155 nm or smaller; a horizontally aligned liquid crystal layer; a second substrate; and a second polarizer, the viewing angle compensation layer being a biaxial retardation layer having an in-plane retardation of 100 nm or greater and 130 nm or smaller and an NZ coefficient of 1.1 or greater and 1.3 or smaller, the liquid crystal display device further including between the viewing angle compensation layer and the first positive A plate a biaxial retardation layer having an in-plane retardation of 10 nm or greater and 30 nm or smaller and an NZ coefficient of −7.5 or greater and −6.5 or smaller.

(12) Another embodiment of the present invention is a liquid crystal display device including in the following order from a viewing surface side: a first polarizer; a viewing angle compensation layer; a first positive A plate having an in-plane retardation of 120 nm or greater and 155 nm or smaller; a positive C plate having a thickness retardation of 80 nm or greater and 100 nm or smaller; a first substrate; a second positive A plate having an in-plane retardation of 120 nm or greater and 155 nm or smaller; a horizontally aligned liquid crystal layer; a second substrate; and a second polarizer, the viewing angle compensation layer being a positive A plate having an in-plane retardation of 130 nm or greater and 150 nm or smaller, the liquid crystal display device further including between the viewing angle compensation layer and the first positive A plate a positive C plate having a thickness retardation of 130 nm or greater and 160 nm or smaller.

(13) Another embodiment of the present invention is a liquid crystal display device including in the following order from a viewing surface side: a first polarizer; a viewing angle compensation layer; a first positive A plate having an in-plane retardation of 120 nm or greater and 155 nm or smaller; a positive C plate having a thickness retardation of 80 nm or greater and 100 nm or smaller; a first substrate; a second positive A plate having an in-plane retardation of 120 nm or greater and 155 nm or smaller; a horizontally aligned liquid crystal layer; a second substrate; and a second polarizer, the viewing angle compensation layer being a biaxial retardation layer having an in-plane retardation of 80 nm or greater and 100 nm or smaller and an NZ coefficient of 1.3 or greater and 1.5 or smaller, the liquid crystal display device further including between the viewing angle compensation layer and the first positive A plate a biaxial retardation layer having an in-plane retardation of 50 nm or greater and 70 nm or smaller and an NZ coefficient of −2.0 or greater and −1.6 or smaller.

The present invention can provide a liquid crystal display device capable of reducing reflection of external light and suppressing light leakage when viewed from oblique directions in the black display state.

DETAILED DESCRIPTION OF THE INVENTION

Figure 1:
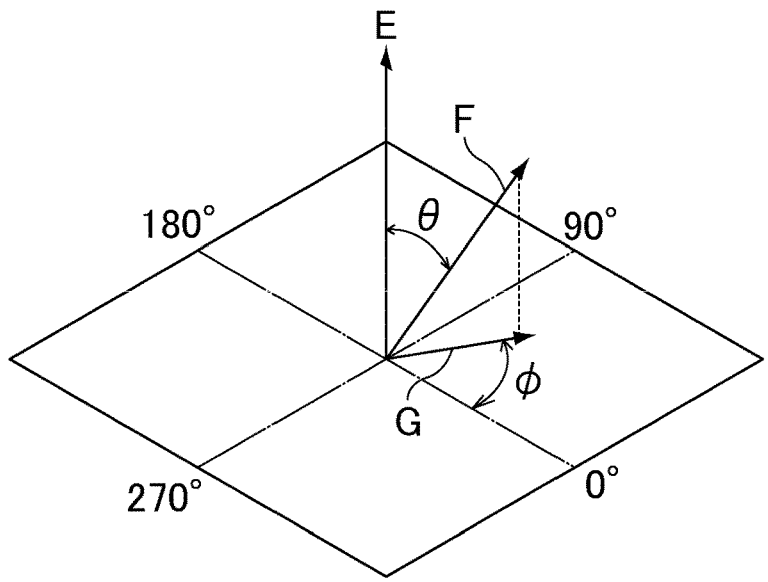
FIG. 1 is a figure for illustrating the definitions of a polar angle and an azimuth angle in a liquid crystal display device.

Liquid crystal display devices of embodiments of the present invention are described below. The embodiments, however, are not intended to limit the scope of the present invention, and modifications can be appropriately made to the design within the scope of the present invention. Features described in the embodiments may appropriately be combined or modified within the spirit of the present invention.

Definitions of Terms and Symbols

Definitions of terms and symbols used herein are as follows.

(1) Refractive Index (nx, ny, nz)

The symbol "nx" represents the refractive index in the direction at which the in-plane refractive index is maximum (i.e., slow axis direction). The symbol "ny" represents the refractive index in the direction perpendicular to the slow axis in a plane. The symbol "nz" represents the refractive index in the thickness direction. The refractive indices herein each indicate the value to light with a wavelength of 550 nm at 23° C., unless otherwise stated.

(2) In-Plane Retardation (Re)

The in-plane retardation (Re) herein indicates the in-plane retardation of a layer (film) to light with a wavelength of 550 nm at 23° C., unless otherwise stated. Re is determined by Re=(nx−ny)×d, wherein d is the thickness (nm) of the layer (film).

(3) Thickness Retardation (Rth)

The thickness retardation (Rth) herein indicates the thickness retardation of a layer (film) to light with a wavelength of 550 nm at 23° C., unless otherwise stated. Rth is determined by Rth={(nx+ny)/2−nz}×d, wherein d is the thickness (nm) of the layer (film).

(4) NZ Coefficient

The NZ coefficient is determined by NZ=(nx−nz)/(nx−ny) and is a value showing the ratio between two axes of a retarder.

(5) λ/4 Plate

The λ/4 plate means a retarder that provides an in-plane retardation of ¼ wavelength (137.5 nm, precisely) to at least light having a wavelength of 550 nm, and may be a retarder that provides an in-plane retardation of 100 nm or greater and 176 nm or smaller. Light having a wavelength of 550 nm is light of a wavelength at which a human has the highest visual sensitivity.

(6) λ/2 Plate

The λ/2 plate means a retarder that provides an in-plane retardation of ½ wavelength (275 nm, precisely) to at least light having a wavelength of 550 nm, and may be a retarder that provides an in-plane retardation of 230 nm or greater and 320 nm or smaller.

(7) Circularly Polarizing Plate

The circularly polarizing plate is a polarizing plate that converts incident unpolarized light into circularly polarized light. The circularly polarized light herein encompasses not only perfectly circularly polarized light (ellipticity (minor axis/major axis)=1.00) but also elliptically polarized light having an ellipticity of 0.90 or greater and smaller than 1.00.

(8) Viewing Surface Side and Back Surface Side

The viewing surface side means the side closer to the screen (display surface) of a liquid crystal display device. The back surface side means the side remote from the screen (display surface) of a liquid crystal display device.

(9) Polarizer

The "polarizer" without "linear" herein means a linear polarizer, which is distinguished from a circular polarizer (circularly polarizing plate).

(10) Polar Angle, Azimuth, Azimuth Angle

FIG. 1 is a figure for illustrating the definitions of a polar angle and an azimuth angle in a liquid crystal display device. As shown in FIG. 1, with the normal direction E of a liquid crystal display device made as a reference, the polar angle θ is an angle formed by the measurement direction F and the normal direction E and is usually 0° or greater and 90° or smaller. The direction G that is a projection of the measurement direction F is defined as the azimuth, which is usually at 0° or greater and 360° or smaller. The angle from a reference direction on the screen (azimuth angle 0°) to the direction G is defined as the azimuth angle φ. The azimuth angle φ is defined to be positive in the counterclockwise direction and to be negative in the clockwise direction. The terms counterclockwise and clockwise each indicate a direction when the screen is viewed from the viewing surface side (front). The polar angle θ is also simply referred to as a polar angle. The azimuth angle φ is also simply referred to as an azimuth angle and is defined with the horizontal direction of the screen as a reference (0°).

Embodiment 1

Figure 2:
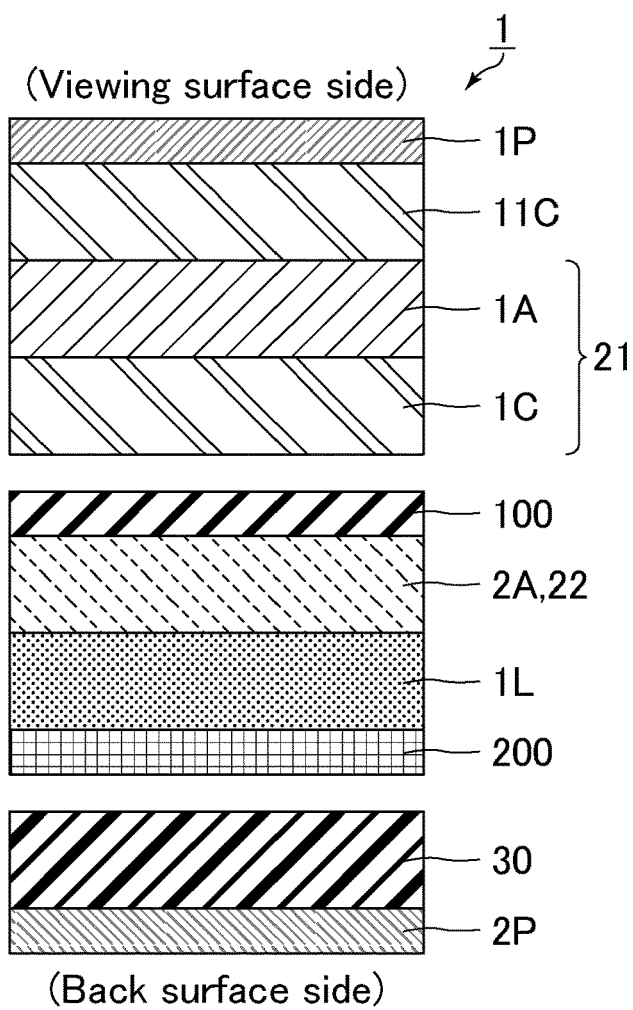
FIG. 2 is a schematic cross-sectional view of a liquid crystal display device of Embodiment 1.

FIG. 2 is a schematic cross-sectional view of a liquid crystal display device of Embodiment 1. A liquid crystal display device 1 of the present embodiment includes, in the following order from the viewing surface side, a first polarizer 1P, a first positive A plate 1A having an in-plane retardation of 120 nm or greater and 155 nm or smaller, a positive C plate 1C having a thickness retardation of 80 nm or greater and 100 nm or smaller, a first substrate 100, a second positive A plate 2A having an in-plane retardation of 120 nm or greater and 155 nm or smaller, a horizontally aligned liquid crystal layer 1L, a second substrate 200, a viewing angle compensation layer 30, and a second polarizer 2P. The liquid crystal display device 1 further includes between the first polarizer 1P and the first positive A plate 1A a positive C plate 11C having a thickness retardation of 30 nm or greater and 80 nm or smaller.

The first substrate 100 includes, in the following order from the viewing surface side, an insulating substrate formed from a transparent material such as glass and a color filter (CF) layer. The CF layer includes color filters and a black matrix. The color filters include, for example, red color filters, green color filters, and blue color filters. The first substrate 100 is also referred to as a CF substrate.

The second substrate 200 includes, in the following order toward the liquid crystal layer 1L, an insulating substrate, scanning lines, data lines, thin film transistors (TFTs) connected to the scanning lines and the data lines, and an electrode layer. The electrode layer includes, in the following order toward the liquid crystal layer 1L, a planar common electrode, an insulating film, and pixel electrodes with slits. The positions of the common electrode and the pixel electrodes may be switched, and a common electrode with slits may be formed on the liquid crystal layer 1L side of planar pixel electrodes. The second substrate 200 is also referred to as a TFT substrate.

The pixel electrodes each have a potential in accordance with a data signal supplied through the corresponding TFT. A fringe electric field is generated between the pixel electrodes and the common electrode to rotate liquid crystal molecules in the liquid crystal layer. The voltage applied between the pixel electrodes and the common electrode is controlled to change the retardation of the liquid crystal layer, whereby light is controlled to be transmitted or not transmitted. The liquid crystal display device 1 of the present embodiment is a fringe field switching (FFS) mode liquid crystal display device.

Although the present embodiment exemplifies a FFS mode liquid crystal display device 1, the present embodiment may be applied to an in-plane switching (IPS) mode liquid crystal display device in which each of pixel electrodes as comb-teeth electrodes and a common electrode as a comb-teeth electrode are formed on the same electrode layer such that their comb teeth fit each other.

The absorption axis of the first polarizer 1P is set to form an angle of about 90° with the absorption axis of the second polarizer 2P. This structure suitably achieves the black display state with no voltage applied (when the voltage applied to the liquid crystal layer is less than the threshold value).

The first polarizer 1P and the second polarizer 2P may each be any polarizer appropriate for the object. Examples thereof include those obtained by adsorbing a dichroic substance (dichroic pigment), such as iodine or a dichroic dye, to a hydrophilic polymer film, such as a polyvinyl alcohol film, a partially formalized polyvinyl alcohol film, or an ethylene-vinyl acetate copolymer-based partially saponified film, and uniaxially stretching the film; and polyene-based alignment films such as a dehydrated product of polyvinyl alcohol and a dehydrochlorinated product of polyvinyl chloride. Particularly preferred among these is a polarizer obtained by adsorbing a dichroic substance (dichroic pigment) such as iodine to a polyvinyl alcohol film and uniaxially stretching the film because such a polarizer has a high polarized dichroic ratio. The thickness of such a polarizer is not limited and may usually be about 5 to 30 μm.

In the case where the liquid crystal display device 1 including the horizontally aligned liquid crystal layer 1L includes the first polarizer 1P and the second polarizer 2P with their absorption axes arranged to form an angle of about 90° when viewed from the viewing surface side, i.e., in the case where the first polarizer 1P and the second polarizer 2P are arranged in the crossed Nicols, the absorption axes have axial dislocation from the crossed Nicols arrangement when viewed from an oblique direction. In order to correct this axial dislocation, the liquid crystal display device 1 of the present embodiment is provided with a viewing angle compensation film generally used in the field of liquid crystal display devices as the viewing angle compensation layer 30. The viewing angle compensation film, even in an oblique direction, can change the polarization state of linearly polarized light having passed through one of paired polarizers arranged in the crossed Nicols such that the linearly polarized light is polarized in the direction parallel to the absorption axis of the other polarizer. The viewing angle compensation film may be used in both of a liquid crystal display device including a horizontally aligned liquid crystal layer and a liquid crystal display device including a vertically aligned liquid crystal layer. The horizontally aligned liquid crystal layer means a liquid crystal layer in which liquid crystal molecules align in the direction substantially parallel to the main surface of each of paired substrates with no voltage applied. The expression substantially parallel means, for example, that the tilt angle of liquid crystal molecules is 0° or greater and 5° or smaller to the main surface of each substrate. The tilt angle of liquid crystal molecules means an angle of inclination of the major axes (optical axes) of liquid crystal molecules to the surface of a substrate. The vertically aligned liquid crystal layer means a liquid crystal layer in which liquid crystal molecules align in the direction substantially perpendicular to the main surface of each of paired substrates with no voltage applied. The expression substantially perpendicular means, for example, that the tilt angle of liquid crystal molecules is 85° or greater and 90° or smaller to the main surface of each substrate.

The first positive A plate 1A is a $\lambda/4$ plate. A laminate including the first positive A plate 1A and the positive C plate 1C is also referred to as the out-cell retardation layer 21. The second positive A plate 2A is a $\lambda/4$ plate and is also referred to as the in-cell retardation layer 22.

In the present embodiment, the out-cell retardation layer 21 is disposed in combination with the first polarizer 1P to function as a circularly polarizing plate, which can reduce reflection of external light. Accordingly, the in-plane retardation of the first positive A plate 1A in the out-cell retardation layer 21 is set to 120 nm or greater and 155 nm or smaller, and the slow axis of the first positive A plate 1A is set to form an angle of about 45° with the absorption axis of the first polarizer 1P.

The in-plane retardation of the second positive A plate 2A that is the in-cell retardation layer 22 is set to 120 nm or greater and 155 nm or smaller. The slow axis of the second positive A plate 2A is set to form an angle of about 90° with the slow axis of the first positive A plate 1A. Thereby, at least in the front direction, the out-cell retardation layer 21 and the in-cell retardation layer 22 can cancel out the each other's retardations in the in-plane direction to achieve a state where the out-cell retardation layer 21 and the in-cell retardation layer 22 substantially do not exist. This structure resultantly provides transmissive display with similar optical properties to those of a typical FFS mode device while achieving low reflection.

In order to cancel the retardation of the in-cell retardation layer 22 formed from the second positive A plate 2A at all the azimuths, the out-cell retardation layer 21 may be formed from a negative A plate. Unfortunately, materials for the negative A plate tend to be torn, i.e., are fragile. The liquid crystal display device 1 of the present embodiment employs a laminate including the first positive A plate 1A and the positive C plate 1C as the out-cell retardation layer 21 so that the out-cell retardation layer 21 works as a negative A plate in appearance, which can prevent deterioration in fragileness of the out-cell retardation layer 21.

Differently from the negative A plate, the out-cell retardation layer 21 that is a laminate including the first positive A plate 1A and the positive C plate 1C cannot completely cancel the retardation of the second positive A plate 2A at almost all the azimuths. Thus, in the liquid crystal display device 1 of the present embodiment, which employs the viewing angle compensation layer 30 together with the out-cell retardation layer 21 and the in-cell retardation layer 22, linearly polarized light having passed through the second polarizer 2P becomes polarized light that is polarized at the same azimuth as that of the absorption axis of the first polarizer 1P. This polarized light behaves not as linearly polarized light but as slightly elliptically polarized light when viewed from oblique directions, which unfortunately causes light leakage when viewed from oblique directions in the black display state.

In the present embodiment, the positive C plate 11C having a thickness retardation of 30 nm or greater and 80 nm or smaller is further disposed between the first polarizer 1P and the first positive A plate 1A to convert the elliptically polarized light into linearly polarized light, which can further suppress the light leakage when viewed from oblique directions in the black display state.

The positive C plate 11C has a thickness retardation of preferably 35 nm or greater and 75 nm or smaller, more preferably 40 nm or greater and 70 nm or smaller. The positive C plate 11C preferably has an in-plane retardation of substantially 0 nm.

The positive C plate 11C may be formed, for example, by applying a vertical alignment film to a substrate formed from a resin such as polyethylene terephthalate, applying polymerizable liquid crystal to the substrate to form a vertically aligned polymerizable liquid crystal layer, and disposing the polymerizable liquid crystal layer in a predetermined position of the liquid crystal panel with an adhesive material. The vertical alignment film may or may not be transferred to the liquid crystal panel side. The vertical alignment film is an alignment film that aligns liquid crystal molecules in the liquid crystal layer in a direction perpendicular to the surface of the vertical alignment film with no voltage applied.

The first positive A plate 1A has an in-plane retardation of preferably 125 nm or greater and 150 nm or smaller, more preferably 130 nm or greater and 145 nm or smaller.

The first positive A plate 1A has an NZ coefficient of preferably 0.8 or greater and 1.3 or smaller, more preferably 0.9 or greater and 1.2 or smaller.

Specific examples of the first positive A plate 1A include a retardation layer including a liquid crystal compound with fixed alignment, and a retardation layer obtained by stretching a resin film for a positive A plate.

The retardation layer including a liquid crystal compound with fixed alignment is described. A specific example of the retardation layer including a liquid crystal compound with fixed alignment is a retardation layer that includes a film (alignment film) after alignment treatment and a liquid crystal material, such as a reactive mesogen, whose molecules are aligned on the film. An example of the method for forming such a retardation layer is a method including applying a liquid crystal material including a liquid crystal compound to a substrate film after alignment treatment and fixing the alignment of molecules of the liquid crystal compound. A suitable example of the liquid crystal compound is polymerizable liquid crystal. Any method can be employed as long as the desired retardation is achieved, including a method performing no special alignment treatment on a substrate film and a method including fixing the alignment of molecules of a liquid crystal compound and separating the compound layer from a substrate film and transferring the compound layer to a different film. Also, a method without fixing the alignment of molecules of a liquid crystal material may be employed.

The polymerizable liquid crystal means a compound containing a polymerizable group and having properties of liquid crystal. The polymerizable group means a group that is involved in a polymerization reaction and is preferably a photopolymerizable group. The photopolymerizable group means a group that can be involved in a polymerization reaction using an active radical or acid generated from a photopolymerization initiator. Examples of the polymerizable group include vinyl, vinyloxy, 1-chlorovinyl, isopropenyl, 4-vinylphenyl, acryloyloxy, methacryloyloxy, oxiranyl, and oxetanyl groups. Preferred among these are acryloyloxy, methacryloyloxy, vinyloxy, oxiranyl, and oxetanyl groups, and more preferred is an acryloyloxy group. The polymerizable liquid crystal may be a thermotropic liquid crystal or a lyotropic liquid crystal. When thermotropic liquid crystals are categorized according to the degree of order, a nematic liquid crystal or a smectic liquid crystal may be employed. Still, a thermotropic nematic liquid crystal is preferred in terms of easiness of film formation.

Specific examples of the polymerizable liquid crystal include compounds having a polymerizable group among the compounds disclosed in "3.8.6 Network (completely cross-linked type)" and "6.5.1 Liquid crystal material b. Polymerizable nematic liquid crystal material" of Liquid Crystal Handbook (Ekisho Binran), the LCD Handbook Editorial Committee (Ekisho Binran Hensyu Iinkai), Maruzen Co., Ltd., published on Oct. 30, 2000); and polymerizable liquid crystals disclosed in JP 2010-31223 A, JP 2010-270108 A, JP 2011-6360 A, and JP 2011-207765 A.

The retardation layer obtained by stretching a resin film for a positive A plate is described. Examples of the material of the resin film for a positive A plate include acyclic polyolefins such as polypropylenes, cyclic polyolefins such as polynorbornenes, celluloses such as cellulose triacetate and cellulose diacetate, polyesters, polycarbonates, polyacrylates, polymethacrylates, polystyrenes, liquid crystal compositions, and mixtures and copolymers of these. Examples of the resin film for a positive A plate using a cyclic polyolefin as a material include "Zeonor®" available from Zeon Corporation.

The positive C plate 1C has a thickness retardation of preferably 82 nm or greater and 98 nm or smaller, more preferably 85 nm or greater and 95 nm or smaller. The positive C plate 1C preferably has an in-plane retardation of substantially 0 nm.

The positive C plate 1C may be formed by the same method as for the positive C plate 11C.

The second positive A plate 2A has an in-plane retardation of preferably 125 nm or greater and 150 nm or smaller, more preferably 130 nm or greater and 145 nm or smaller.

The second positive A plate 2A has an NZ coefficient of preferably 0.8 or greater and 1.3 or smaller, more preferably 0.9 or greater and 1.2 or smaller.

The second positive A plate 2A is preferably the retardation layer including a liquid crystal compound with fixed alignment, which has been given as a specific example of the first positive A plate 1A. This structure can reduce the thickness of the in-cell retardation layer 22 that is a positive A plate, and thereby can suppress color mixing caused by parallax of the liquid crystal display device 1.

The horizontally aligned liquid crystal layer 1L includes liquid crystal molecules. The liquid crystal molecules may have a positive or negative anisotropy of dielectric constant (Aε) defined by the following formula. Liquid crystal molecules having a positive anisotropy of dielectric constant are also referred to as positive liquid crystals and liquid crystal molecules having a negative anisotropy of dielectric constant are also referred to as negative liquid crystal. The direction of the major axis of liquid crystal molecules corresponds to the direction of the slow axis thereof.

Δε=(dielectric constant in the major axis direction)−
(dielectric constant in the minor axis direction)

In the horizontally aligned liquid crystal layer 1L, in order to suppress light leakage in the black display state, the alignment azimuth of the liquid crystal molecules to which a voltage for providing black display is applied (in the black display state) forms an angle of about 90° with the absorption axis of the first polarizer 1P or the second polarizer 2P, and in order to achieve a better transmittance in the white display state, the alignment azimuth of the liquid crystal molecules to which a voltage for providing white display is applied (in the white display state) forms an angle of about 45° with the alignment azimuth of the liquid crystal molecules in the black display state. Here, the viewing angle compensation layer 30 is not disposed between the liquid crystal layer 1L and one of the first polarizer 1P or the second polarizer 2P (hereinafter, also referred to as a specific polarizer), whichever has an absorption axis forming an angle of about 0° with the alignment azimuth of the liquid crystal molecules. Since the absorption axis of the specific polarizer and the alignment azimuth of the liquid crystal molecules form an angle of about 0°, the angle formed by the alignment azimuth of the liquid crystal molecules and the absorption axis of the specific polarizer remains at about 0° even when the device is viewed from the normal direction E or from an oblique direction (e.g., a direction at a polar angle of 60° and an azimuth angle of) 45°. This structure thus can allow the liquid crystal layer 1L to cause no retardation even when viewed from oblique directions. Here, if the viewing angle compensation layer 30 is disposed between the specific polarizer and the liquid crystal layer 1L, the polarization state changes between the specific polarizer and the liquid crystal layer 1L. As a result, the liquid crystal layer 1L unfortunately functions as a retarder when viewed from oblique directions to cause light leakage. Therefore, no viewing angle compensation layer 30 is disposed between the specific polarizer and the liquid crystal layer 1L. In other words, the viewing angle compensation layer 30 is disposed between the liquid crystal layer 1L and one of the first polarizer 1P or the second polarizer 2P, whichever has an absorption axis forming an angle of about 90° with the alignment azimuth of the liquid crystal molecules.

The angle about 0° herein may fall within the range of 0°±3°, preferably within the range of 0°±1°, more preferably within the range of 0°±0.5°, particularly preferably 0°. The angle about 45° herein may fall within the range of 45°±3°, preferably within the range of 45°±1°, more preferably within the range of 45°±0.5°, particularly preferably 45°. The angle about 90° herein may fall within the range of 90°±3°, preferably within the range of 90°±1°, more preferably within the range of 90°±0.5°, particularly preferably 90°.

The following Embodiments 1-1 to 1-4 describe the liquid crystal display device 1 with reference to specific examples of the viewing angle compensation layer 30 of the present embodiment.

Embodiment 1-1

Figure 3:
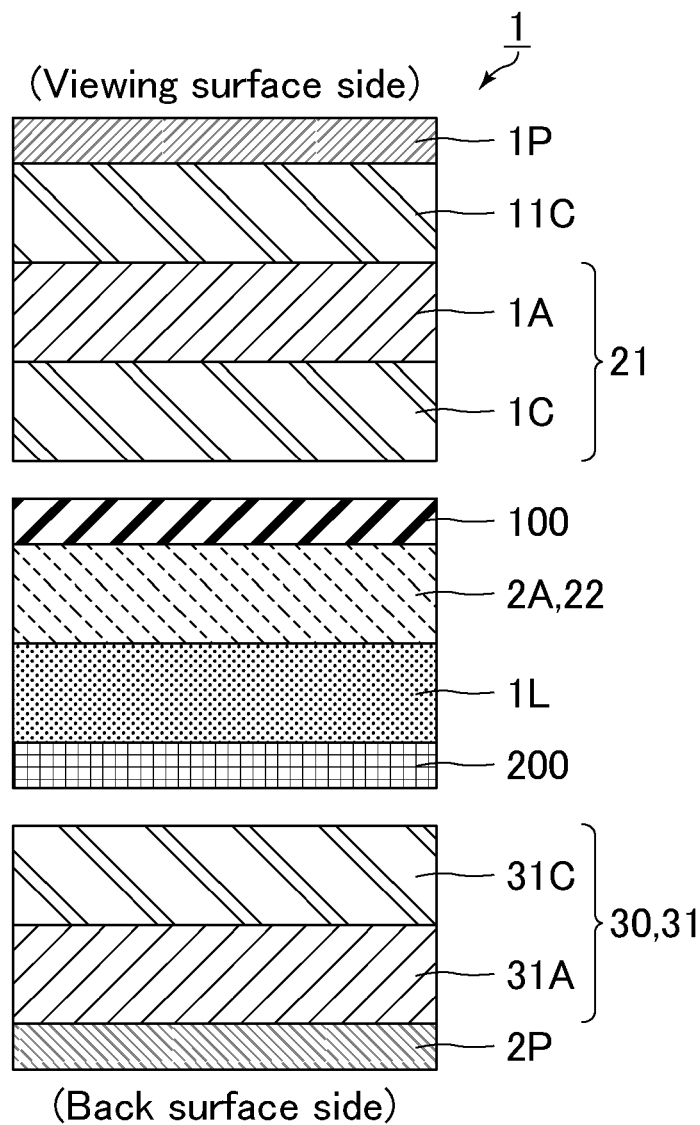
FIG. 3 is a schematic cross-sectional view of a liquid crystal display device of Embodiment 1-1.

FIG. 3 is a schematic cross-sectional view of a liquid crystal display device of Embodiment 1-1. As shown in FIG. 3, the viewing angle compensation layer 30 in a liquid crystal display device 1 of the present embodiment is a first laminate 31 including, in the following order from the second polarizer 2P side, a positive A plate 31A having an in-plane retardation of 130 nm or greater and 150 nm or smaller and a positive C plate 31C having a thickness retardation of 80 nm or greater and 100 nm or smaller.

The positive A plate 31A has an in-plane retardation of preferably 132 nm or greater and 148 nm or smaller, more preferably 135 nm or greater and 145 nm or smaller.

The positive A plate 31A has an NZ coefficient of preferably 0.8 or greater and 1.2 or smaller, more preferably 0.9 or greater and 1.1 or smaller.

The positive A plate 31A may be formed by the same method as for the positive A plate 1A.

The positive C plate 31C has a thickness retardation of preferably 82 nm or greater and 98 nm or smaller, more preferably 85 nm or greater and 95 nm or smaller. The positive C plate 31C preferably has an in-plane retardation of substantially 0 nm.

The positive C plate 31C may be formed by the same method as for the positive C plate 11C.

The slow axis of the positive A plate 31A in the first laminate 31 preferably forms an angle of about 90° with the absorption axis of the adjacent polarizer, i.e., the second polarizer 2P. In the case where the slow axis of the positive A plate 31A is set to form an angle of about 0° with the absorption axis of the second polarizer 2P, the angle formed by the absorption axis of the second polarizer 2P and the slow axis of the positive A plate 31A remains at about 0° when the liquid crystal display device 1 is viewed from the normal direction E and from an oblique direction (e.g., a direction at a polar angle of 60° and an azimuth angle of 45°). Thus, linearly polarized light having passed through the second polarizer 2P is incident on only the fast axis of the positive A plate 31A to cause no change in retardation, resulting in a similar state to the state where no positive A plate 31A is disposed. Meanwhile, in the case where the slow axis of the positive A plate 31A is set to form an angle of about 90° with the absorption axis of the second polarizer 2P and the liquid crystal display device 1 is viewed from the normal direction E, linearly polarized light having passed through the second polarizer 2P is incident on the positive A plate 31A at the azimuth of the slow axis thereof to cause no retardation and no change in the polarization state. In contrast, when the liquid crystal display device 1 is viewed from an oblique direction (e.g., a direction at a polar angle of 60° and an azimuth angle of 45°), the angle formed by the absorption axis of the second polarizer 2P and the slow axis of the positive A plate 31A is shifted from the angle having set to about 90° to cause a retardation and change the polarization state, whereby the viewing angle can be compensated.

Embodiment 1-2

Figure 4:
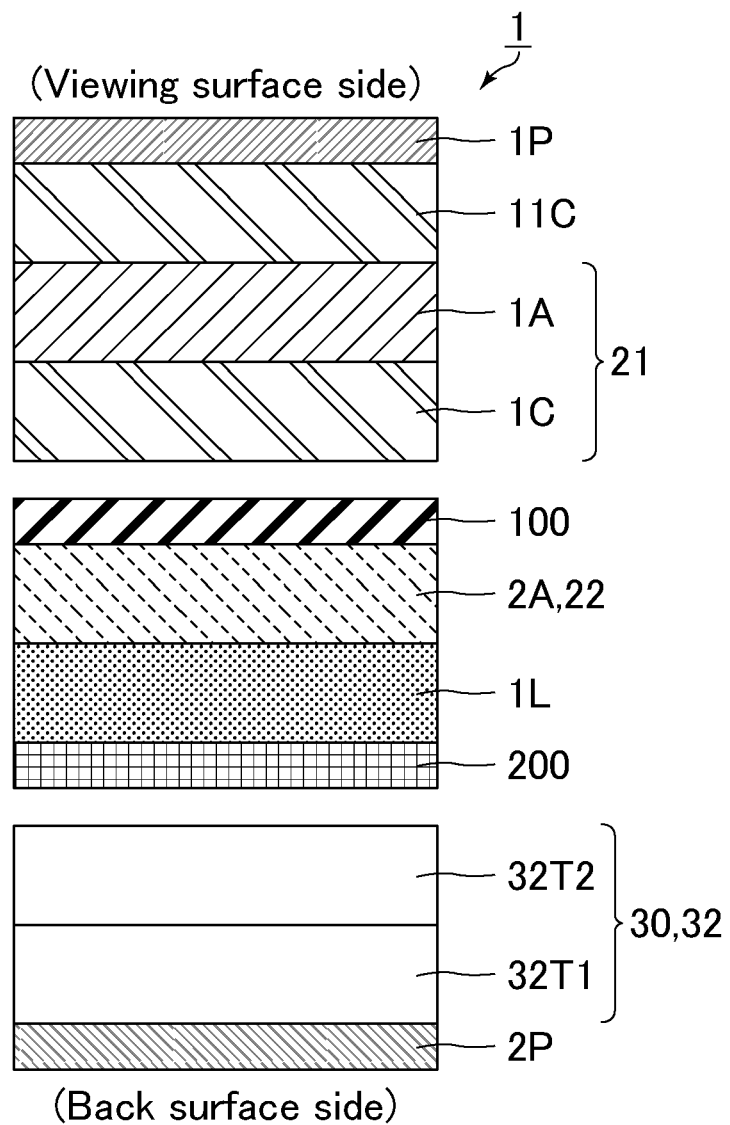
FIG. 4 is a schematic cross-sectional view of a liquid crystal display device of Embodiment 1-2.

FIG. 4 is a schematic cross-sectional view of a liquid crystal display device of Embodiment 1-2. As shown in FIG.

4, the viewing angle compensation layer 30 in a liquid crystal display device 1 of the present embodiment is a second laminate 32 including, in the following order from the second polarizer 2P side, a biaxial retardation layer 32T1 having an in-plane retardation of 80 nm or greater and 100 nm or smaller and an NZ coefficient of 1.3 or greater and 1.5 or smaller and a biaxial retardation layer 32T2 having an in-plane retardation of 50 nm or greater and 70 nm or smaller and an NZ coefficient of −1.2 or greater and −0.8 or smaller.

The biaxial retardation layer 32T1 may be formed by simultaneous biaxial stretching or sequential biaxial stretching on a material with a positive birefringence, for example. Specific examples of the material with a positive birefringence include the same as the examples for the materials of the resin film for a positive A plate.

The biaxial retardation layer 32T2 may be formed by simultaneous biaxial stretching or sequential biaxial stretching on a material with a negative birefringence, for example. Examples of the material with a negative birefringence include polymers containing at a side chain thereof a chemical bond or a functional group having large polarization anisotropy, such as an aromatic group and a carbonyl group, and specific examples thereof include polyacrylate, polymethacrylate, polystyrene, polymaleimide, and polyfumaric acid esters.

The biaxial retardation layer 32T1 preferably has an in-plane retardation of 82 nm or greater and 98 nm or smaller and an NZ coefficient of 1.32 or greater and 1.48 or smaller, and more preferably has an in-plane retardation of 85 nm or greater and 95 nm or smaller and an NZ coefficient of 1.35 or greater and 1.45 or smaller.

The biaxial retardation layer 32T2 preferably has an in-plane retardation of 52 nm or greater and 68 nm or smaller and an NZ coefficient of −1.22 or greater and −0.78 or smaller, and more preferably has an in-plane retardation of 55 nm or greater and 65 nm or smaller and an NZ coefficient of −1.25 or greater and −0.75 or smaller.

The slow axes of the two biaxial retardation layers 32T1 and 32T2 in the second laminate 32 each preferably form an angle of about 90° with the absorption axis of the adjacent polarizer, i.e., the second polarizer 2P, for the same reason why the slow axis of the positive A plate 31A in the first laminate 31 preferably forms an angle of about 90° with the absorption axis of the adjacent polarizer, i.e., the second polarizer 2P, in Embodiment 1-1.

Embodiment 1-3

Figure 5:
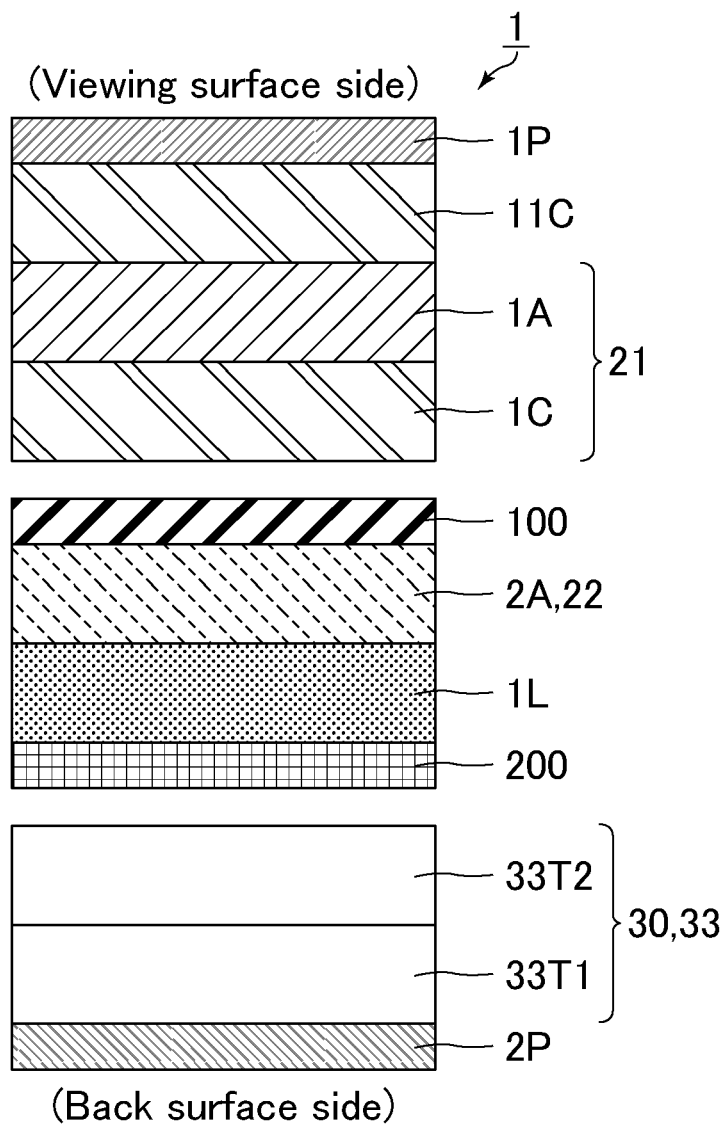
FIG. 5 is a schematic cross-sectional view of a liquid crystal display device of Embodiment 1-3.

FIG. 5 is a schematic cross-sectional view of a liquid crystal display device of Embodiment 1-3. As shown in FIG. 5, the viewing angle compensation layer 30 in a liquid crystal display device 1 of the present embodiment is a third laminate 33 including, in the following order from the second polarizer 2P side, a biaxial retardation layer 33T1 having an in-plane retardation of 100 nm or greater and 130 nm or smaller and an NZ coefficient of 1.1 or greater and 1.3 or smaller and a biaxial retardation layer 33T2 having an in-plane retardation of 10 nm or greater and 30 nm or smaller and an NZ coefficient of −4.5 or greater and −3.5 or smaller.

The biaxial retardation layer 33T1 may be formed by the same method as for the biaxial retardation layer 32T1. The biaxial retardation layer 33T2 may be formed by the same method as for the biaxial retardation layer 32T2.

The biaxial retardation layer 33T1 preferably has an in-plane retardation of 105 nm or greater and 125 nm or smaller and an NZ coefficient of 1.12 or greater and 1.28 or smaller, and more preferably has an in-plane retardation of 110 nm or greater and 120 nm or smaller and an NZ coefficient of 1.15 or greater and 1.25 or smaller.

The biaxial retardation layer 33T2 preferably has an in-plane retardation of 12 nm or greater and 28 nm or smaller and an NZ coefficient of −4.4 or greater and −3.6 or smaller, and more preferably has an in-plane retardation of 15 nm or greater and 25 nm or smaller and an NZ coefficient of −4.3 or greater and −3.5 or smaller.

The slow axes of the two biaxial retardation layers 33T1 and 33T2 in the third laminate 33 each preferably form an angle of about 90° with the absorption axis of the adjacent polarizer, i.e., the second polarizer 2P, for the same reason why the slow axis of the positive A plate 31A in the first laminate 31 preferably forms an angle of about 90° with the absorption axis of the adjacent polarizer, i.e., the second polarizer 2P, in Embodiment 1-1.

Embodiment 1-4

Figure 6:
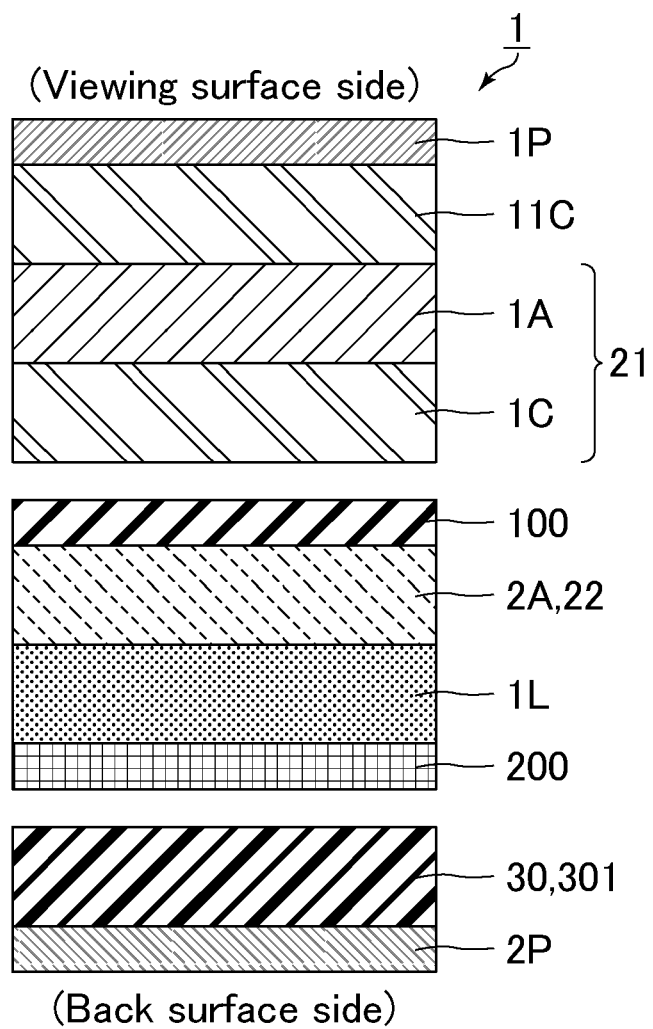
FIG. 6 is a schematic cross-sectional view of a liquid crystal display device of Embodiment 1-4.

FIG. 6 is a schematic cross-sectional view of a liquid crystal display device of Embodiment 1-4. As shown in FIG. 6, the viewing angle compensation layer 30 in a liquid crystal display device 1 of the present embodiment is a $\lambda/2$ plate 301 having an in-plane retardation of 230 nm or greater and 320 nm or smaller and an NZ coefficient of 0.4 or greater and 0.6 or smaller.

The $\lambda/2$ plate 301 may be formed, for example, by applying a coating film liquid in which a resin is dissolved or dispersed in a solvent to a shrinkable film to form a coating film and shrinking the coating film. The coating film may be shrunk by, for example, heating the laminate including the shrinkable film and the coating film to shrink the shrinkable film and thereby shrinking the coating film. Examples of the resin include polyarylate, polyamide, polyimide, polyester, polyaryl ether ketone, polyamide imide, polyester imide, polyvinyl alcohol, polyfumaric acid ester, polyethersulfone, polysulfone, polynorbornene, polycarbonate, cellulose, and polyurethane. These polymers may be used alone or in combination. Specific examples of the material for the shrinkable film include polyolefins (cyclic polyolefins and acyclic polyolefins, preferably acyclic polyolefins), polyester, polyacrylate, polymethacrylate, polyamide, polycarbonate, polynorbornene, polystyrene, polyvinyl chloride, polyvinylidene chloride, cellulose, polyethersulfone, polysulfone, polyimide, polyacetate, polyarylate, polyvinyl alcohol, and liquid crystal polymers. These may be used alone or in combination. More specifically, the $\lambda/2$ plate 301 may be formed by the method disclosed in the paragraphs 0061 and 0063 in JP 2017-181735 A.

Alternatively, the $\lambda/2$ plate 301 may be formed by stretching a polymer film. Specific examples of the material for the polymer film include acyclic polyolefins such as polycarbonate and polypropylene, polyesters such as polyethylene terephthalate and polyethylene naphthalate, cyclic polyolefins such as polynorbornene, polyvinyl alcohol, polyvinyl butyral, polymethyl vinyl ether, polyhydroxyethyl acrylate, hydroxyethyl cellulose, hydroxypropyl cellulose, methyl cellulose, polyarylate, polysulfone, polyethersulfone, polyphenylene sulfide, polyphenylene oxide, polyallyl sulfone, polyvinyl alcohol, polyamide, polyimide, polyvinyl chloride, and cellulose. These may be used alone or in combination. More specifically, the $\lambda/2$ plate 301 may be formed by stretching a polycarbonate film in the manner as described in the paragraph 0123 in JP 2004-325468 A.

The λ/2 plate 301 preferably has an in-plane retardation of 240 nm or greater and 310 nm or smaller and an NZ coefficient of 0.42 or greater and 0.58 or smaller, and more preferably has an in-plane retardation of 250 nm or greater and 300 nm or smaller and an NZ coefficient of 0.45 or greater and 0.55 or smaller.

The slow axis of the λ/2 plate 301 preferably forms an angle of about 90° with the absorption axis of the adjacent polarizer, i.e., the second polarizer 2P, for the same reason why the slow axis of the positive A plate 31A in the first laminate 31 preferably forms an angle of about 90° with the absorption axis of the adjacent polarizer, i.e., the second polarizer 2P, in Embodiment 1-1.

Embodiment 2

In the present embodiment, the features unique to the present embodiment are mainly described and the same features as those in the above embodiment are not described again. Embodiment 1 describes an embodiment in which the viewing angle compensation layer 30 is disposed between the second substrate 200 and the second polarizer 2P. The present embodiment describes an embodiment in which the viewing angle compensation layer 30 is disposed between the first polarizer 1P and the first positive A plate 1A.

Figure 7:
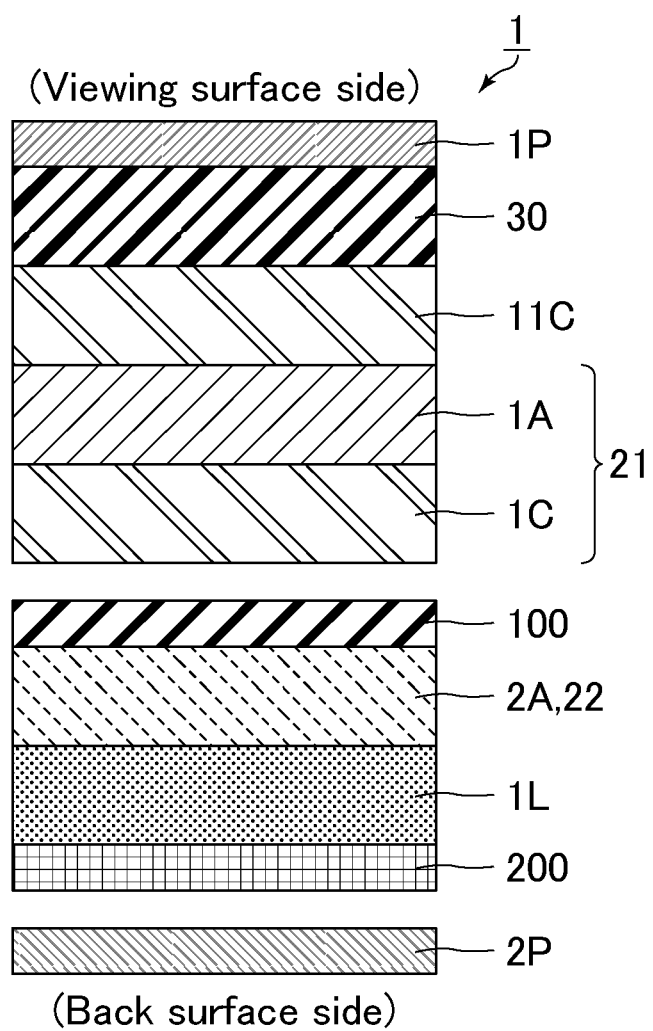
FIG. 7 is a schematic cross-sectional view of a liquid crystal display device of Embodiment 2.

FIG. 7 is a schematic cross-sectional view of a liquid crystal display device of Embodiment 2. A liquid crystal display device 1 of the present embodiment includes, in the following order from the viewing surface side, the first polarizer 1P, the viewing angle compensation layer 30, the first positive A plate 1A having an in-plane retardation of 120 nm or greater and 155 nm or smaller, the positive C plate 1C having a thickness retardation of 80 nm or greater and 100 nm or smaller, the first substrate 100, the second positive A plate 2A having an in-plane retardation of 120 nm or greater and 155 nm or smaller, the horizontally aligned liquid crystal layer 1L, the second substrate 200, and the second polarizer 2P. The liquid crystal display device 1 further includes, between the viewing angle compensation layer 30 and the first positive A plate 1A, the positive C plate 11C having a thickness retardation of 30 nm or greater and 80 nm or smaller.

In the present embodiment, the first polarizer 1P and the second polarizer 2P are arranged in the crossed Nicols as in Embodiment 1. Although this structure causes axial dislocation from the crossed Nicols formation when the device is viewed from oblique directions, the viewing angle compensation layer 30 can correct the axial dislocation.

In the present embodiment, the out-cell retardation layer 21 is disposed in combination with the first polarizer 1P to function as a circularly polarizing plate, which can reduce reflection of external light.

Accordingly, the in-plane retardation of the first positive A plate 1A in the out-cell retardation layer 21 is set to 120 nm or greater and 155 nm or smaller, and the slow axis of the first positive A plate 1A is set to form an angle of about 45° with the absorption axis of the first polarizer 1P.

The in-plane retardation of the second positive A plate 2A that is the in-cell retardation layer 22 is set to 120 nm or greater and 155 nm or smaller. The slow axis of the second positive A plate 2A is set to form an angle of about 90° with the slow axis of the first positive A plate 1A. Thereby, at least in the front direction, the out-cell retardation layer 21 and the in-cell retardation layer 22 can cancel out the each other's retardations in the in-plane direction to achieve a state where the out-cell retardation layer 21 and the in-cell retardation layer 22 substantially do not exist. This structure resultantly provides transmissive display with similar optical properties to those of a typical FFS mode device while achieving low reflection.

In order to cancel the retardation of the in-cell retardation layer 22 formed from the second positive A plate 2A at all the azimuths, the out-cell retardation layer 21 may be formed from a negative A plate as described above. Unfortunately, materials for the negative A plate tend to be torn, i.e., are fragile. The liquid crystal display device 1 of the present embodiment employs a laminate including the first positive A plate 1A and the positive C plate 1C as the out-cell retardation layer 21 so that the out-cell retardation layer 21 works as a negative A plate in appearance, which can prevent deterioration in fragileness of the out-cell retardation layer 21.

Differently from the negative A plate, the out-cell retardation layer 21 that is a laminate including the first positive A plate 1A and the positive C plate 1C cannot completely cancel the retardation of the second positive A plate 2A at almost all the azimuths. Thus, in the liquid crystal display device 1 of the present embodiment, which employs the viewing angle compensation layer 30 together with the out-cell retardation layer 21 and the in-cell retardation layer 22, linearly polarized light having passed through the second polarizer 2P is polarized at the same azimuth as that of the absorption axis of the first polarizer 1P. This polarized light behaves as not linearly polarized light but slightly elliptically polarized light when viewed from oblique directions, which unfortunately causes light leakage when viewed from oblique directions in the black display state.

In the present embodiment, the positive C plate 11C having a thickness retardation of 30 nm or greater and 80 nm or smaller is further disposed between the viewing angle compensation layer 30 and the first positive A plate 1A to convert the elliptically polarized light into linearly polarized light, which can further suppress the light leakage when viewed from oblique directions in the black display state.

The following Embodiments 2-1 to 2-4 describe the liquid crystal display device 1 with reference to specific examples of the viewing angle compensation layer 30 of the present embodiment.

Embodiment 2-1

Figure 8:
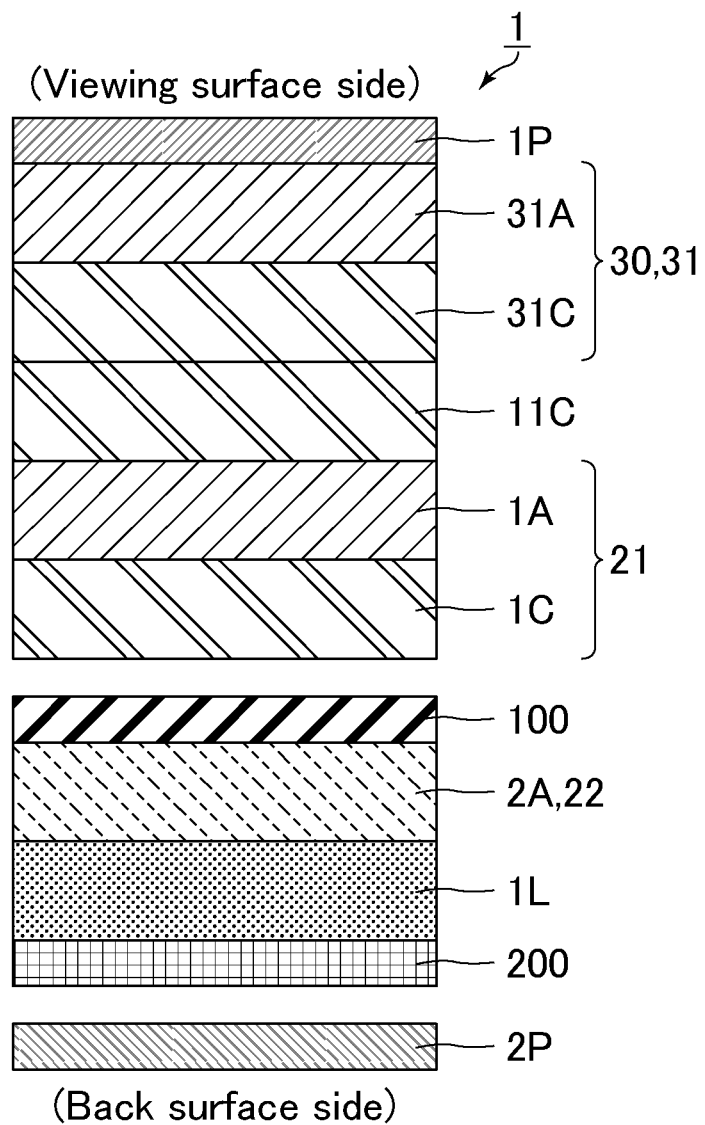
FIG. 8 is a schematic cross-sectional view of a liquid crystal display device of Embodiment 2-1.

FIG. 8 is a schematic cross-sectional view of a liquid crystal display device of Embodiment 2-1. As shown in FIG. 8, the viewing angle compensation layer 30 in a liquid crystal display device 1 of the present embodiment is a first laminate 31 including, in the following order from the first polarizer 1P side, the positive A plate 31A and the positive C plate 31C that are used in Embodiment 1-1.

The slow axis of the positive A plate 31A in the first laminate 31 preferably forms an angle of about 90° with the absorption axis of the adjacent polarizer, i.e., the first polarizer 1P, for the same reason why the slow axis of the positive A plate 31A in the first laminate 31 preferably forms an angle of about 90° with the absorption axis of the adjacent polarizer, i.e., the second polarizer 2P, in Embodiment 1-1.

Embodiment 2-2

Figure 9:
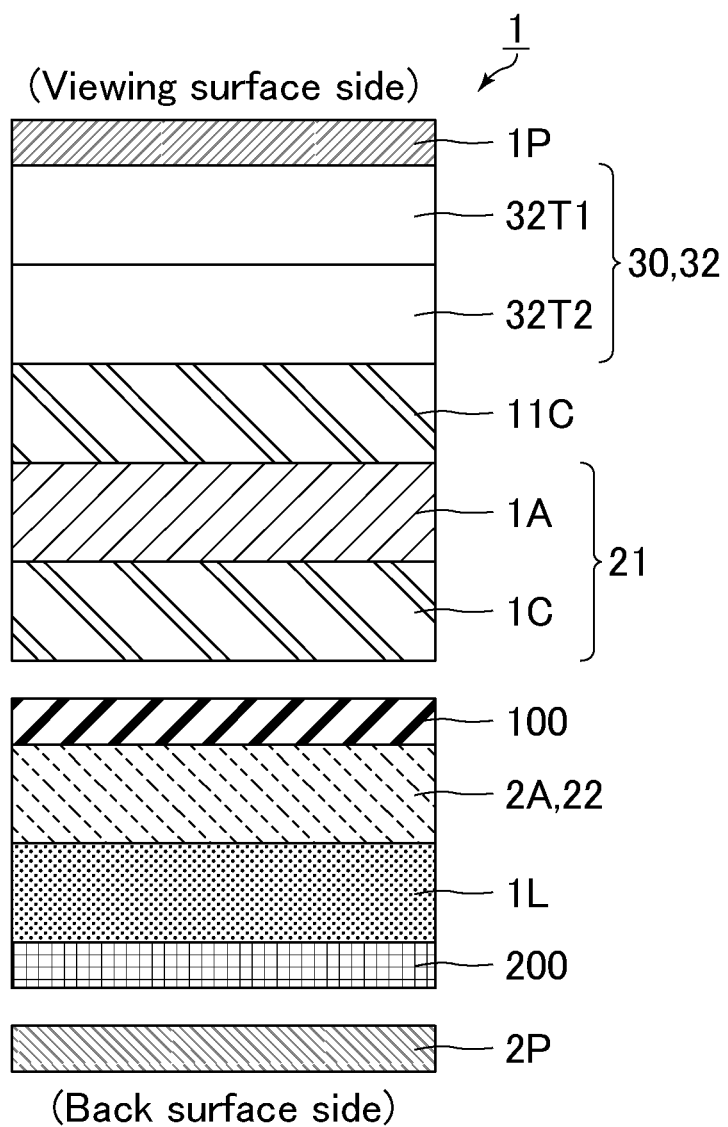
FIG. 9 is a schematic cross-sectional view of a liquid crystal display device of Embodiment 2-2.

FIG. 9 is a schematic cross-sectional view of a liquid crystal display device of Embodiment 2-2. As shown in FIG. 9, the viewing angle compensation layer 30 in a liquid crystal display device 1 of the present embodiment is a second laminate 32 including, in the following order from the first polarizer 1P side, the biaxial retardation layer 32T1 and the biaxial retardation layer 32T2 that are used in Embodiment 1-2.

The slow axes of the two biaxial retardation layers 32T1 and 32T2 in the second laminate 32 preferably each form an angle of about 90° with the absorption axis of the adjacent polarizer, i.e., the first polarizer 1P, for the same reason why the slow axis of the positive A plate 31A in the first laminate 31 preferably forms an angle of about 90° with the absorption axis of the adjacent polarizer, i.e., the second polarizer 2P, in Embodiment 1-1.

Embodiment 2-3

Figure 10:
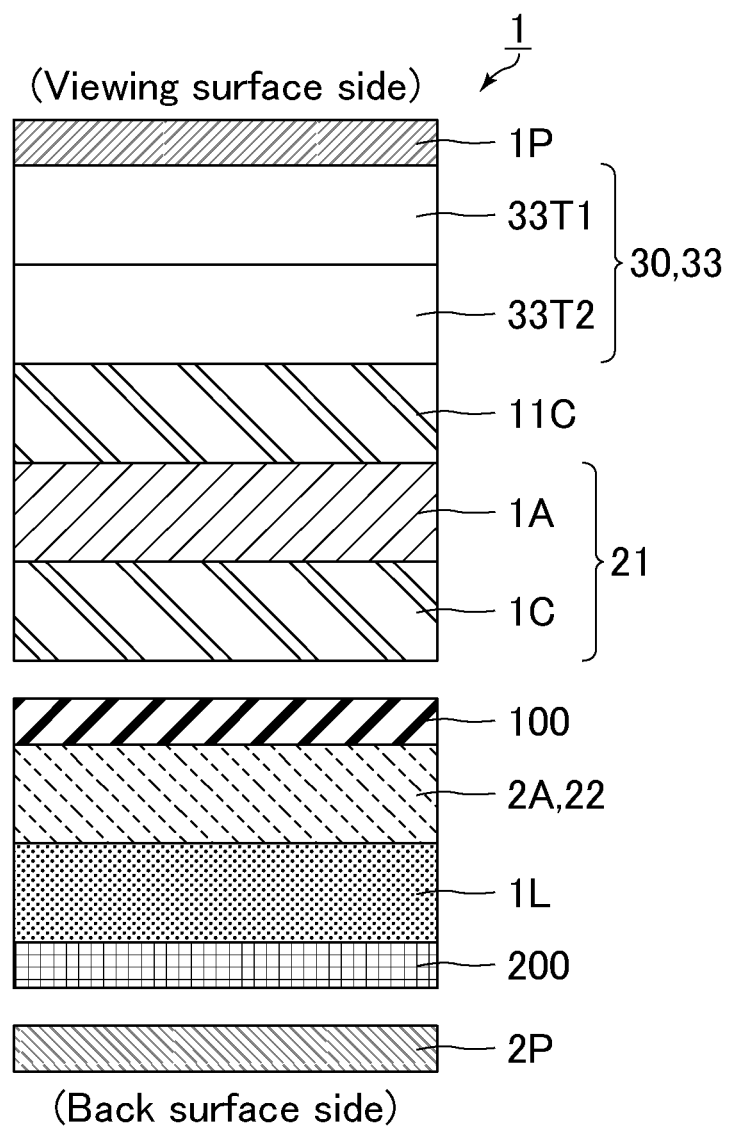
FIG. 10 is a schematic cross-sectional view of a liquid crystal display device of Embodiment 2-3.

FIG. 10 is a schematic cross-sectional view of a liquid crystal display device of Embodiment 2-3. As shown in FIG. 10, the viewing angle compensation layer 30 in a liquid crystal display device 1 of the present embodiment is a third laminate 33 including, in the following order from the first polarizer 1P side, the biaxial retardation layer 33T1 and the biaxial retardation layer 33T2 that are used in Embodiment 1-3.

The slow axes of the two biaxial retardation layers 33T1 and 33T2 in the third laminate 33 preferably each form an angle of about 90° with the absorption axis of the adjacent polarizer, i.e., the first polarizer 1P, for the same reason why the slow axis of the positive A plate 31A in the first laminate 31 preferably forms an angle of about 90° with the absorption axis of the adjacent polarizer, i.e., the second polarizer 2P, in Embodiment 1-1.

Embodiment 2-4

Figure 11:
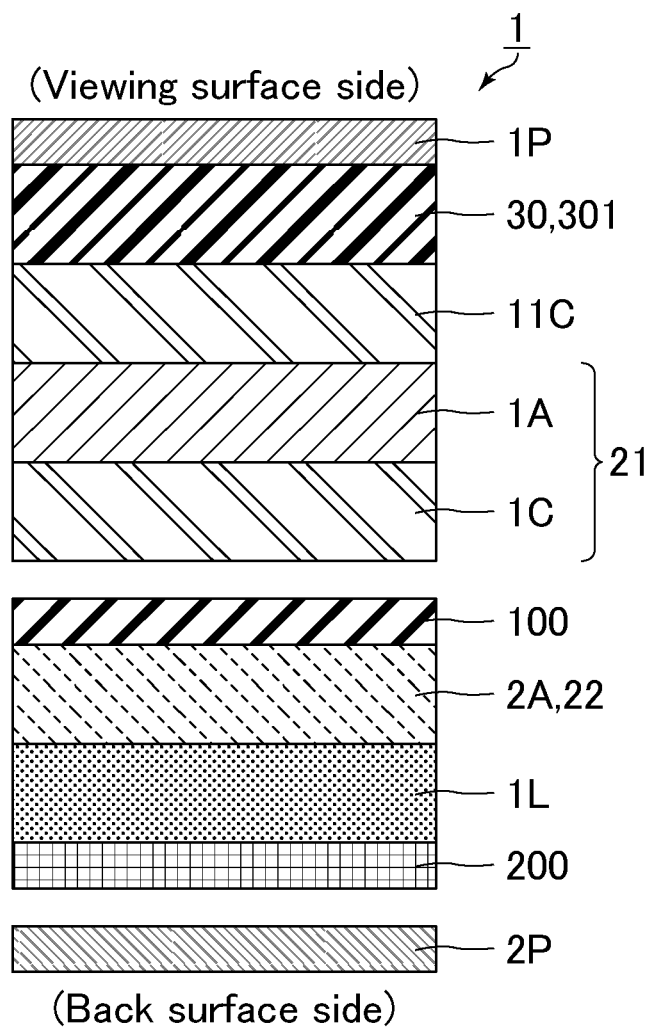
FIG. 11 is a schematic cross-sectional view of a liquid crystal display device of Embodiment 2-4.

FIG. 11 is a schematic cross-sectional view of a liquid crystal display device of Embodiment 2-4. As shown in FIG. 11, the viewing angle compensation layer 30 in a liquid crystal display device 1 of the present embodiment is the λ/2 plate 301 that is used in Embodiment 1-4.

The slow axis of the λ/2 plate 301 preferably forms an angle of about 90° with the absorption axis of the adjacent polarizer, i.e., the first polarizer 1P, for the same reason why the slow axis of the positive A plate 31A in the first laminate 31 preferably forms an angle of about 90° with the absorption axis of the adjacent polarizer, i.e., the second polarizer 2P, in Embodiment 1-1.

Embodiment 3

In the present embodiment, the features unique to the present embodiment are mainly described and the same features as those in the above embodiment are not described again. The liquid crystal display device of the present embodiment has the same structure as the liquid crystal display device 1 of Embodiment 2-1 except that the positive C plate 11C and the positive C plate 31C are integrated into one layer (the later-described positive C plate 12C having a thickness retardation of 130 nm or greater and 160 nm or smaller). The following is description in detail.

Figure 12:
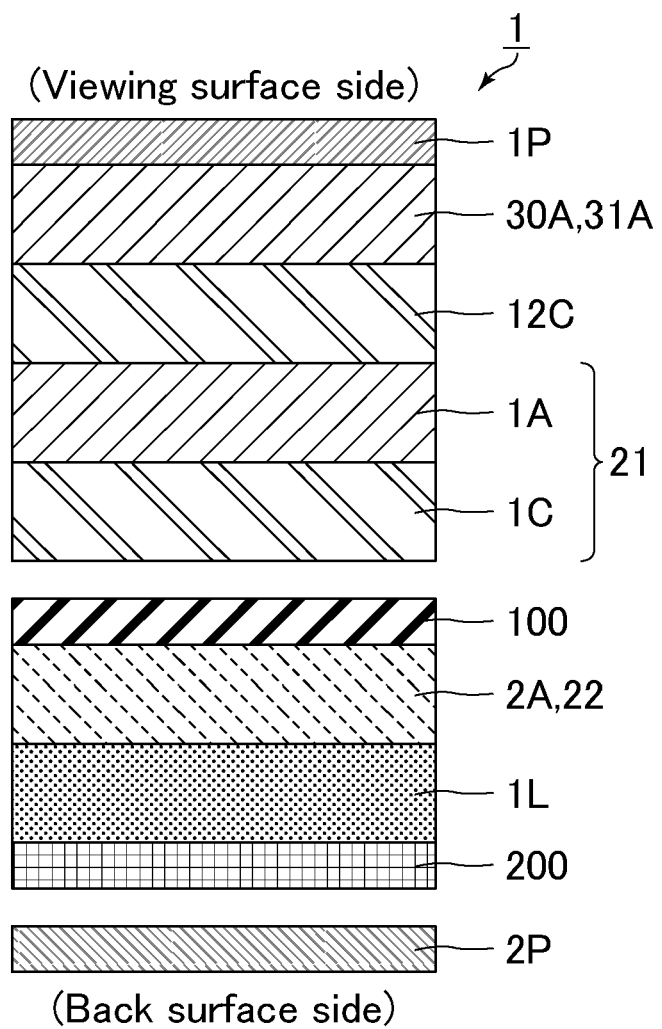
FIG. 12 is a schematic cross-sectional view of a liquid crystal display device of Embodiment 3.

FIG. 12 is a schematic cross-sectional view of a liquid crystal display device of Embodiment 3. As shown in FIG. 12, a liquid crystal display device 1 of the present embodiment includes, in the following order from the viewing surface side, the first polarizer 1P, a viewing angle compensation layer 30A, the first positive A plate 1A having an in-plane retardation of 120 nm or greater and 155 nm or smaller, the positive C plate 1C having a thickness retardation of 80 nm or greater and 100 nm or smaller, the first substrate 100, the second positive A plate 2A having an in-plane retardation of 120 nm or greater and 155 nm or smaller, the horizontally aligned liquid crystal layer 1L, the second substrate 200, and the second polarizer 2P. The viewing angle compensation layer 30A is the positive A plate 31A having an in-plane retardation of 130 nm or greater and 150 nm or smaller. The liquid crystal display device 1 further includes, between the viewing angle compensation layer 30A and the first positive A plate 1A, a positive C plate 12C having a thickness retardation of 130 nm or greater and 160 nm or smaller.

The liquid crystal display device 1 of the present embodiment has the same structure as the liquid crystal display device 1 of Embodiment 2-1 except that the positive C plate 11C and the positive C plate 31C in the liquid crystal display device 1 of Embodiment 2-1 are integrated into the positive C plate 12C. In other words, the liquid crystal display device 1 of the present embodiment is optically equal to the liquid crystal display device 1 of Embodiment 2-1 and, similarly to Embodiment 2-1, can prevent deterioration in fragileness of the out-cell retardation layer 21, reflection of external light, and light leakage when viewed from oblique directions in the black display state. The present embodiment, which employs a structure in which the positive C plate 11C and the positive C plate 31C are integrated, can eliminate an adhesive layer to reduce the thickness of the positive C plate 12C. The present embodiment, which reduces the number of layers laminated and thereby reduces production steps, can also reduce the costs. An increase in the number of layers to be laminated may reduce the yield because of contamination by foreign substances. Such a reduction in yield is avoidable by integrating the positive C plate 11C and the positive C plate 31C and thereby reducing the number of layers laminated.

The positive C plate 12C may be formed by the same method as for the positive C plate 11C.

The positive C plate 12C has a thickness retardation of preferably 132 nm or greater and 158 nm or smaller, more preferably 135 nm or greater and 155 nm or smaller. The positive C plate 12C preferably has an in-plane retardation of substantially 0 nm.

Embodiment 4

In the present embodiment, the features unique to the present embodiment are mainly described and the same features as those in the above embodiment are not described again. The liquid crystal display device of the present embodiment has the same structure as the liquid crystal display device 1 of Embodiment 2-2 except that the positive C plate 11C and the biaxial retardation layer 32T2 are integrated into one layer (the later-described biaxial retardation layer 13C having an in-plane retardation of 50 nm or greater and 70 nm or smaller and an NZ coefficient of −2.0 or greater and −1.6 or smaller). The following is description in detail.

Figure 13:
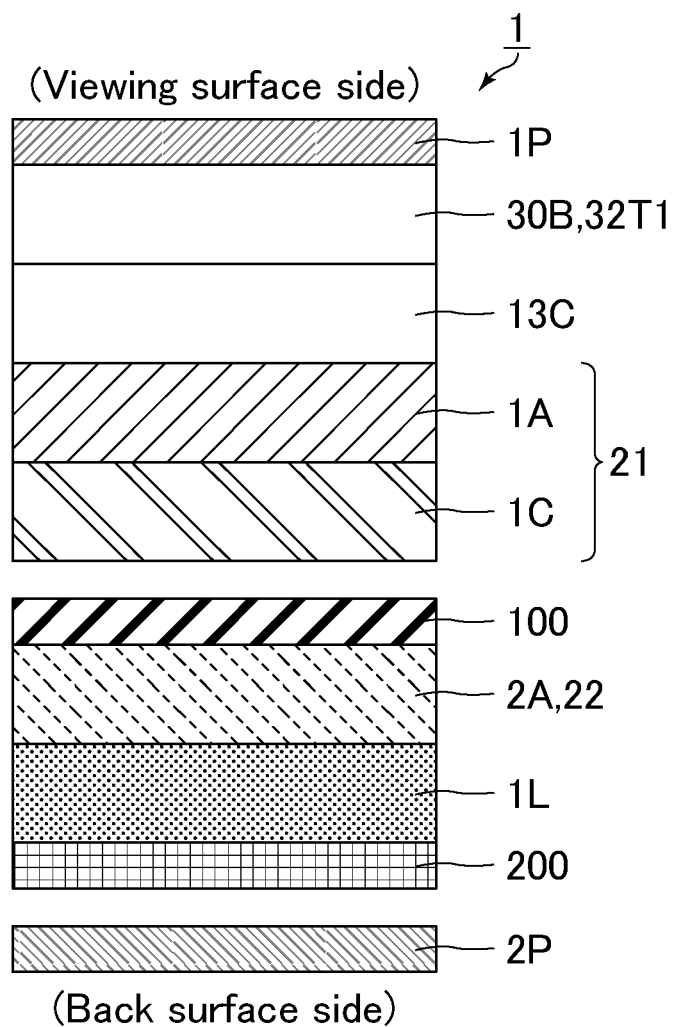
FIG. 13 is a schematic cross-sectional view of a liquid crystal display device of Embodiment 4.

FIG. 13 is a schematic cross-sectional view of a liquid crystal display device of Embodiment 4. As shown in FIG. 13, a liquid crystal display device 1 of the present embodiment includes, in the following order from the viewing surface side, the first polarizer 1P, a viewing angle compensation layer 30B, the first positive A plate 1A having an in-plane retardation of 120 nm or greater and 155 nm or smaller, the positive C plate 1C having a thickness retardation of 80 nm or greater and 100 nm or smaller, the first substrate 100, the second positive A plate 2A having an in-plane retardation of 120 nm or greater and 155 nm or smaller, the horizontally aligned liquid crystal layer 1L, the second substrate 200, and the second polarizer 2P. The viewing angle compensation layer 30B is the biaxial retardation layer 32T1 having an in-plane retardation of 80 nm or greater and 100 nm or smaller and an NZ coefficient of 1.3 or greater and 1.5 or smaller. The device further includes, between the viewing angle compensation layer 30B and the first positive A plate 1A, the biaxial retardation layer 13C having an in-plane retardation of 50 nm or greater and 70 nm or smaller and an NZ coefficient of −2.0 or greater and −1.6 or smaller.

The liquid crystal display device 1 of the present embodiment has the same structure as the liquid crystal display device 1 of Embodiment 2-2 except that the positive C plate 11C and the biaxial retardation layer 32T2 in the liquid crystal display device 1 of Embodiment 2-2 are integrated into the biaxial retardation layer 13C. In other words, the liquid crystal display device 1 of the present embodiment is optically equal to the liquid crystal display device 1 of Embodiment 2-2 and, similarly to Embodiment 2-2, can prevent deterioration in fragileness of the out-cell retardation layer 21, reflection of external light, and light leakage when viewed from oblique directions in the black display state. The present embodiment, which employs a structure in which the positive C plate 11C and the biaxial retardation layer 32T2 are integrated, can eliminate an adhesive layer to reduce the thickness of the biaxial retardation layer 13C. The present embodiment, which reduces the number of layers to be laminated and thereby reduces production steps, can also reduce the costs. An increase in the number of layers to be laminated may reduce the yield because of contamination by foreign substances. Such a reduction in yield is avoidable by integrating the positive C plate 11C and the biaxial retardation layer 32T2 and thereby reducing the number of layers laminated.

The biaxial retardation layer 13C preferably has an in-plane retardation of 52 nm or greater and 68 nm or smaller and an NZ coefficient of −1.95 or greater and −1.65 or smaller, and more preferably has an in-plane retardation of 55 nm or greater and 65 nm or smaller and an NZ coefficient of −1.9 or greater and −1.7 or smaller.

The biaxial retardation layer 13C may be formed by the same method as for the biaxial retardation layer 32T2.

Embodiment 5

In the present embodiment, the features unique to the present embodiment are mainly described and the same features as those in the above embodiment are not described again. The liquid crystal display device of the present embodiment has the same structure as the liquid crystal display device 1 of Embodiment 2-3 except that the positive C plate 11C and the biaxial retardation layer 33T2 are integrated into one layer (the later-described biaxial retardation layer 14C having an in-plane retardation of 10 nm or greater and 30 nm or smaller and an NZ coefficient of −7.5 or greater and −6.5 or smaller). The following is description in detail.

Figure 14:
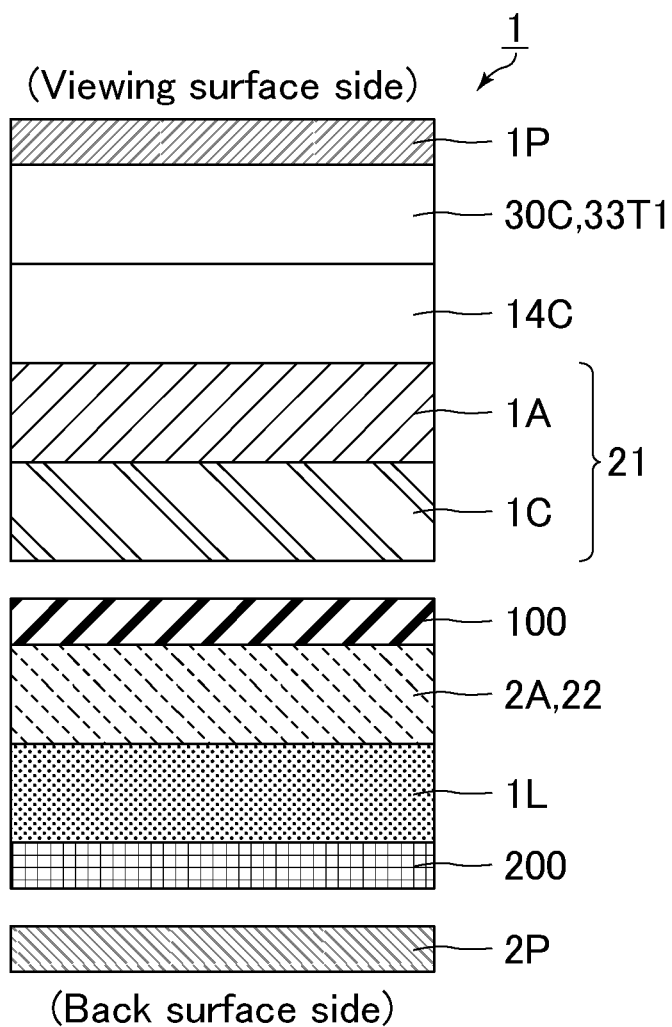
FIG. 14 is a schematic cross-sectional view of a liquid crystal display device of Embodiment 5.

FIG. 14 is a schematic cross-sectional view of a liquid crystal display device of Embodiment 5. As shown in FIG. 14, a liquid crystal display device 1 of the present embodiment includes, in the following order from the viewing surface side, the first polarizer 1P, a viewing angle compensation layer 30C, the first positive A plate 1A having an in-plane retardation of 120 nm or greater and 155 nm or smaller, the positive C plate 1C having a thickness retardation of 80 nm or greater and 100 nm or smaller, the first substrate 100, the second positive A plate 2A having an in-plane retardation of 120 nm or greater and 155 nm or smaller, the horizontally aligned liquid crystal layer 1L, the second substrate 200, and the second polarizer 2P. The viewing angle compensation layer 30C is the biaxial retardation layer 33T1 having an in-plane retardation of 100 nm or greater and 130 nm or smaller and an NZ coefficient of 1.1 or greater and 1.3 or smaller. The device further includes, between the viewing angle compensation layer 30C and the first positive A plate 1A, the biaxial retardation layer 14C having an in-plane retardation of 10 nm or greater and 30 nm or smaller and an NZ coefficient of −7.5 or greater and −6.5 or smaller.

The liquid crystal display device 1 of the present embodiment has the same structure as the liquid crystal display device 1 of Embodiment 2-3 except that the positive C plate 11C and the biaxial retardation layer 33T2 in the liquid crystal display device 1 of Embodiment 2-3 are integrated into the biaxial retardation layer 14C. In other words, the liquid crystal display device 1 of the present embodiment is optically equal to the liquid crystal display device 1 of Embodiment 2-3 and, similarly to Embodiment 2-3, can prevent deterioration in fragileness of the out-cell retardation layer 21, reflection of external light, and light leakage when viewed from oblique directions in the black display state. The present embodiment, which employs a structure in which the positive C plate 11C and the biaxial retardation layer 33T2 are integrated, can eliminate an adhesive layer to reduce the thickness of the biaxial retardation layer 14C. The present embodiment, which reduces the number of layers to be laminated and thereby reduces production steps, can also reduce the costs. An increase in the number of layers to be laminated may reduce the yield because of contamination by foreign substances. Such a reduction in yield is avoidable by integrating the positive C plate 11C and the biaxial retardation layer 33T2 and thereby reducing the number of layers laminated.

The biaxial retardation layer 14C preferably has an in-plane retardation of 12 nm or greater and 28 nm or smaller and an NZ coefficient of −7.4 or greater and −6.6 or smaller, and more preferably has an in-plane retardation of 15 nm or greater and 25 nm or smaller and an NZ coefficient of −7.3 or greater and −6.7 or smaller.

The biaxial retardation layer 14C may be formed by the same method as for the biaxial retardation layer 32T2.

The present invention is described below in more detail based on examples and comparative examples. The examples, however, are not intended to limit the scope of the present invention.

Example 1

Figure 15:
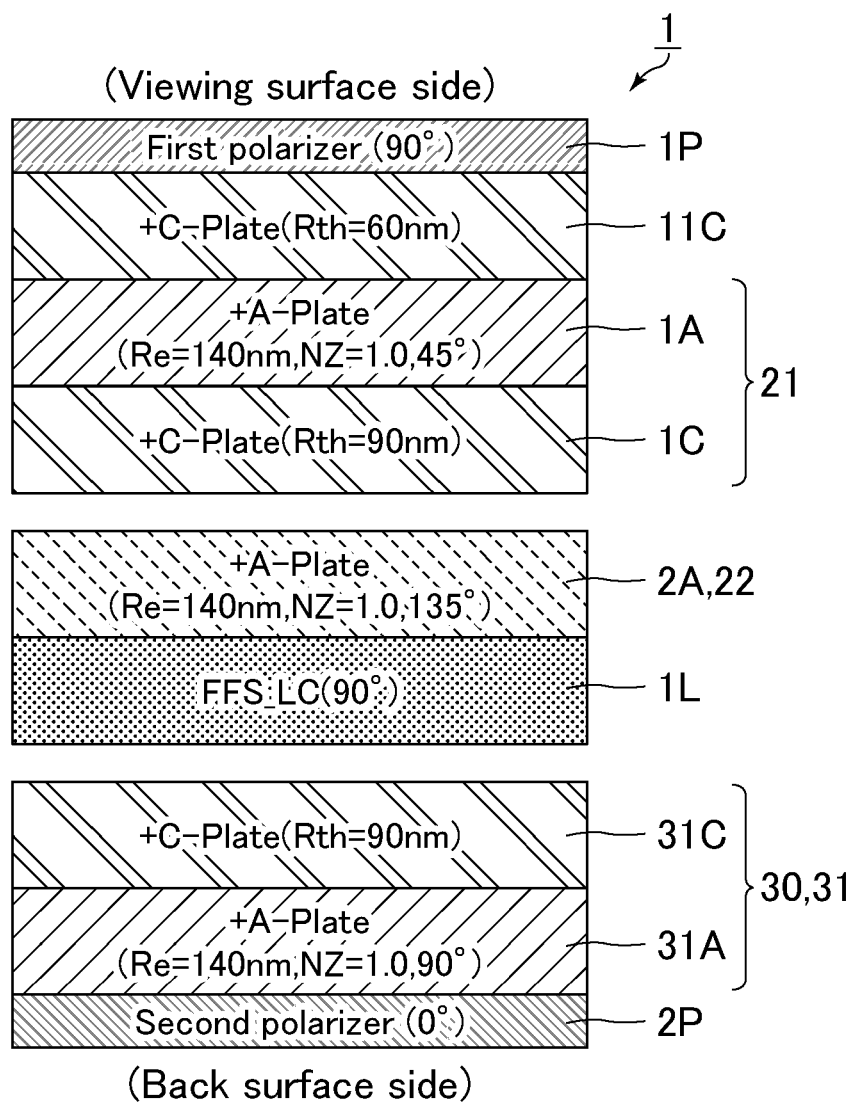
FIG. 15 is a schematic cross-sectional view of a liquid crystal display device of Example 1.

FIG. 15 is a schematic cross-sectional view of a liquid crystal display device of Example 1. In Example 1, a liquid crystal display device 1 having the same structure as in Embodiment 1-1 was discussed. In the schematic cross-sectional views of the examples and comparative examples of the description, the "+A-Plate" means a positive A plate, the "+C-Plate" means a positive C plate, the "FFS-LC" means a FFS mode liquid crystal layer that is a horizontally aligned liquid crystal layer, the angles of the first and second polarizers indicate the azimuth angles of their absorption axes, the angle of the liquid crystal layer indicates the alignment azimuth of liquid crystal molecules in the black display state, and the angles of the other layers indicate the azimuth angles of their slow axes.

Figure 16:
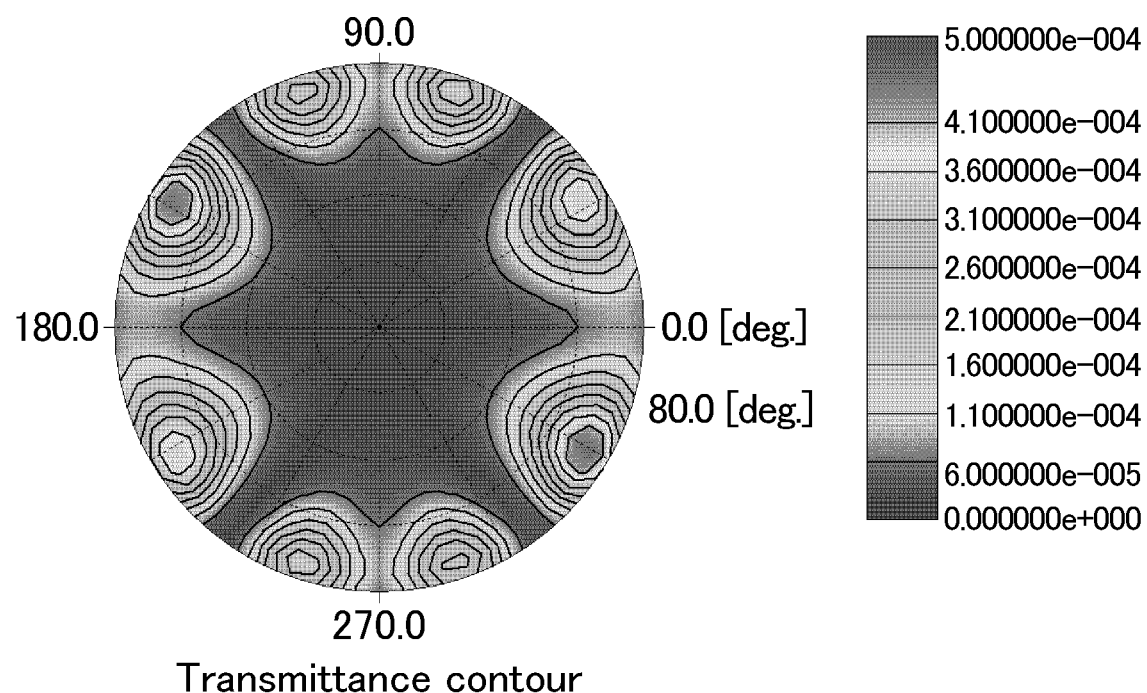
FIG. 16 is a simulation result of the transmittance viewing angle in the black display state of the liquid crystal display device of Example 1.

In the liquid crystal display device 1 of Example 1, having the structure as shown in FIG. 15, the transmittance viewing angle in the black display state with light having a wavelength of 550 nm was simulated at all the azimuths within the range of the polar angle of 0° to 80°, using a LCD-Master available from Shintec Co., Ltd. FIG. 16 is a simulation result of the transmittance viewing angle in the black display state of the liquid crystal display device of Example 1.

Example 2

Figure 17:
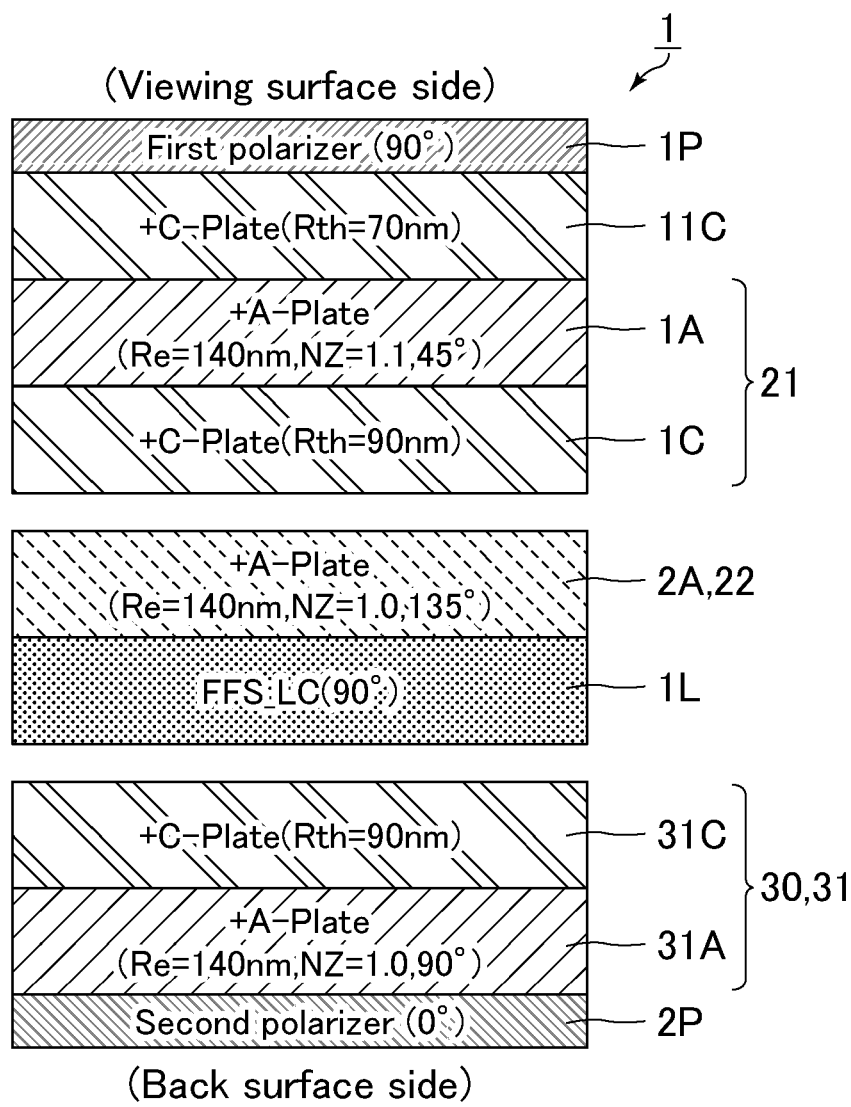
FIG. 17 is a schematic cross-sectional view of a liquid crystal display device of Example 2.
Figure 18:
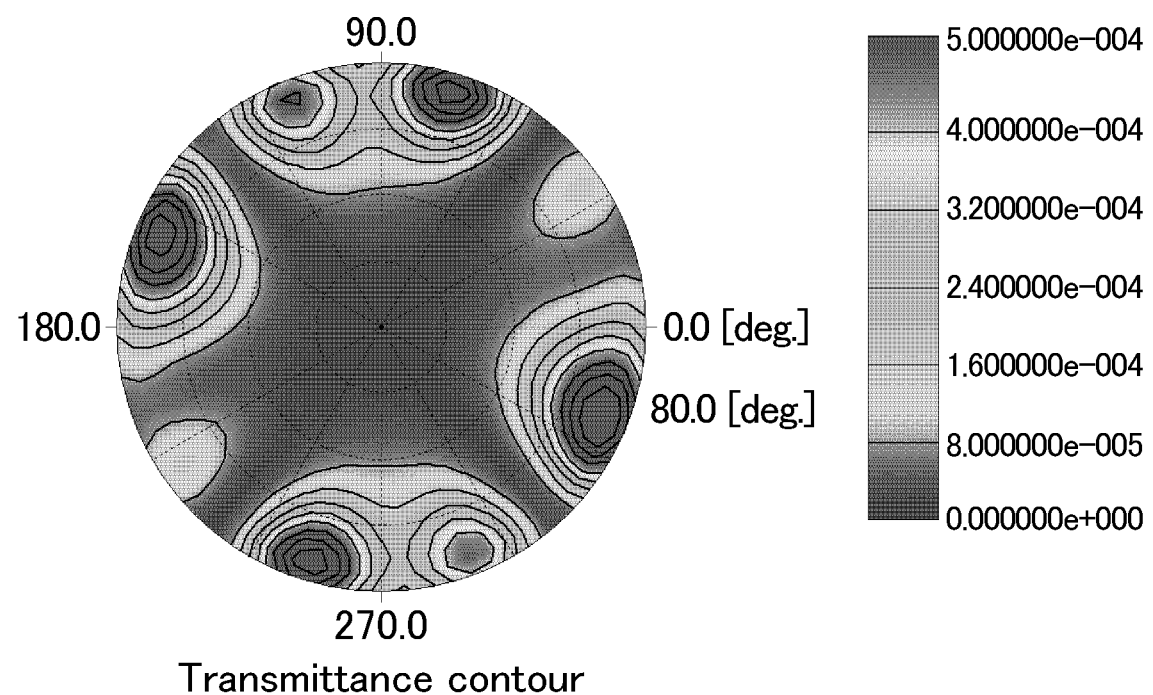
FIG. 18 is a simulation result of the transmittance viewing angle in the black display state of the liquid crystal display device of Example 2.

FIG. 17 is a schematic cross-sectional view of a liquid crystal display device of Example 2. In Example 2, the transmittance viewing angle in the black display state was simulated for a liquid crystal display device 1 having the same structure as in Embodiment 1-1 in the same manner as in Example 1. FIG. 18 is a simulation result of the transmittance viewing angle in the black display state of the liquid crystal display device of Example 2.

Comparative Example 1

Figure 39:
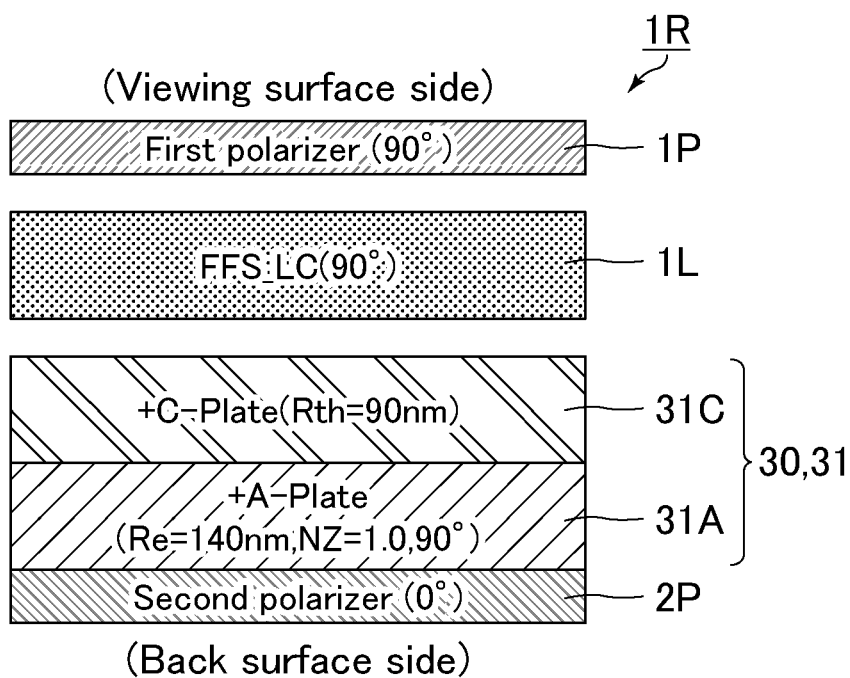
FIG. 39 is a schematic cross-sectional view of a liquid crystal display device of Comparative Example 1.
Figure 40:
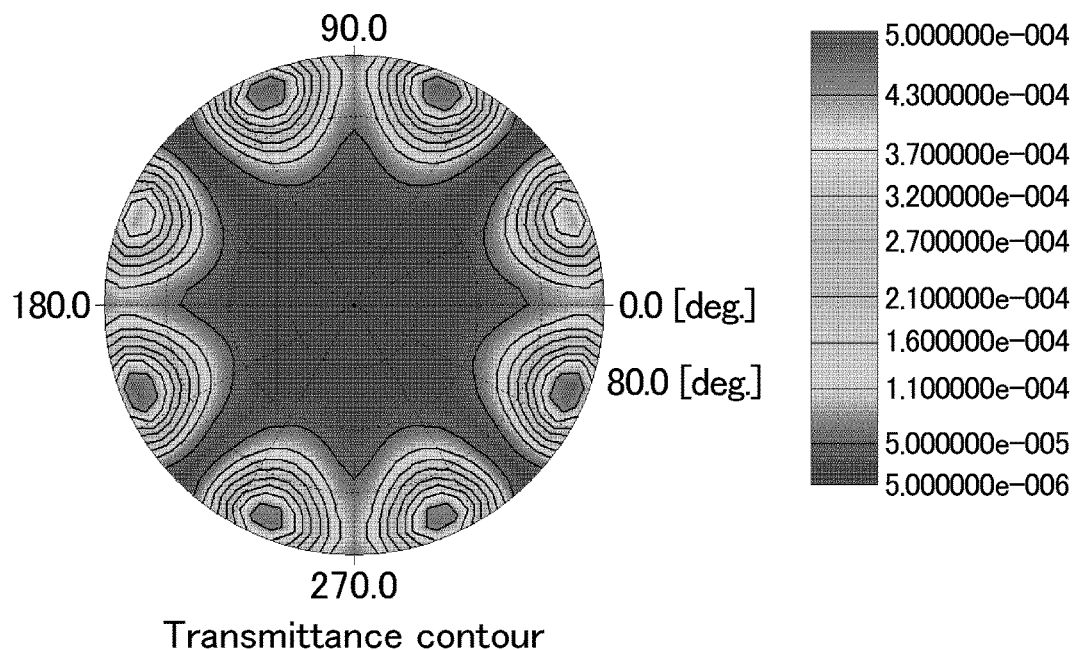
FIG. 40 is a simulation result of the transmittance viewing angle in the black display state of the liquid crystal display device of Comparative Example 1.

FIG. 39 is a schematic cross-sectional view of a liquid crystal display device of Comparative Example 1. A liquid crystal display device 1R of Comparative Example 1 has the same structure as the liquid crystal display devices 1 of Examples 1 and 2 except that the device does not include the out-cell retardation layer 21, the in-cell retardation layer 22, and the positive C plate 11C. The transmittance viewing angle in the black display state was simulated for the liquid crystal display device 1R of Comparative Example 1 in the same manner as in Example 1. FIG. 40 is a simulation result of the transmittance viewing angle in the black display state of the liquid crystal display device of Comparative Example 1.

Comparative Example 2

Figure 41:
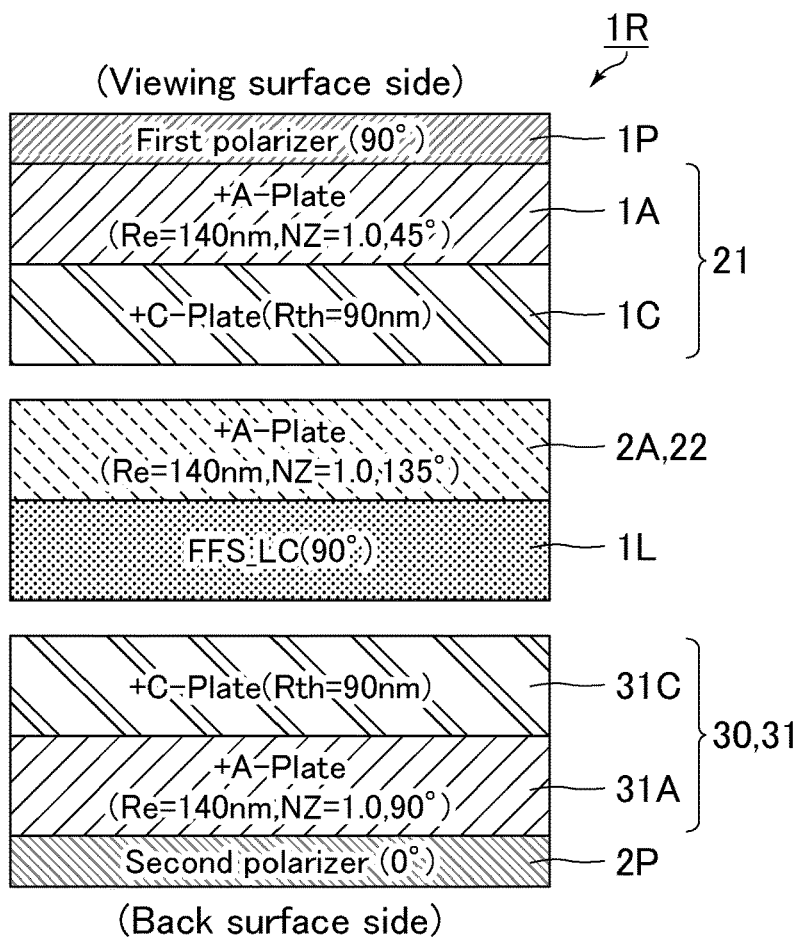
FIG. 41 is a schematic cross-sectional view of a liquid crystal display device of Comparative Example 2.
Figure 42:
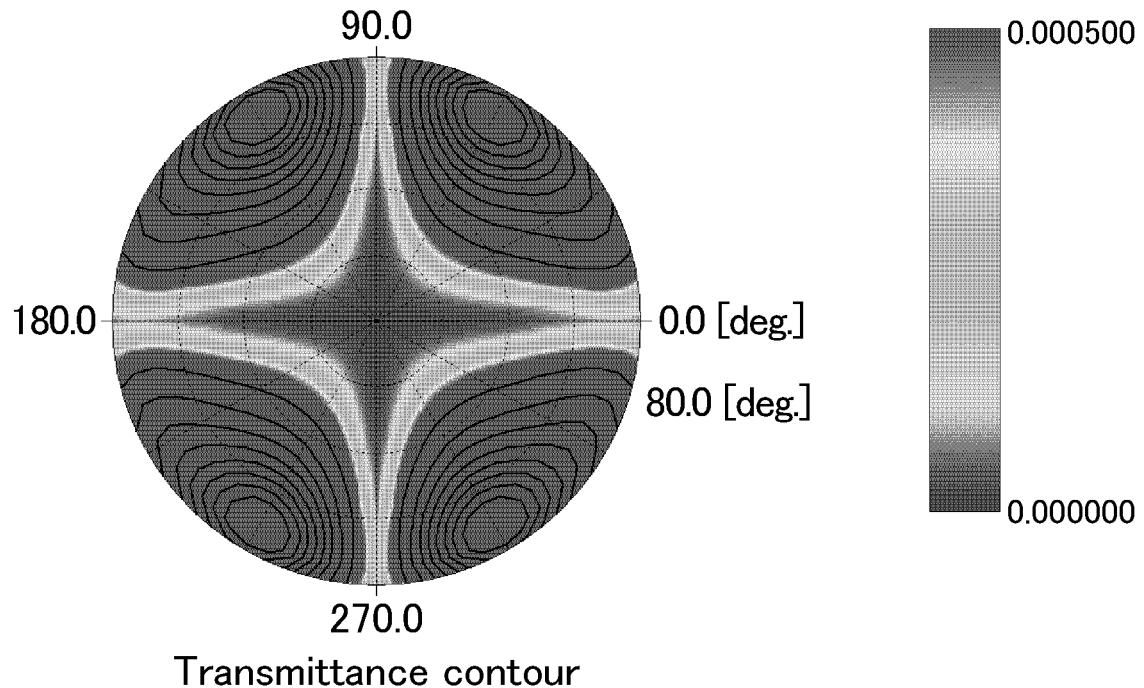
FIG. 42 is a simulation result of the transmittance viewing angle in the black display state of the liquid crystal display device of Comparative Example 2.

FIG. 41 is a schematic cross-sectional view of a liquid crystal display device of Comparative Example 2. A liquid crystal display device 1R of Comparative Example 2 has the same structure as the liquid crystal display devices 1 of Examples 1 and 2 except that the device does not include the positive C plate 11C. The transmittance viewing angle in the black display state was simulated for the liquid crystal display device 1R of Comparative Example 2 in the same manner as in Example 1. FIG. 42 is a simulation result of the transmittance viewing angle in the black display state of the liquid crystal display device of Comparative Example 2.
(Comparison Between Examples 1 and 2 and Comparative Examples 1 and 2)

As shown in FIG. 40, the liquid crystal display device 1R of Comparative Example 1 suppresses light leakage when viewed from oblique directions to achieve a good contrast ratio viewing angle. Unfortunately, the liquid crystal display device 1R does not include an out-cell retardation layer and an in-cell retardation layer and thus cannot suppress reflection of external light. In contrast, the liquid crystal display device 1R of Comparative Example 2 includes the out-cell retardation layer 21 and the in-cell retardation layer 22 to suppress reflection of external light. Unfortunately, as shown in FIG. 42, the device causes a large amount of light leakage when viewed from oblique directions (particularly around positions with a polar angle θ=60° and an azimuth angle φ=45°, 135°, 225°, or 315°) in the black display state to reduce the contrast ratio viewing angle.

The liquid crystal display devices 1 of Examples 1 and 2, each of which includes the out-cell retardation layer 21 and the in-cell retardation layer 22, can suppress reflection of external light and light leakage when viewed from oblique directions in the black display state as shown in FIG. 16 and FIG. 18. As described above, a typical horizontally aligned liquid crystal display device including an out-cell retardation layer and an in-cell retardation layer causes light leakage when viewed from oblique directions in the black display state to reduce the CR viewing angle in the black display state. Fortunately, the liquid crystal display devices 1 of Examples 1 and 2 achieved a good contrast ratio viewing angle like in the case of a horizontally aligned liquid crystal display device (liquid crystal display device of Comparative Example 1) without an out-cell retardation layer and an in-cell retardation layer. This is presumably an effect given by disposing the positive C plate 11C in addition to the viewing angle compensation layer 30.

Example 3

Figure 19:
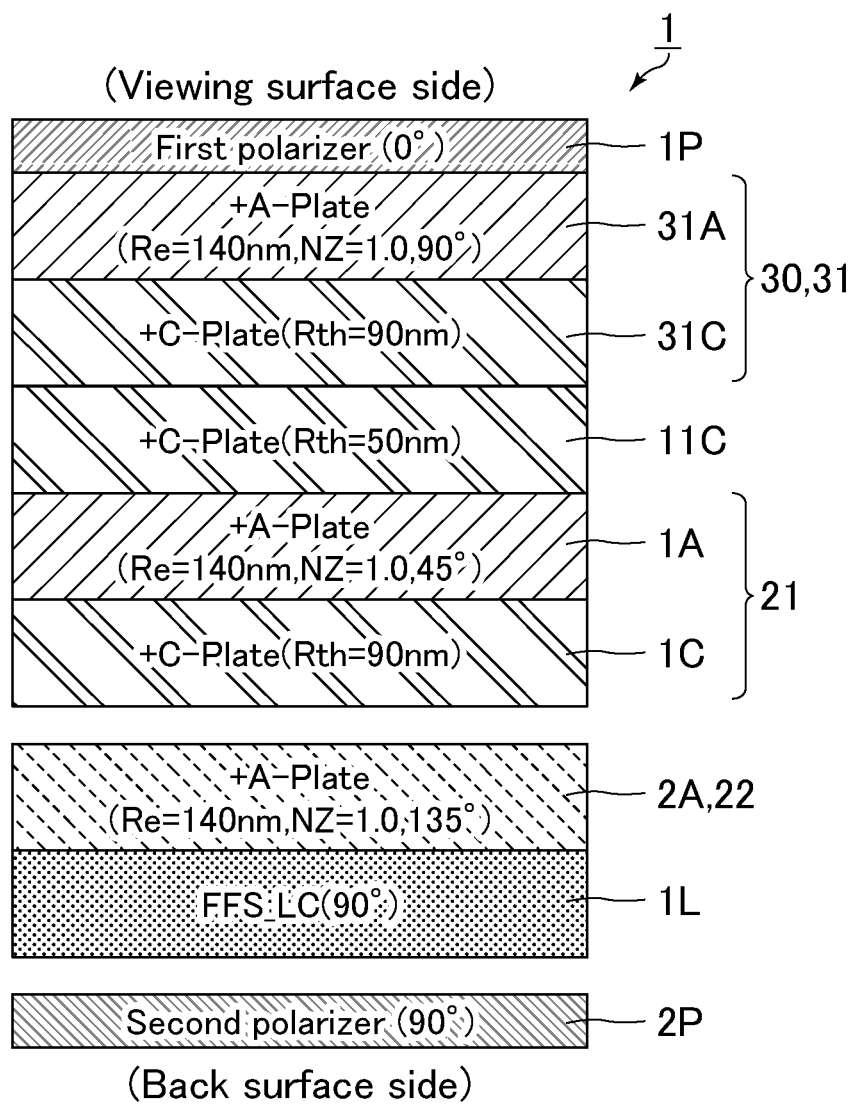
FIG. 19 is a schematic cross-sectional view of a liquid crystal display device of Example 3.
Figure 20:
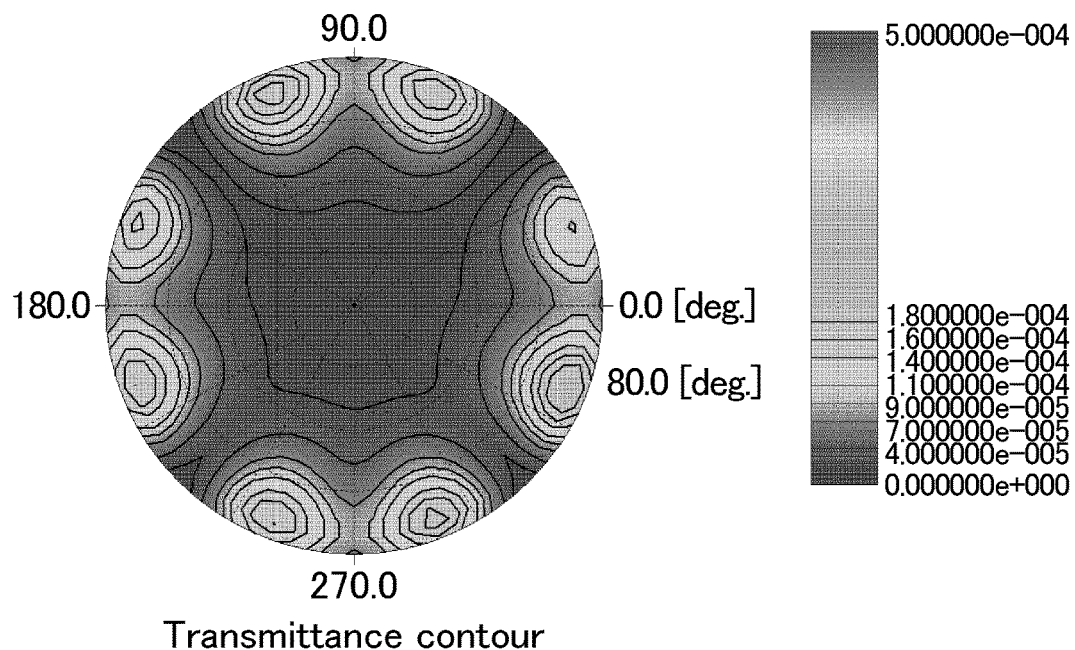
FIG. 20 is a simulation result of the transmittance viewing angle in the black display state of the liquid crystal display device of Example 3.

FIG. 19 is a schematic cross-sectional view of a liquid crystal display device of Example 3. In Example 3, the transmittance viewing angle in the black display state was simulated for a liquid crystal display device 1 having the same structure as in Embodiment 2-1 in the same manner as in Example 1. FIG. 20 is a simulation result of the transmittance viewing angle in the black display state of the liquid crystal display device of Example 3.

Example 4

Figure 21:
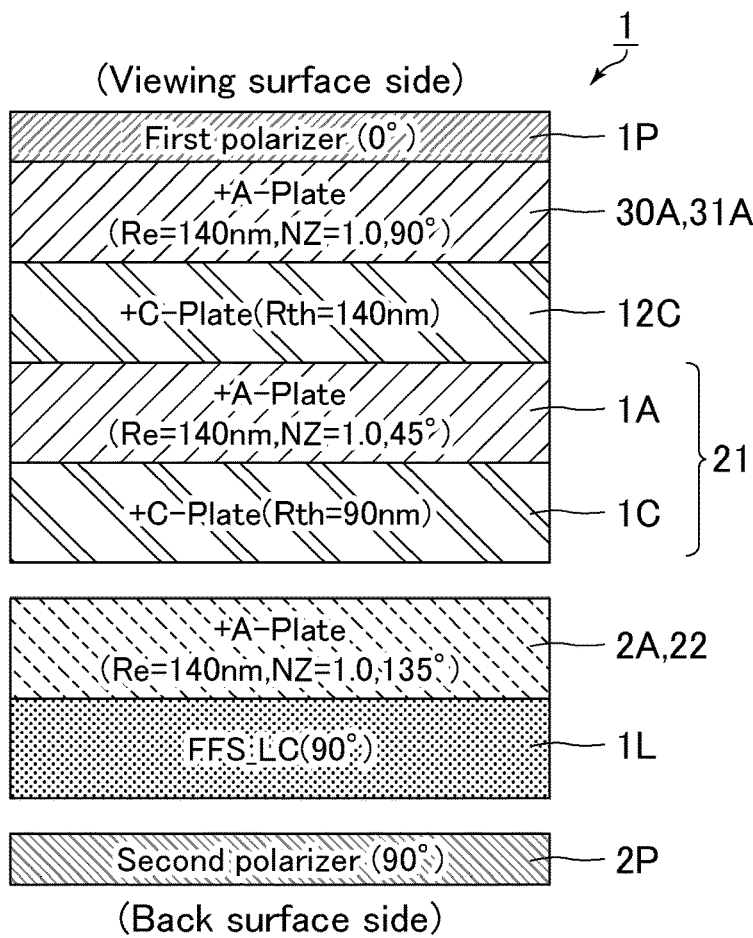
FIG. 21 is a schematic cross-sectional view of a liquid crystal display device of Example 4.
Figure 22:
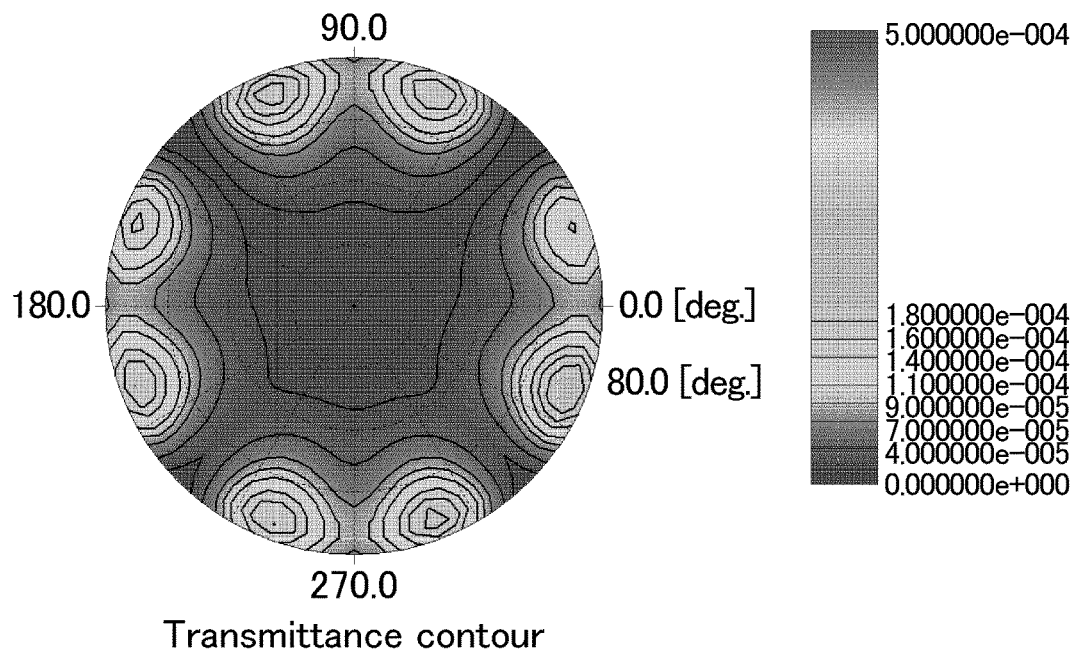
FIG. 22 is a simulation result of the transmittance viewing angle in the black display state of the liquid crystal display device of Example 4.

FIG. 21 is a schematic cross-sectional view of a liquid crystal display device of Example 4. In Example 4, the transmittance viewing angle in the black display state was simulated for a liquid crystal display device 1 having the same structure as in Embodiment 3 in the same manner as in Example 1. FIG. 22 is a simulation result of the transmittance viewing angle in the black display state of the liquid crystal display device of Example 4.

Example 5

Figure 23:
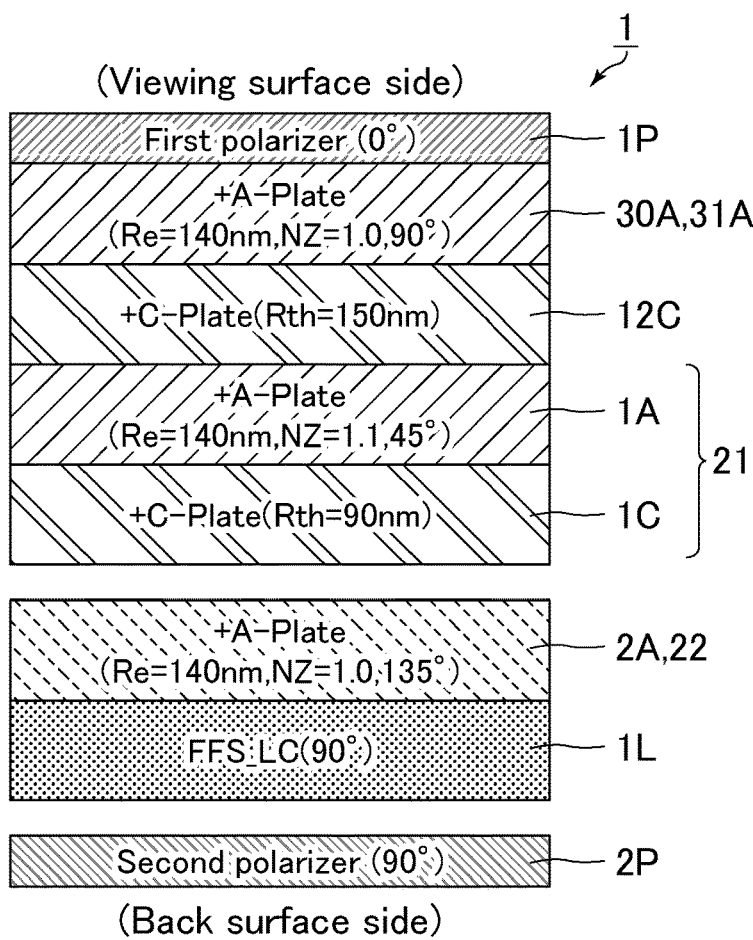
FIG. 23 is a schematic cross-sectional view of a liquid crystal display device of Example 5.
Figure 24:
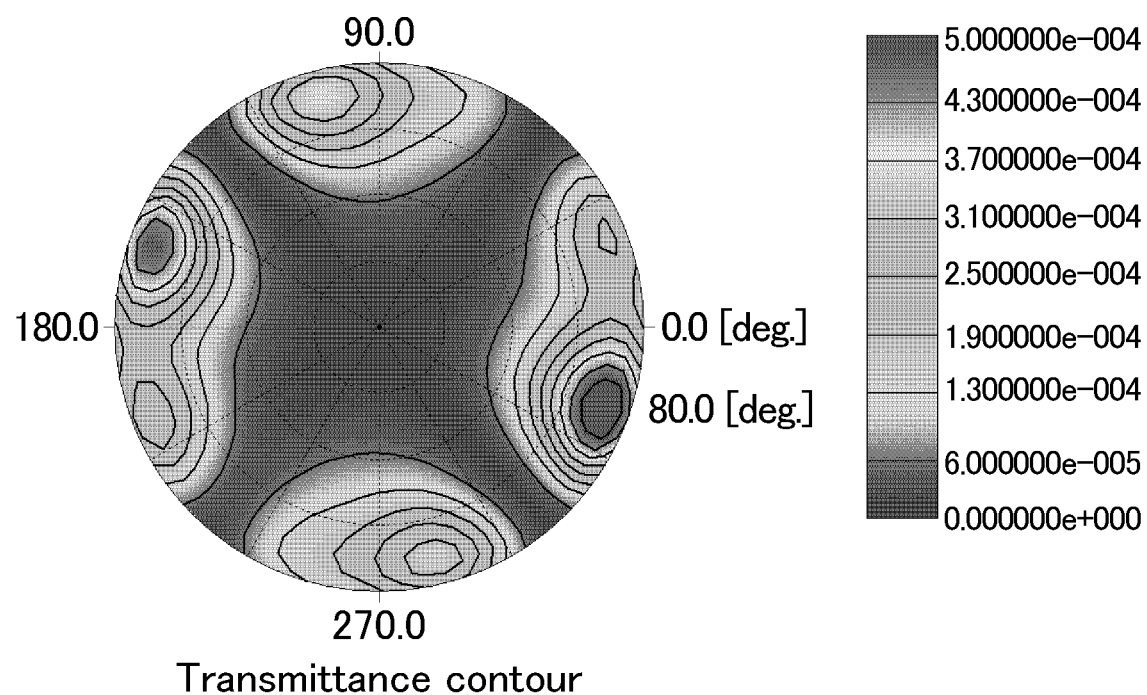
FIG. 24 is a simulation result of the transmittance viewing angle in the black display state of the liquid crystal display device of Example 5.

FIG. 23 is a schematic cross-sectional view of a liquid crystal display device of Example 5. In Example 5, the transmittance viewing angle in the black display state was simulated for a liquid crystal display device 1 having the same structure as in Embodiment 3 in the same manner as in Example 1. FIG. 24 is a simulation result of the transmittance viewing angle in the black display state of the liquid crystal display device of Example 5.

Comparative Example 3

Figure 43:
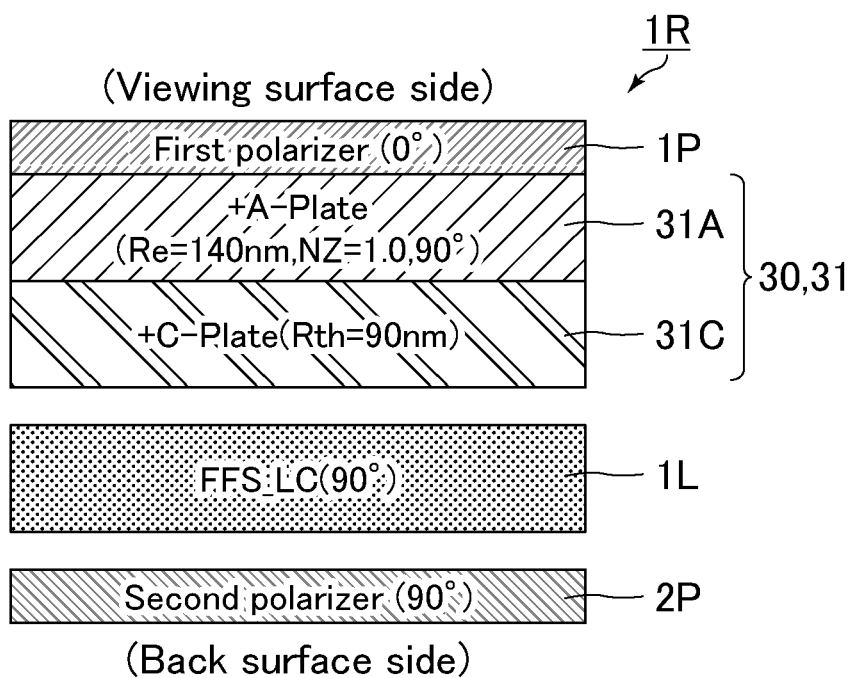
FIG. 43 is a schematic cross-sectional view of a liquid crystal display device of Comparative Example 3.
Figure 44:
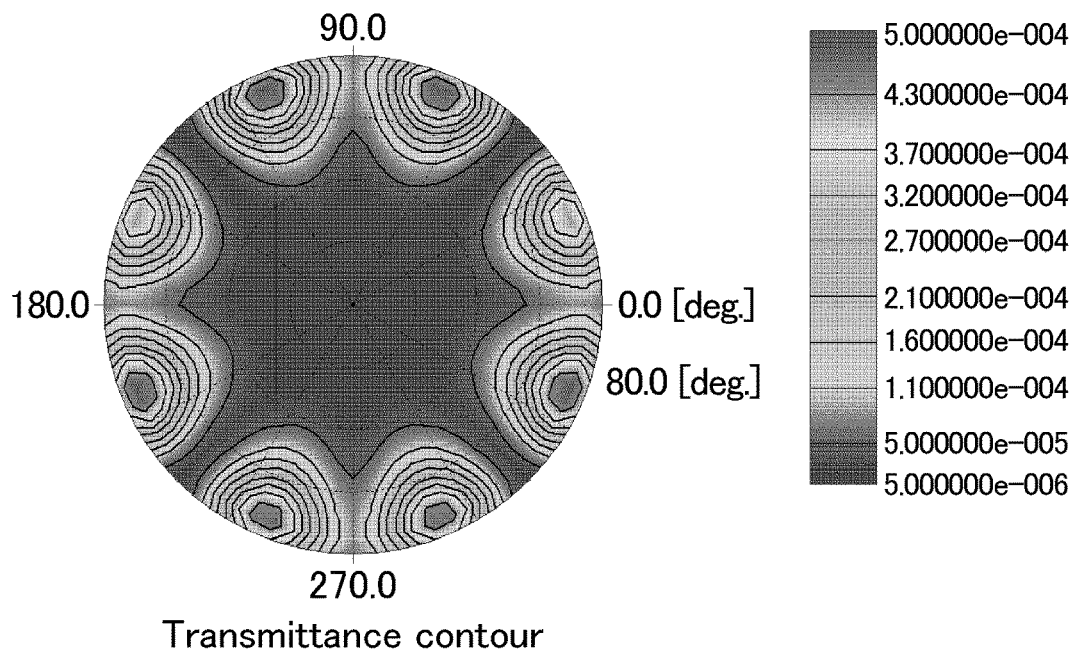
FIG. 44 is a simulation result of the transmittance viewing angle in the black display state of the liquid crystal display device of Comparative Example 3.

FIG. 43 is a schematic cross-sectional view of a liquid crystal display device of Comparative Example 3. A liquid crystal display device 1R of Comparative Example 3 has the same structure as the liquid crystal display device 1 of Example 3 except that the device does not include the out-cell retardation layer 21, the in-cell retardation layer 22, and the positive C plate 11C. The transmittance viewing angle in the black display state was simulated for the liquid crystal display device 1R of Comparative Example 3 in the same manner as in Example 1. FIG. 44 is a simulation result of the transmittance viewing angle in the black display state of the liquid crystal display device of Comparative Example 3.

Comparative Example 4

Figure 45:
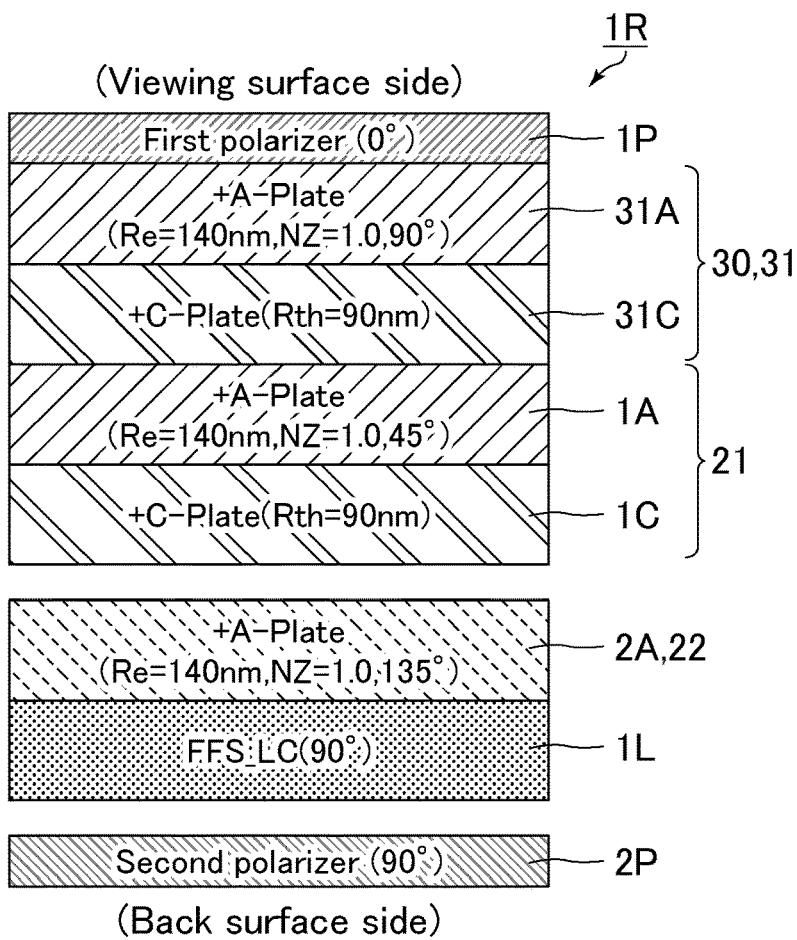
FIG. 45 is a schematic cross-sectional view of a liquid crystal display device of Comparative Example 4.
Figure 46:
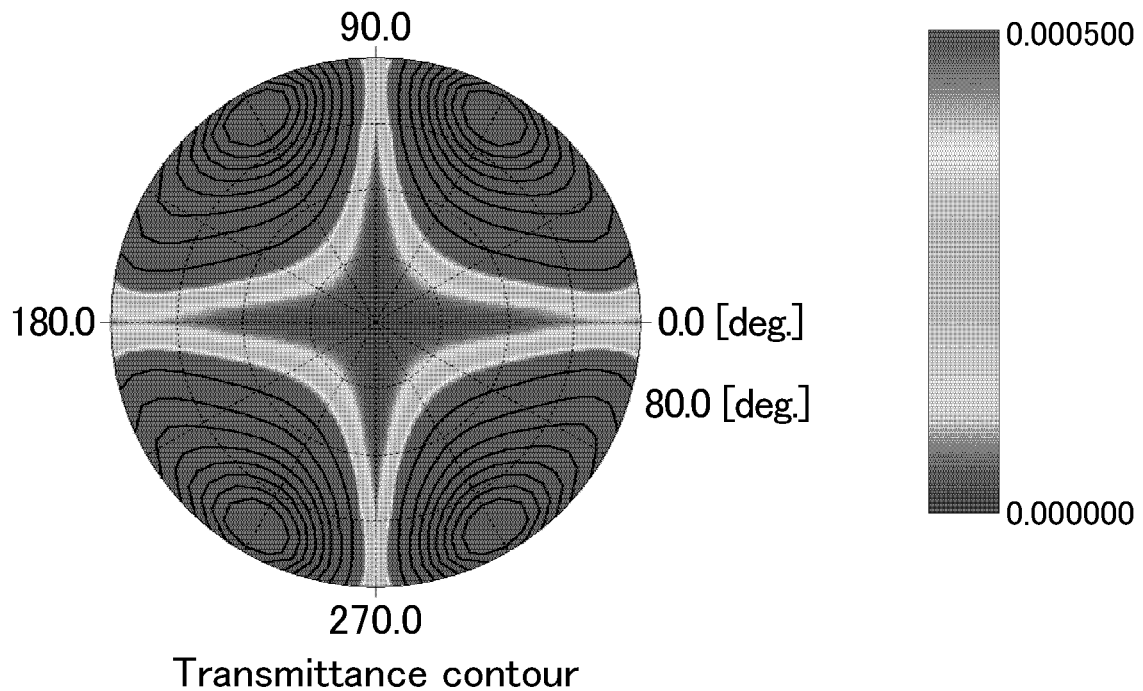
FIG. 46 is a simulation result of the transmittance viewing angle in the black display state of the liquid crystal display device of Comparative Example 4.

FIG. 45 is a schematic cross-sectional view of a liquid crystal display device of Comparative Example 4. A liquid crystal display device 1R of Comparative Example 4 has the same structure as the liquid crystal display device 1 of Example 3 except that the device does not include the positive C plate 11C. The transmittance viewing angle in the black display state was simulated for the liquid crystal display device 1R of Comparative Example 4 in the same manner as in Example 1. FIG. 46 is a simulation result of the transmittance viewing angle in the black display state of the liquid crystal display device of Comparative Example 4.
(Comparison Between Examples 3 to 5 and Comparative Examples 3 and 4)

As shown in FIG. 44, the liquid crystal display device 1R of Comparative Example 3 suppresses light leakage when viewed from oblique directions to achieve a good contrast ratio viewing angle. Unfortunately, the liquid crystal display device 1R does not include an out-cell retardation layer and an in-cell retardation layer and thus cannot suppress reflection of external light. In contrast, the liquid crystal display device 1R of Comparative Example 4 includes the out-cell retardation layer 21 and the in-cell retardation layer 22 to suppress reflection of external light. Unfortunately, as shown in FIG. 46, the device causes a large amount of light leakage when viewed from oblique directions (particularly around positions with a polar angle θ=60° and an azimuth angle φ=45°, 135°, 225°, or 315°) in the black display state to reduce the contrast ratio viewing angle.

The liquid crystal display devices 1 of Examples 3 to 5, each of which includes the out-cell retardation layer 21 and the in-cell retardation layer 22, can suppress reflection of external light and light leakage when viewed from oblique directions in the black display state as shown in FIG. 20, FIG. 22, and FIG. 24. As described above, a typical horizontally aligned liquid crystal display device including an out-cell retardation layer and an in-cell retardation layer causes light leakage when viewed from oblique directions in the black display state to reduce the CR viewing angle in the black display state. Fortunately, the liquid crystal display devices 1 of Examples 3 to 5 achieved a good contrast ratio viewing angle like in the case of a horizontally aligned liquid crystal display device (liquid crystal display device of Comparative Example 3) without an out-cell retardation layer and an in-cell retardation layer. This is presumably an effect given by disposing the positive C plate 11C in addition to the viewing angle compensation layer 30. Example 3 employs the positive C plate 11C disposed separately from the viewing angle compensation layer 30. Example 4 employs the positive C plate 12C in which the positive C plate 31C included in the viewing angle compensation layer 30 of Example 3 and the positive C plate 11C are integrated. These examples show that light leakage when viewed from oblique directions in the black display state can be suppressed both in the case of disposing the positive C plate 11C separately from the viewing angle compensation layer 30 and in the case of disposing the positive C plate 11C integrated with a layer of the viewing angle compensation layer 30.

Example 6

Figure 25:
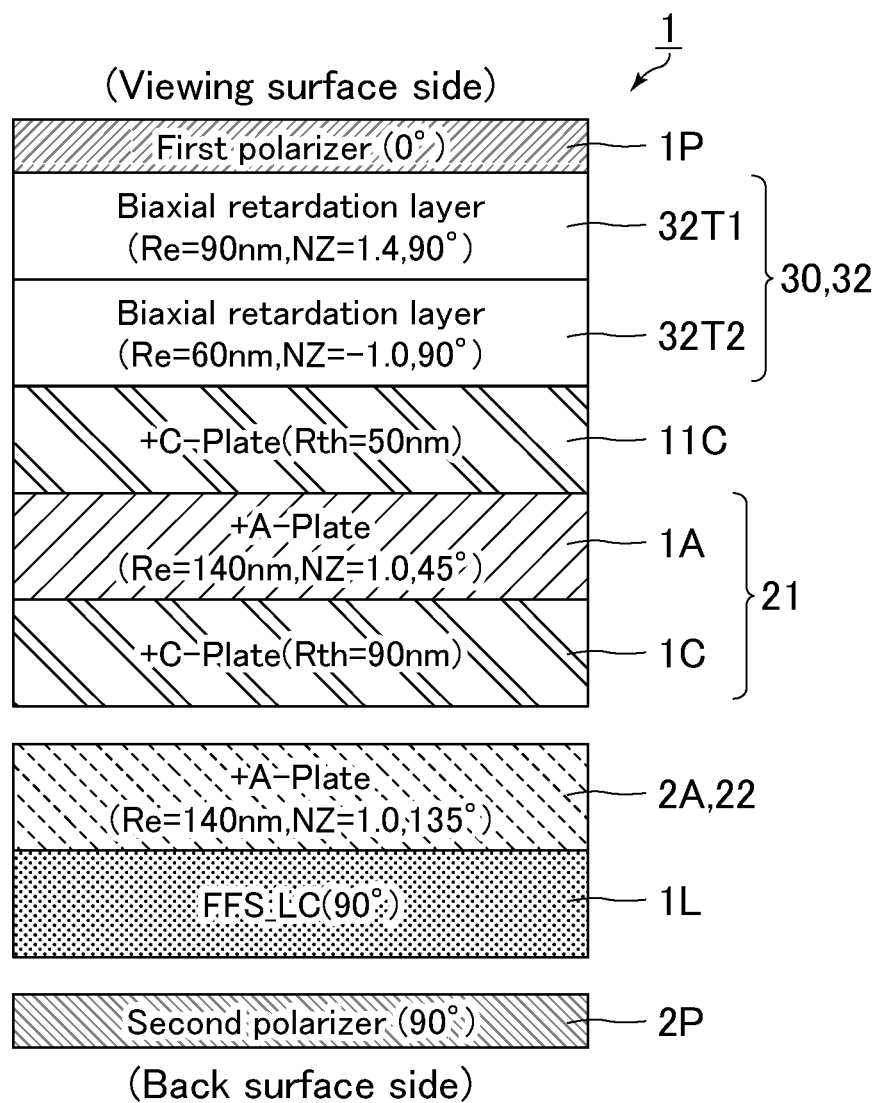
FIG. 25 is a schematic cross-sectional view of a liquid crystal display device of Example 6.
Figure 26:
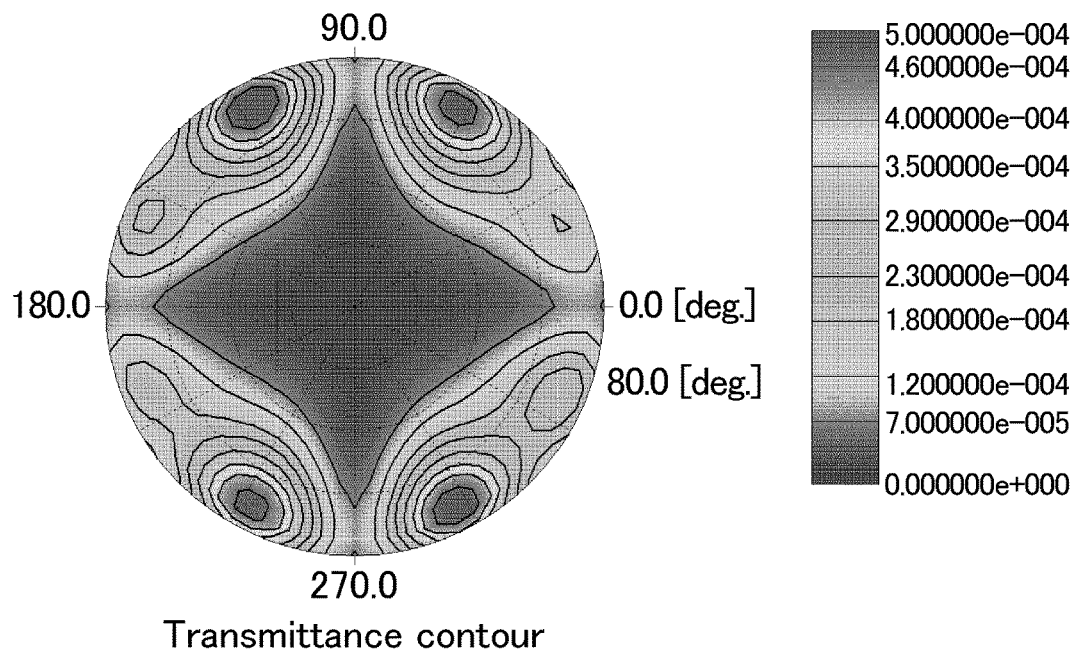
FIG. 26 is a simulation result of the transmittance viewing angle in the black display state of the liquid crystal display device of Example 6.

FIG. 25 is a schematic cross-sectional view of a liquid crystal display device of Example 6. In Example 6, the transmittance viewing angle in the black display state was simulated for a liquid crystal display device 1 having the same structure as in Embodiment 2-2 in the same manner as in Example 1. FIG. 26 is a simulation result of the transmittance viewing angle in the black display state of the liquid crystal display device of Example 6.

Example 7

Figure 27:
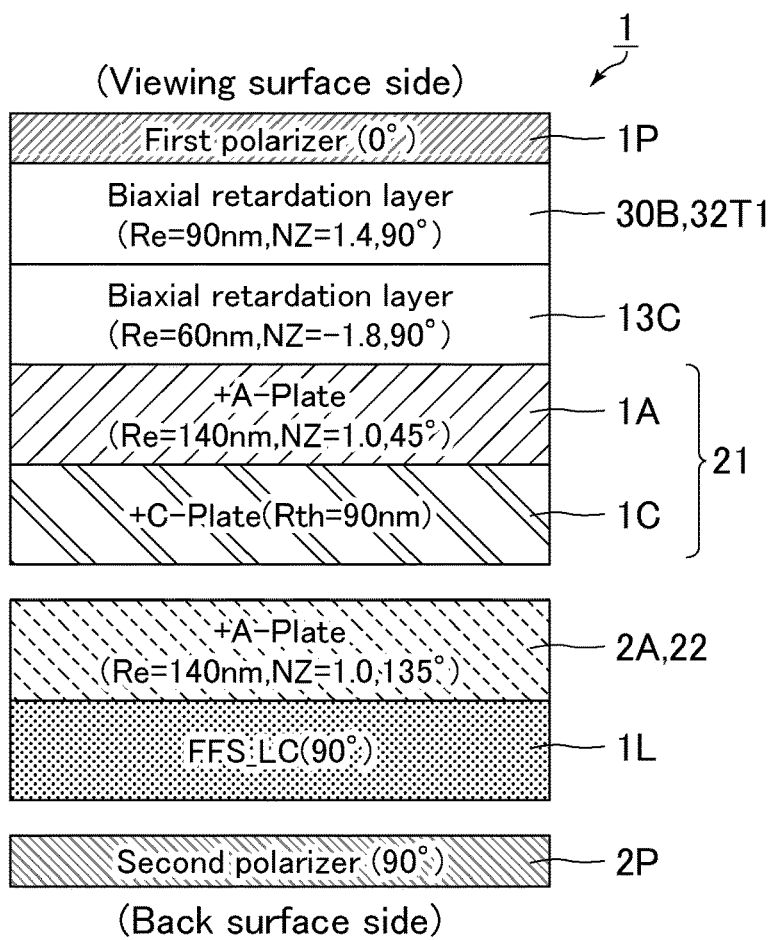
FIG. 27 is a schematic cross-sectional view of a liquid crystal display device of Example 7.
Figure 28:
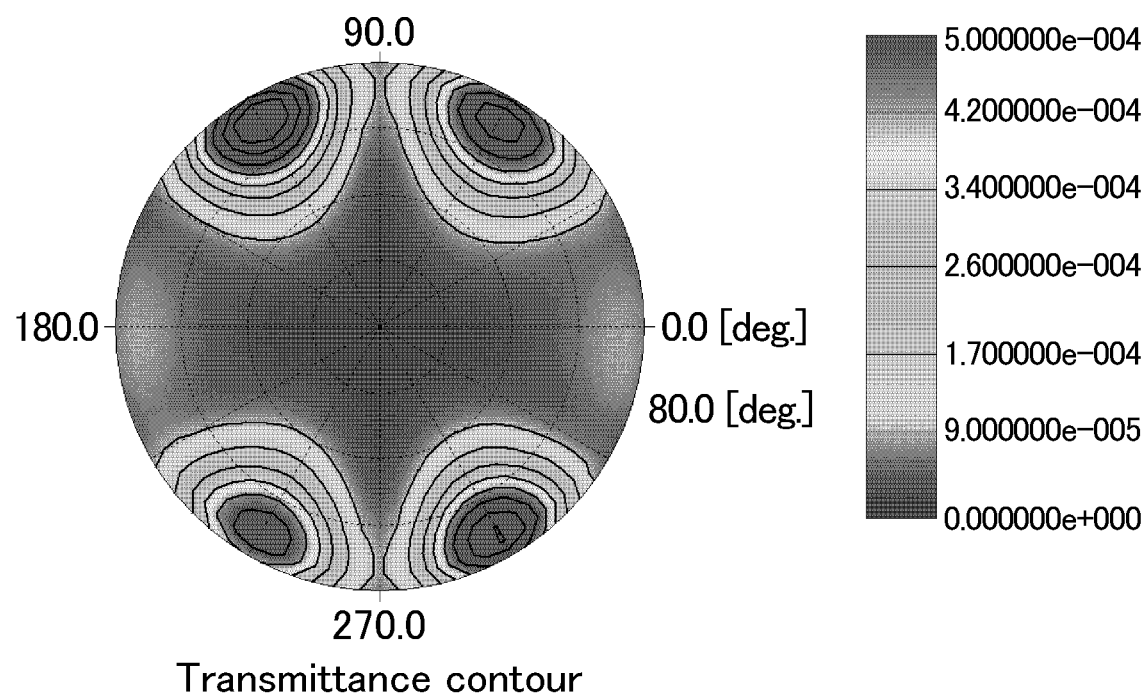
FIG. 28 is a simulation result of the transmittance viewing angle in the black display state of the liquid crystal display device of Example 7.

FIG. 27 is a schematic cross-sectional view of a liquid crystal display device of Example 7. In Example 7, the transmittance viewing angle in the black display state was simulated for a liquid crystal display device 1 having the same structure as in Embodiment 4 in the same manner as in Example 1. FIG. 28 is a simulation result of the transmittance viewing angle in the black display state of the liquid crystal display device of Example 7.

Comparative Example 5

Figure 47:
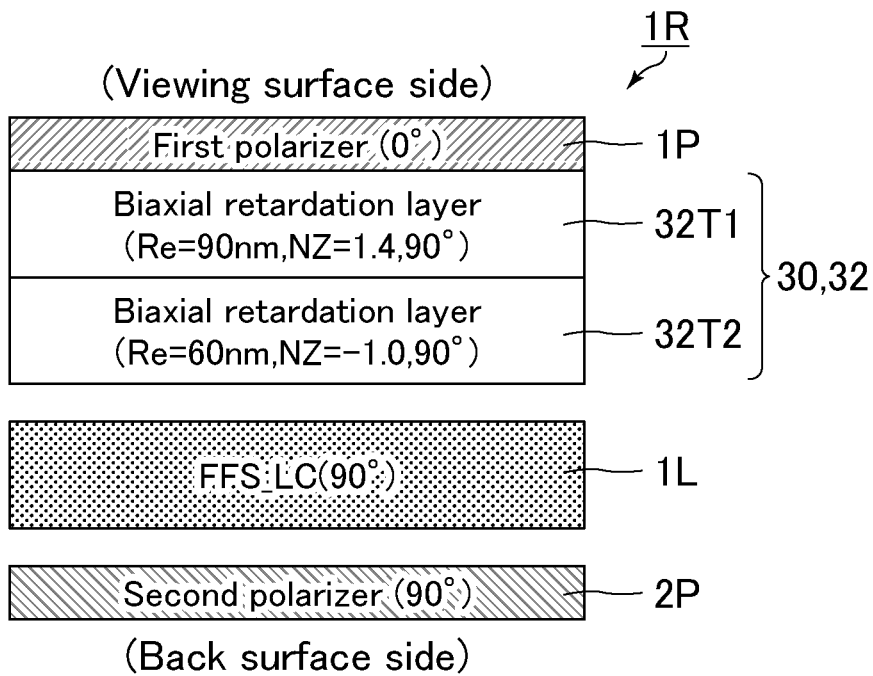
FIG. 47 is a schematic cross-sectional view of a liquid crystal display device of Comparative Example 5.
Figure 48:
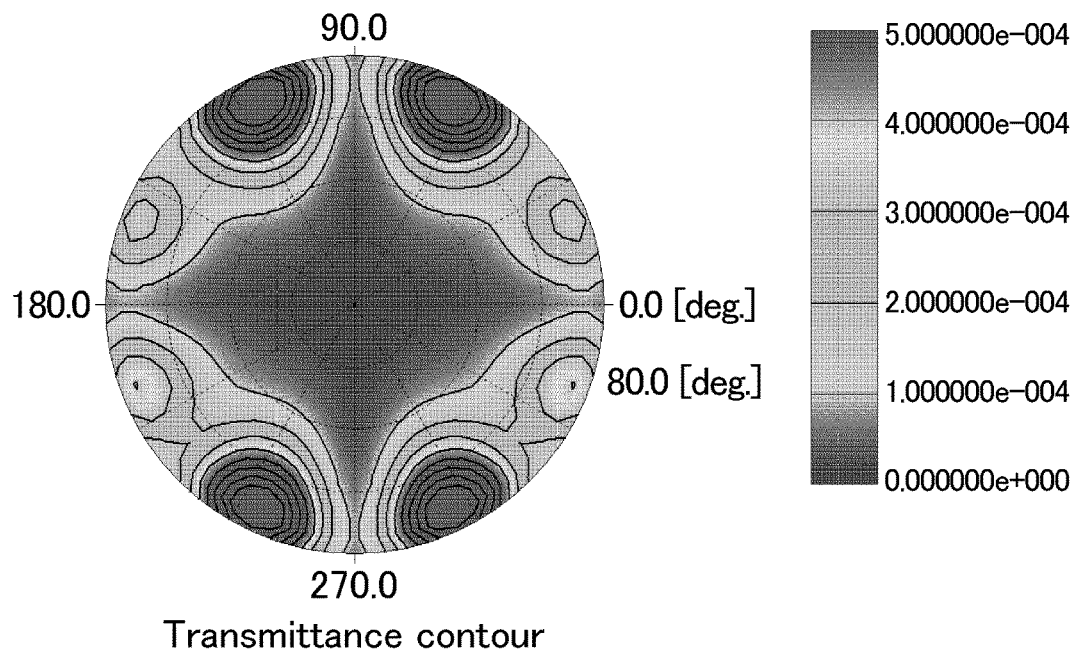
FIG. 48 is a simulation result of the transmittance viewing angle in the black display state of the liquid crystal display device of Comparative Example 5.

FIG. 47 is a schematic cross-sectional view of a liquid crystal display device of Comparative Example 5. A liquid crystal display device 1R of Comparative Example 5 has the same structure as the liquid crystal display device 1 of Example 6 except that the device does not include the out-cell retardation layer 21, the in-cell retardation layer 22, and the positive C plate 11C. The transmittance viewing angle in the black display state was simulated for the liquid crystal display device 1R of Comparative Example 5 in the same manner as in Example 1. FIG. 48 is a simulation result of the transmittance viewing angle in the black display state of the liquid crystal display device of Comparative Example 5.

Comparative Example 6

Figure 49:
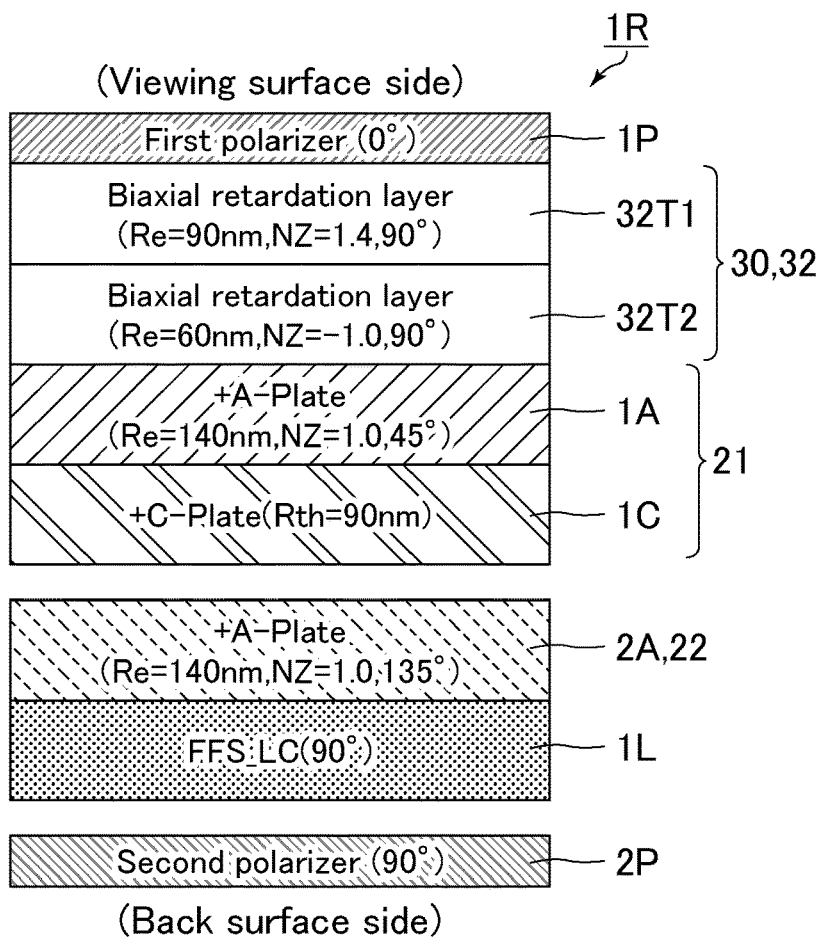
FIG. 49 is a schematic cross-sectional view of a liquid crystal display device of Comparative Example 6.
Figure 50:
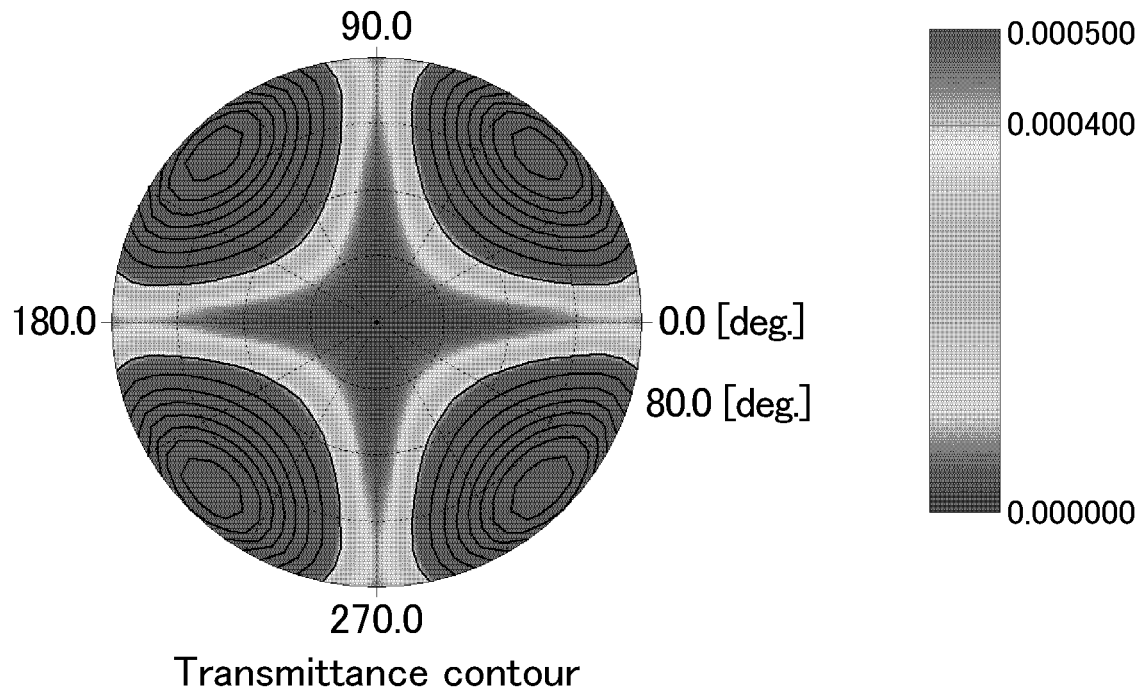
FIG. 50 is a simulation result of the transmittance viewing angle in the black display state of the liquid crystal display device of Comparative Example 6.

FIG. 49 is a schematic cross-sectional view of a liquid crystal display device of Comparative Example 6. A liquid crystal display device 1R of Comparative Example 6 has the same structure as the liquid crystal display device 1 of Example 6 except that the device does not include the positive C plate 11C. The transmittance viewing angle in the black display state was simulated for the liquid crystal display device 1R of Comparative Example 6 in the same manner as in Example 1. FIG. 50 is a simulation result of the transmittance viewing angle in the black display state of the liquid crystal display device of Comparative Example 6.
(Comparison Between Examples 6 and 7 and Comparative Examples 5 and 6)

As shown in FIG. 48, the liquid crystal display device 1R of Comparative Example 5 suppresses light leakage when viewed from oblique directions to achieve a good contrast ratio viewing angle. Unfortunately, the liquid crystal display device 1R does not include an out-cell retardation layer and an in-cell retardation layer and thus cannot suppress reflection of external light. In contrast, the liquid crystal display device 1R of Comparative Example 6 includes the out-cell retardation layer 21 and the in-cell retardation layer 22 to suppress reflection of external light. Unfortunately, as shown in FIG. 50, the device causes a large amount of light leakage when viewed from oblique directions (particularly around positions with a polar angle θ=60° and an azimuth angle φ=45°, 135°, 225°, or 315°) in the black display state to reduce the contrast ratio viewing angle.

The liquid crystal display devices 1 of Examples 6 and 7, each of which includes the out-cell retardation layer 21 and the in-cell retardation layer 22, can suppress reflection of external light and light leakage when viewed from oblique directions in the black display state as shown in FIG. 26 and FIG. 28. As described above, a typical horizontally aligned liquid crystal display device including an out-cell retardation layer and an in-cell retardation layer causes light leakage when viewed from oblique directions in the black display state to reduce the CR viewing angle in the black display state. Fortunately, the liquid crystal display devices 1 of Examples 6 and 7 achieved a good contrast ratio viewing angle like in the case of a horizontally aligned liquid crystal display device (liquid crystal display device of Comparative Example 5) without an out-cell retardation layer and an in-cell retardation layer. This is presumably an effect given by disposing the positive C plate 11C in addition to the viewing angle compensation layer 30. Example 6 employs the positive C plate 11C disposed separately from the viewing angle compensation layer 30. Example 7 employs the biaxial retardation layer 13C in which the biaxial retardation layer 32 included in the viewing angle compensation layer 30 of Example 6 and the positive C plate 11C are integrated. These examples show that light leakage when viewed from oblique directions in the black display state can be suppressed both in the case of disposing the positive C plate 11C separately from the viewing angle compensation layer 30 and in the case of disposing the positive C plate 11C integrated with a layer of the viewing angle compensation layer 30.

Although Examples 1 to 19 employ different kinds of viewing angle compensation layers 30 with different structures (first laminate 31, second laminate 32, third laminate 33, and λ/2 plate 301), all the viewing angle compensation layers 30 have the same function (the function of converting linearly polarized light having passed through the second polarizer 2P into linearly polarized light parallel to the absorption axis of the first polarizer 1P) and thus are optically equal to one another as a whole. Accordingly, a liquid crystal display device, in which the viewing angle compensation layer 30 in the liquid crystal display device 1 of Example 1 is replaced by the viewing angle compensation layer 30 used in Example 6 such that the biaxial retardation layer 32T1 and the biaxial retardation layer 32T2 are disposed in the given order from the second polarizer 2P side, can also suppress reflection of external light and light leakage when viewed from oblique directions in the black display state.

Example 8

Figure 29:
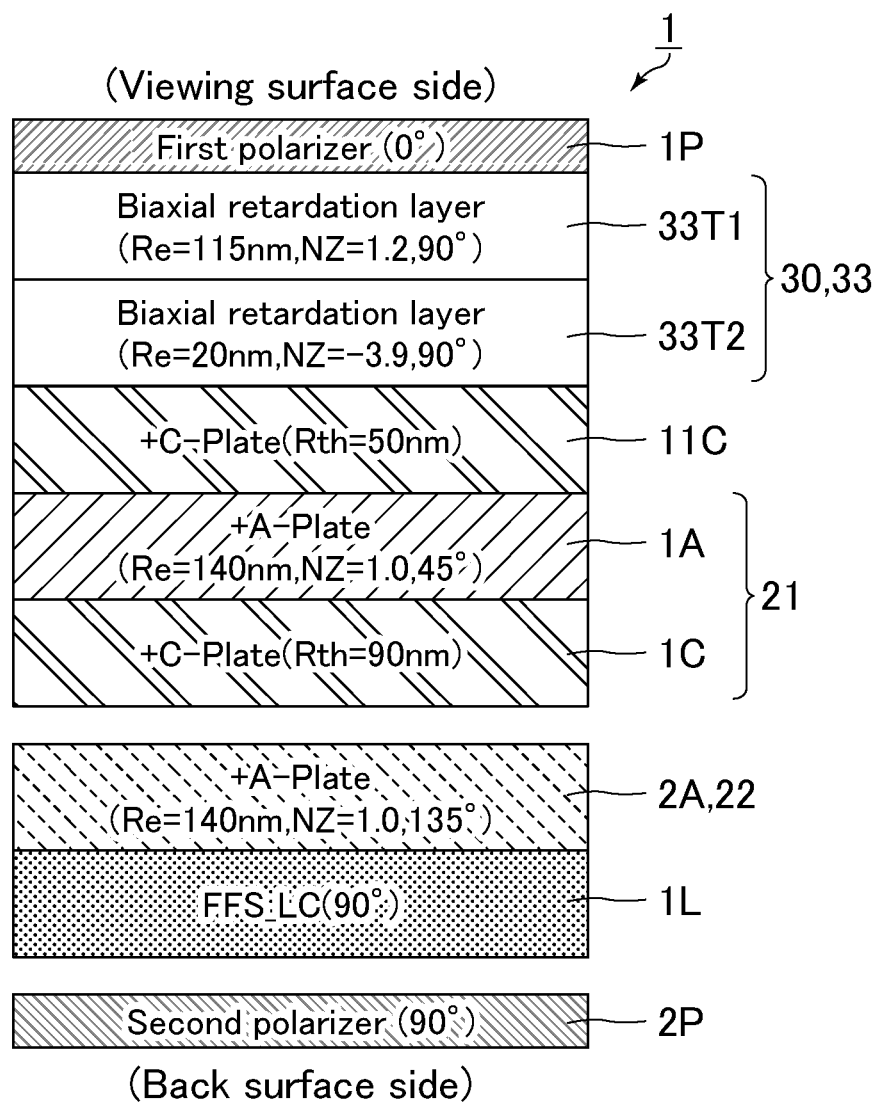
FIG. 29 is a schematic cross-sectional view of a liquid crystal display device of Example 8.
Figure 30:
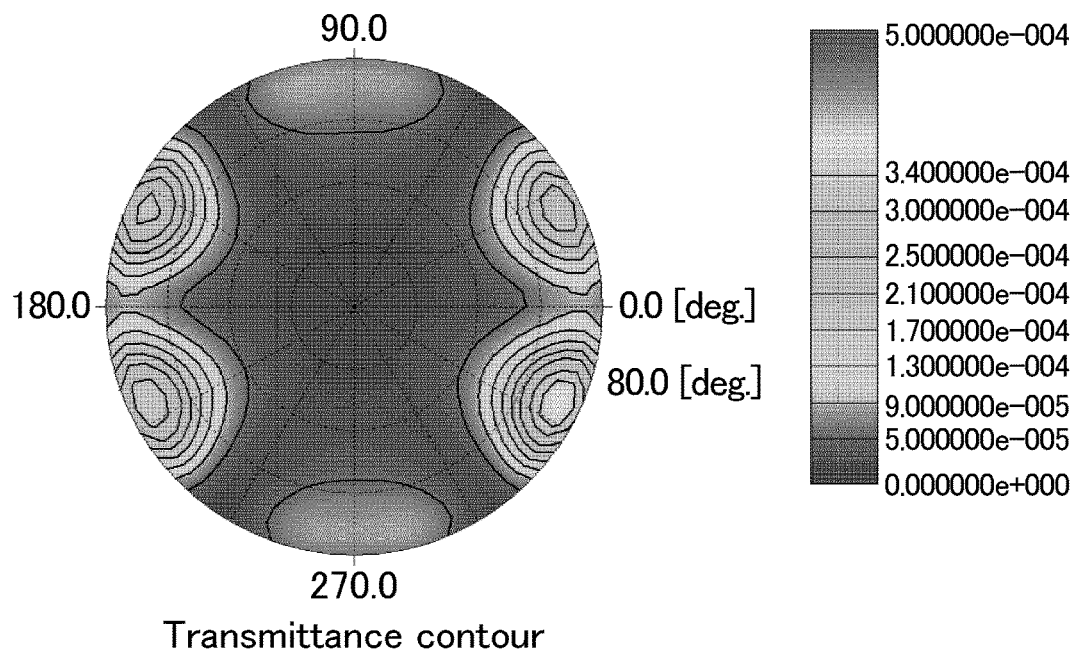
FIG. 30 is a simulation result of the transmittance viewing angle in the black display state of the liquid crystal display device of Example 8.

FIG. 29 is a schematic cross-sectional view of a liquid crystal display device of Example 8. In Example 8, the transmittance viewing angle in the black display state was simulated for a liquid crystal display device 1 having the same structure as in Embodiment 2-3 in the same manner as in Example 1. FIG. 30 is a simulation result of the transmittance viewing angle in the black display state of the liquid crystal display device of Example 8.

Example 9

Figure 31:
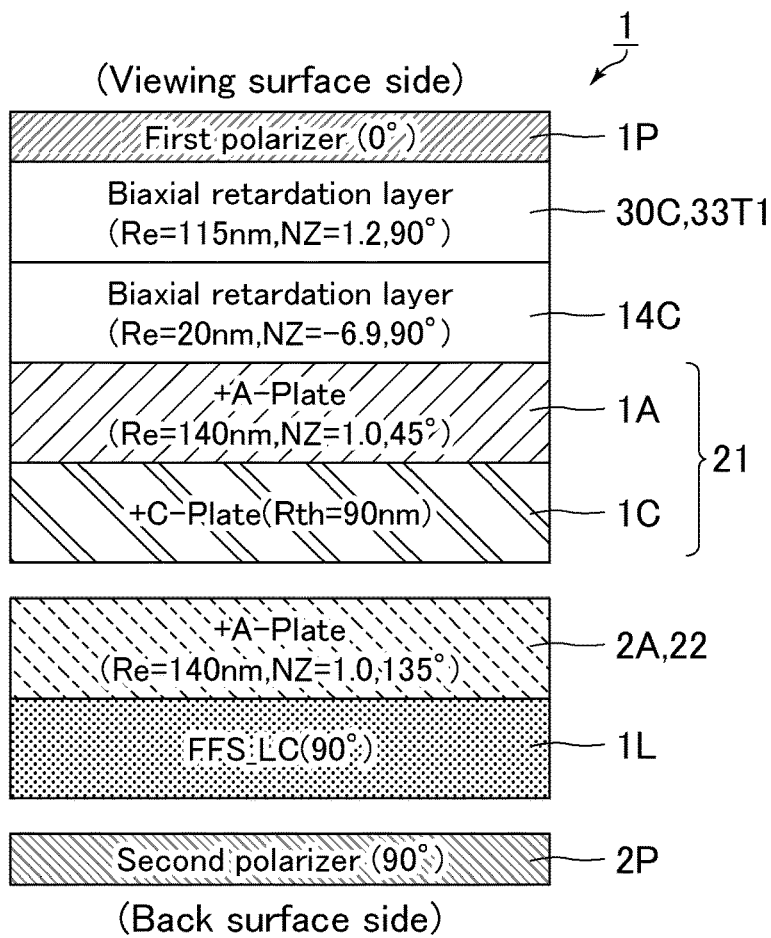
FIG. 31 is a schematic cross-sectional view of a liquid crystal display device of Example 9.
Figure 32:
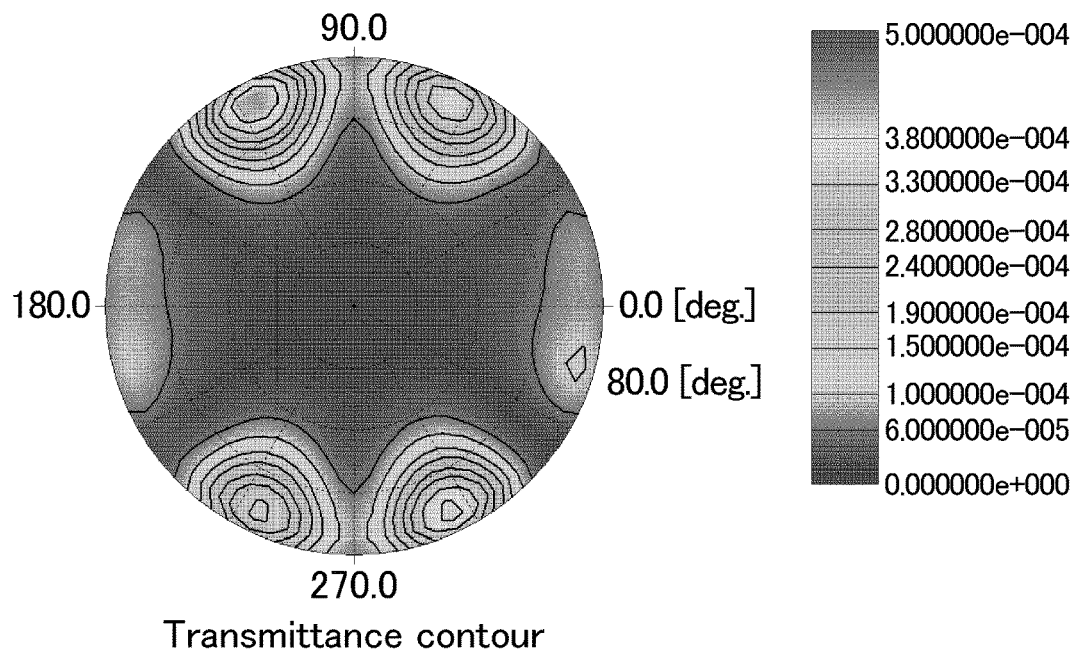
FIG. 32 is a simulation result of the transmittance viewing angle in the black display state of the liquid crystal display device of Example 9.

FIG. 31 is a schematic cross-sectional view of a liquid crystal display device of Example 9. In Example 9, the transmittance viewing angle in the black display state was simulated for a liquid crystal display device 1 having the same structure as in Embodiment 5 in the same manner as in Example 1. FIG. 32 is a simulation result of the transmittance viewing angle in the black display state of the liquid crystal display device of Example 9.

Comparative Example 7

Figure 51:
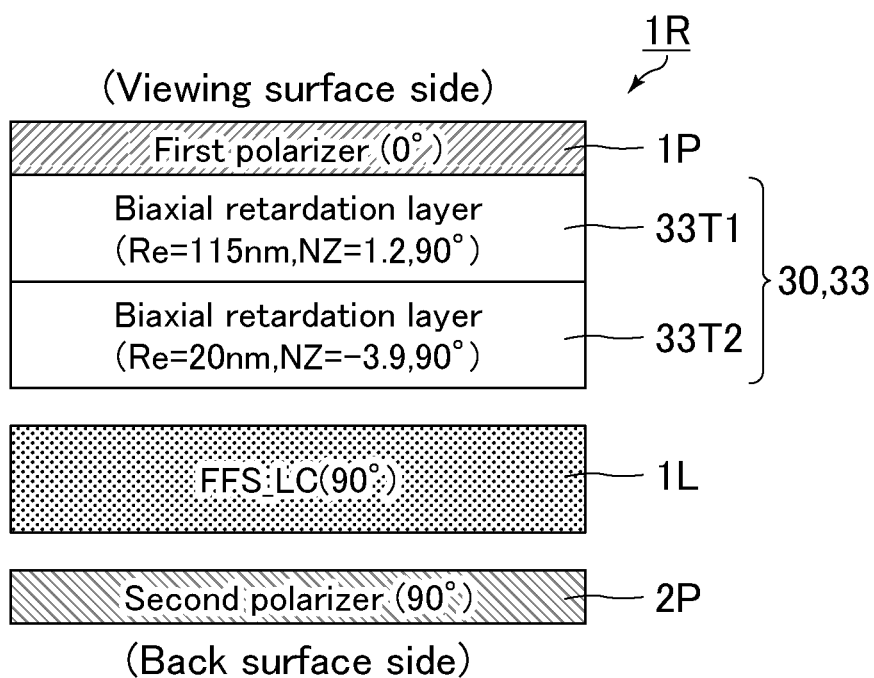
FIG. 51 is a schematic cross-sectional view of a liquid crystal display device of Comparative Example 7.
Figure 52:
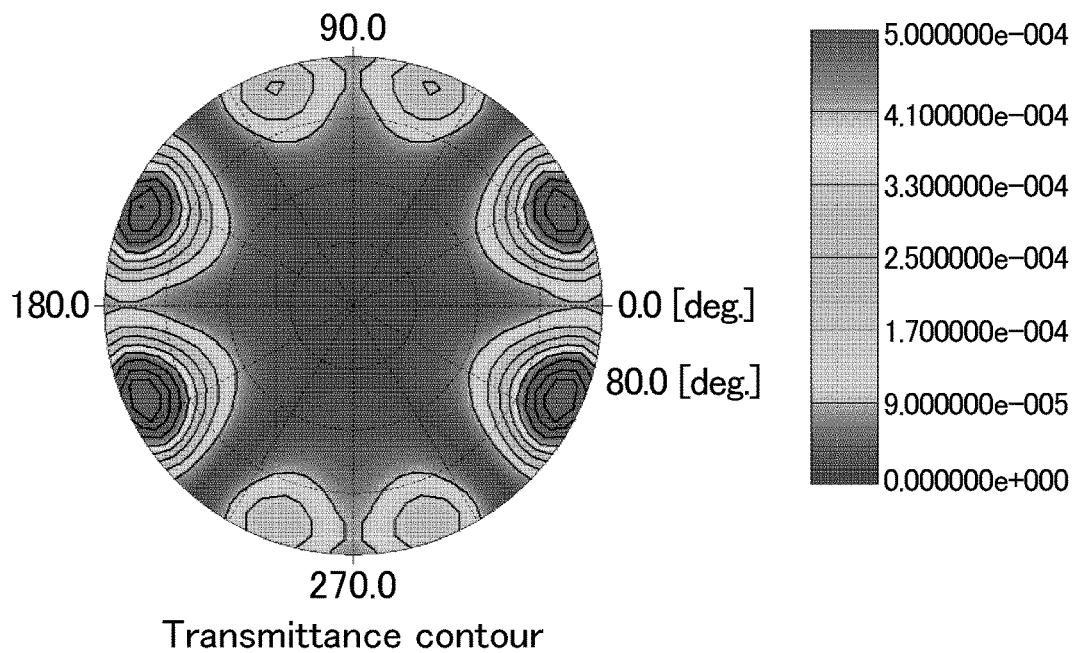
FIG. 52 is a simulation result of the transmittance viewing angle in the black display state of the liquid crystal display device of Comparative Example 7.

FIG. 51 is a schematic cross-sectional view of a liquid crystal display device of Comparative Example 7. A liquid crystal display device 1R of Comparative Example 7 has the same structure as the liquid crystal display device 1 of Example 8 except that the device does not include the out-cell retardation layer 21, the in-cell retardation layer 22, and the positive C plate 11C. The transmittance viewing angle in the black display state was simulated for the liquid crystal display device 1R of Comparative Example 7 in the same manner as in Example 1. FIG. 52 is a simulation result of the transmittance viewing angle in the black display state of the liquid crystal display device of Comparative Example 7.

Comparative Example 8

Figure 53:
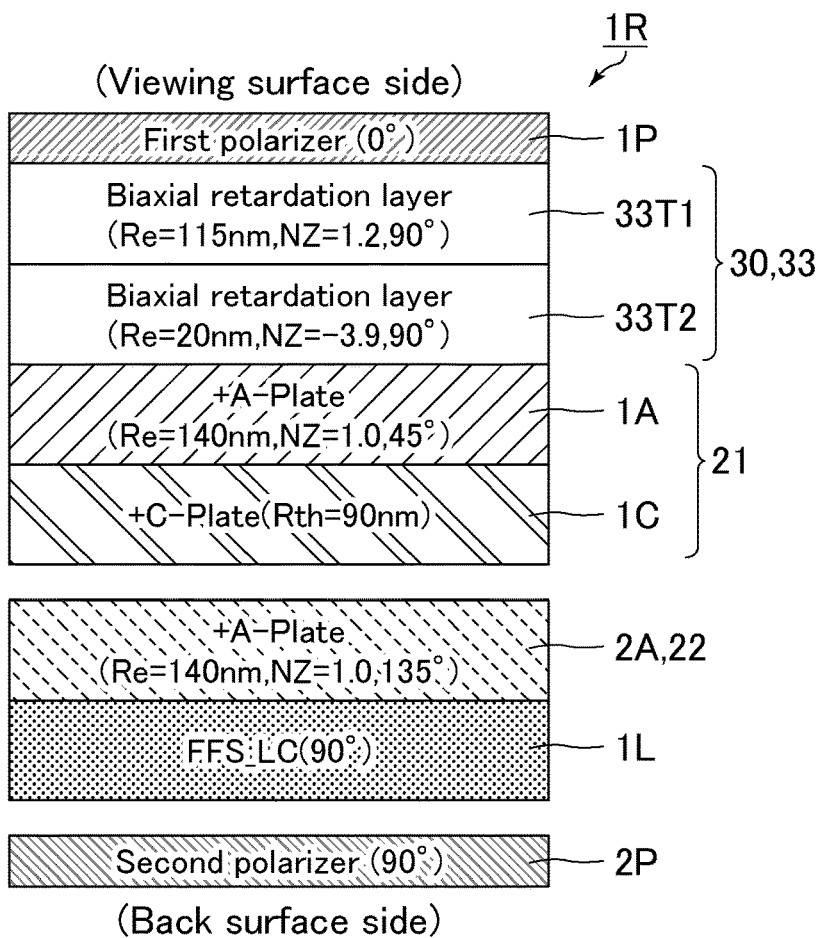
FIG. 53 is a schematic cross-sectional view of a liquid crystal display device of Comparative Example 8.
Figure 54:
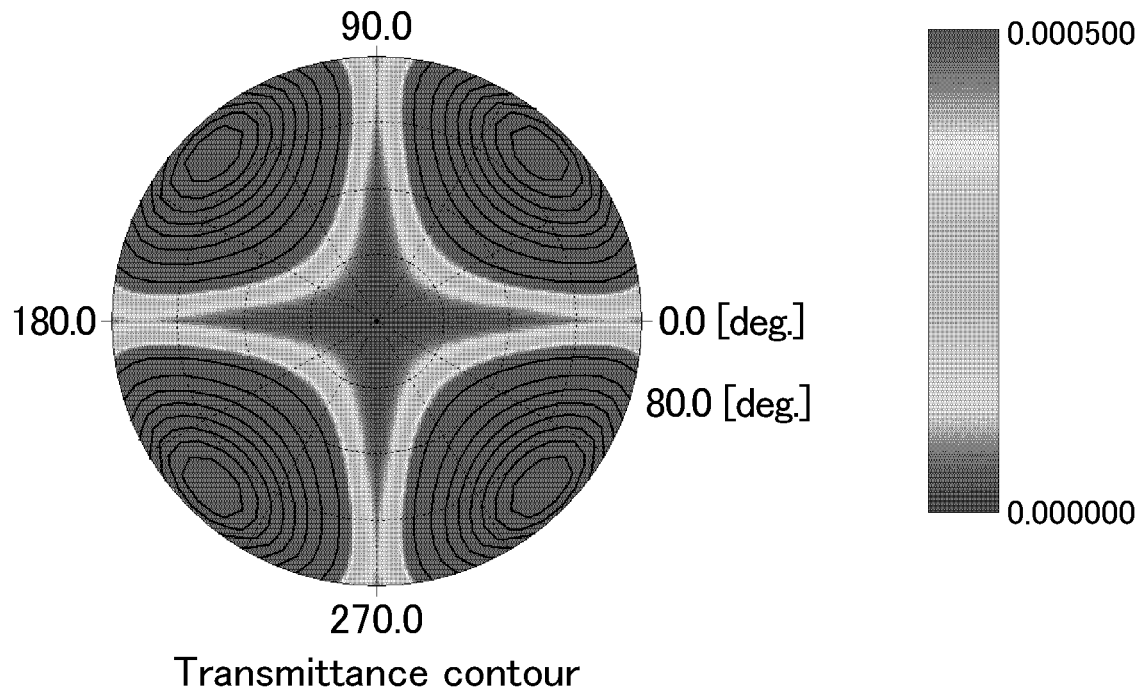
FIG. 54 is a simulation result of the transmittance viewing angle in the black display state of the liquid crystal display device of Comparative Example 8.

FIG. 53 is a schematic cross-sectional view of a liquid crystal display device of Comparative Example 8. A liquid crystal display device 1R of Comparative Example 8 has the same structure as the liquid crystal display device 1 of Example 8 except that the device does not include the positive C plate 11C. The transmittance viewing angle in the black display state was simulated for the liquid crystal display device 1R of Comparative Example 8 in the same manner as in Example 1. FIG. 54 is a simulation result of the transmittance viewing angle in the black display state of the liquid crystal display device of Comparative Example 8.

(Comparison Between Examples 8 and 9 and Comparative Examples 7 and 8)

As shown in FIG. 52, the liquid crystal display device 1R of Comparative Example 7 suppresses light leakage when viewed from oblique directions to achieve a good contrast ratio viewing angle. Unfortunately, the liquid crystal display device 1R does not include an out-cell retardation layer and an in-cell retardation layer and thus cannot suppress reflection of external light. In contrast, the liquid crystal display device 1R of Comparative Example 8 includes the out-cell retardation layer 21 and the in-cell retardation layer 22 to suppress reflection of external light. Unfortunately, as shown in FIG. 54, the device causes a large amount of light leakage when viewed from oblique directions (particularly around positions with a polar angle θ=60° and an azimuth angle ϕ=45°, 135°, 225°, or 315°) in the black display state to reduce the contrast ratio viewing angle.

The liquid crystal display devices 1 of Examples 8 and 9, each of which includes the out-cell retardation layer 21 and the in-cell retardation layer 22, can suppress reflection of external light and light leakage when viewed from oblique directions in the black display state as shown in FIG. 30 and FIG. 32. As described above, a typical horizontally aligned liquid crystal display device including an out-cell retardation layer and an in-cell retardation layer causes light leakage when viewed from oblique directions in the black display state to reduce the CR viewing angle in the black display state. Fortunately, the liquid crystal display devices 1 of Examples 8 and 9 achieved a good contrast ratio viewing angle like in the case of a horizontally aligned liquid crystal display device (liquid crystal display device of Comparative Example 7) without an out-cell retardation layer and an in-cell retardation layer. This is presumably an effect given by disposing the positive C plate 11C in addition to the viewing angle compensation layer 30. Example 8 employs the positive C plate 11C disposed separately from the viewing angle compensation layer 30. Example 9 employs the biaxial retardation layer 14C in which the biaxial retardation layer 33T2 included in the viewing angle compensation layer 30 of Example 8 and the positive C plate 11C are integrated. These examples show that light leakage when viewed from oblique directions in the black display state can be suppressed both in the case of disposing the positive C plate 11C separately from the viewing angle compensation layer 30 and in the case of disposing the positive C plate 11C integrated with a layer of the viewing angle compensation layer 30.

Although Examples 1 to 19 employ different kinds of viewing angle compensation layers 30 with different structures (first laminate 31, second laminate 32, third laminate 33, and λ/2 plate 301), all of the viewing angle compensation layers 30 are optically equal to one another as a whole, as described above. Accordingly, a liquid crystal display device, in which the viewing angle compensation layer 30 in the liquid crystal display device 1 of Example 1 is replaced by the viewing angle compensation layer 30 used in Example 8 such that the biaxial retardation layer 33T1 and the biaxial retardation layer 33T2 are disposed in the given order from the second polarizer 2P side, can also suppress reflection of external light and light leakage when viewed from oblique directions in the black display state.

Example 10

Figure 33:
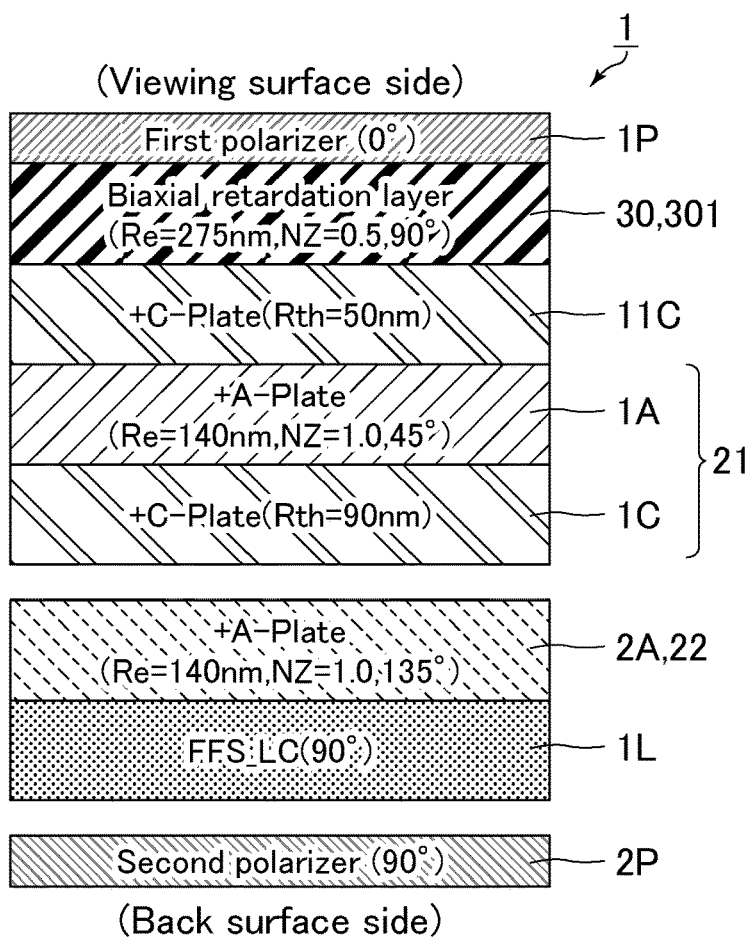
FIG. 33 is a schematic cross-sectional view of a liquid crystal display device of Example 10.
Figure 34:
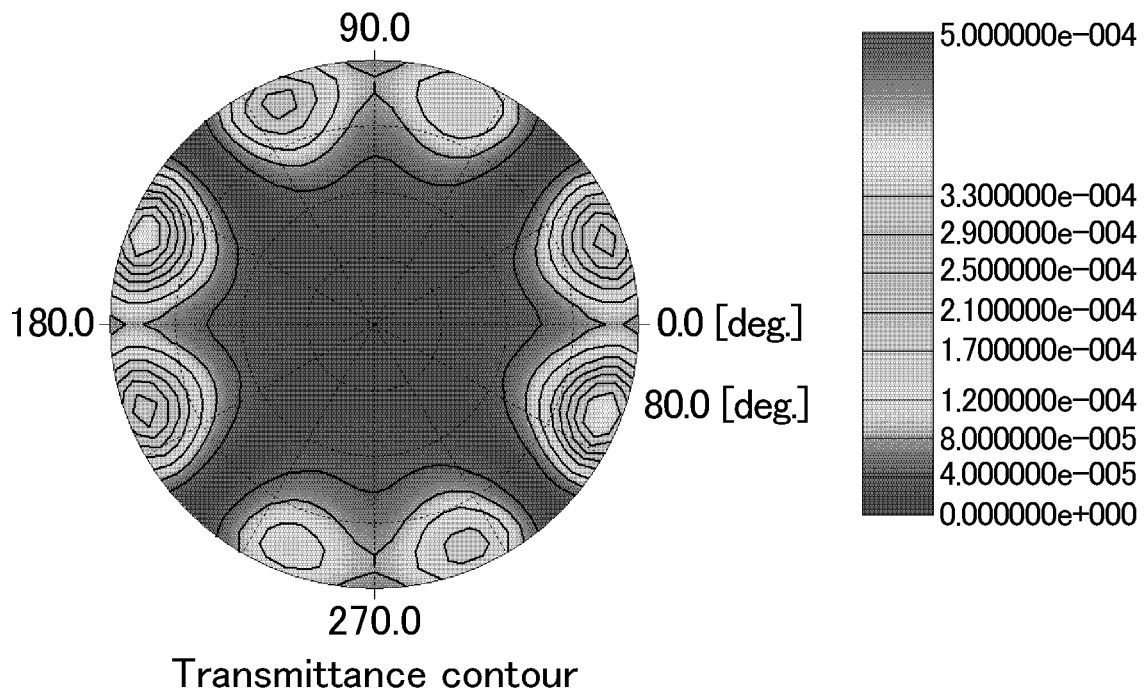
FIG. 34 is a simulation result of the transmittance viewing angle in the black display state of the liquid crystal display device of Example 10.
Figure 35:
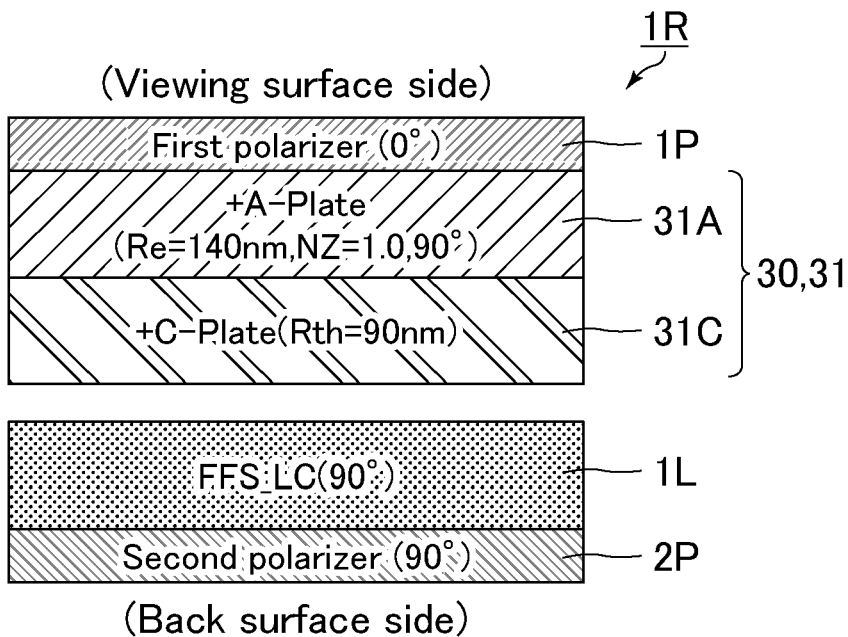
FIG. 35 is a schematic cross-sectional view of a liquid crystal display device of Comparative Embodiment 1.
Figure 36:
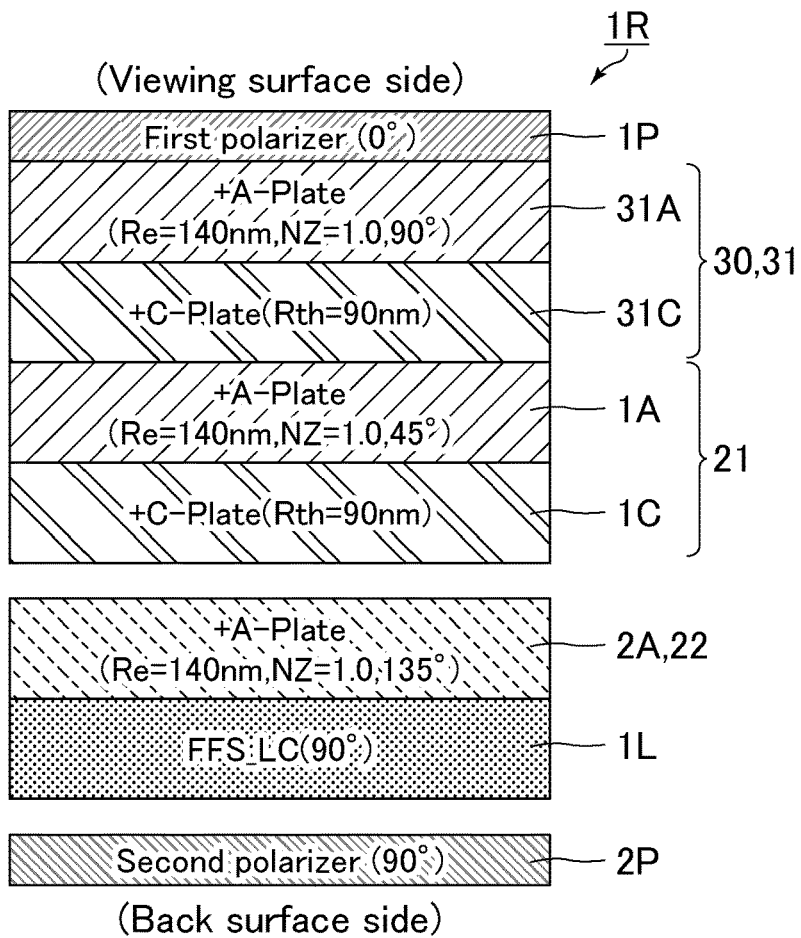
FIG. 36 is a schematic cross-sectional view of a liquid crystal display device of Comparative Embodiment 2.
Figure 37:
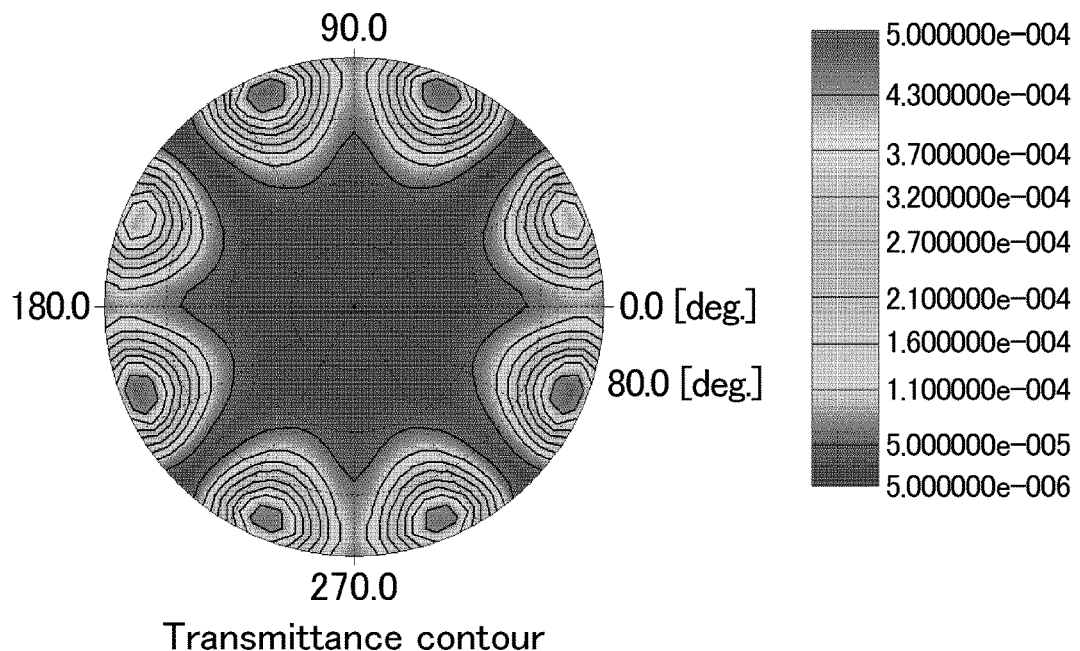
FIG. 37 is a simulation result of the transmittance viewing angle in the black display state of the liquid crystal display device of Comparative Embodiment 1.
Figure 38:
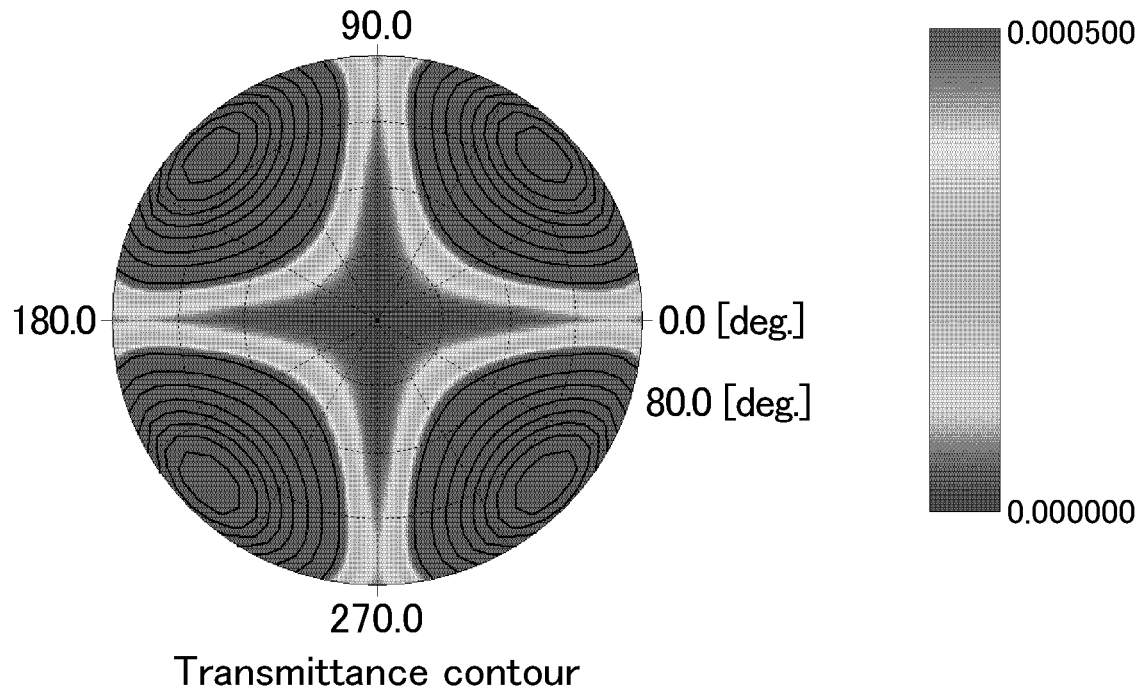
FIG. 38 is a simulation result of the transmittance viewing angle in the black display state of the liquid crystal display device of Comparative Embodiment 2.

FIG. 33 is a schematic cross-sectional view of a liquid crystal display device of Example 10. In Example 10, the transmittance viewing angle in the black display state was simulated for a liquid crystal display device 1 having the same structure as in Embodiment 2-4 in the same manner as in Example 1. FIG. 34 is a simulation result of the transmittance viewing angle in the black display state of the liquid crystal display device of Example 10.

Comparative Example 9

Figure 55:
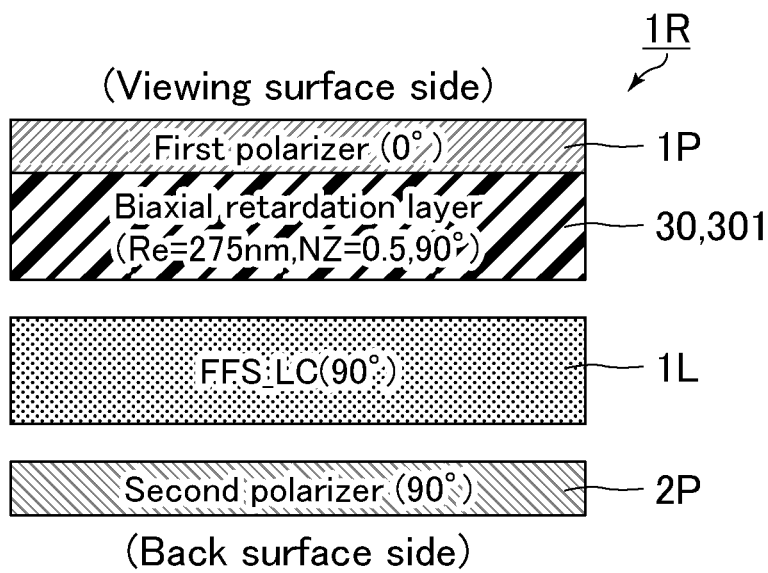
FIG. 55 is a schematic cross-sectional view of a liquid crystal display device of Comparative Example 9.
Figure 56:
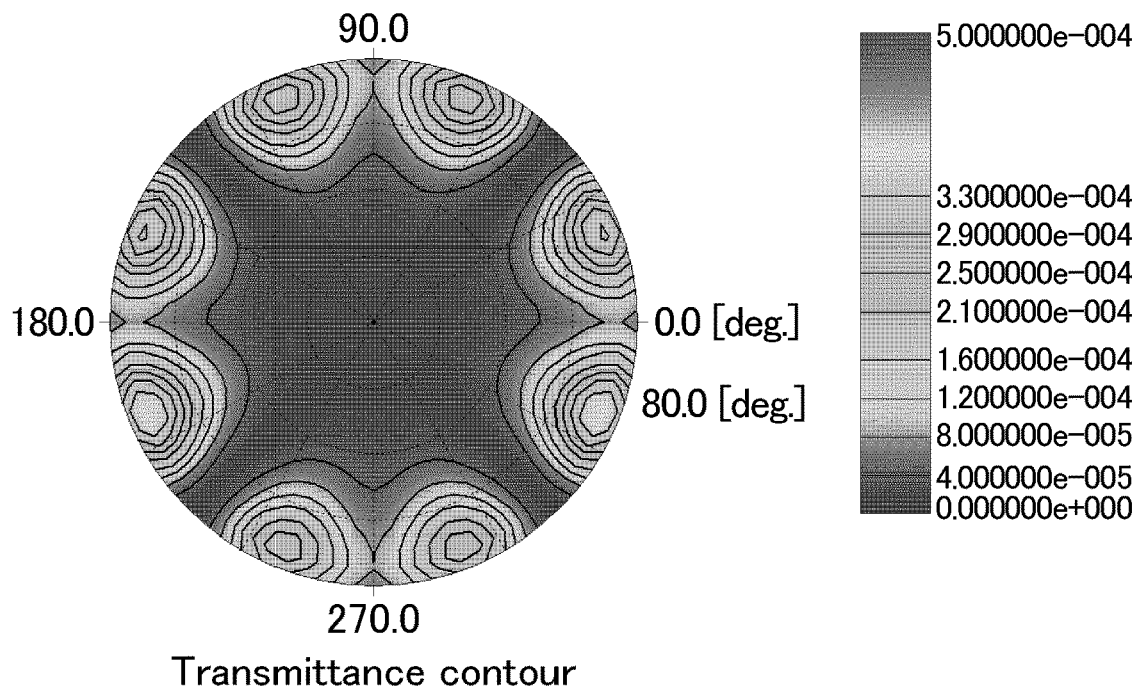
FIG. 56 is a simulation result of the transmittance viewing angle in the black display state of the liquid crystal display device of Comparative Example 9.

FIG. 55 is a schematic cross-sectional view of a liquid crystal display device of Comparative Example 9. A liquid crystal display device 1R of Comparative Example 9 has the same structure as the liquid crystal display device 1 of Example 10 except that the device does not include the out-cell retardation layer 21, the in-cell retardation layer 22, and the positive C plate 11C. The transmittance viewing angle in the black display state was simulated for the liquid crystal display device 1R of Comparative Example 9 in the same manner as in Example 1. FIG. 56 is a simulation result of the transmittance viewing angle in the black display state of the liquid crystal display device of Comparative Example 9.

Comparative Example 10

Figure 57:
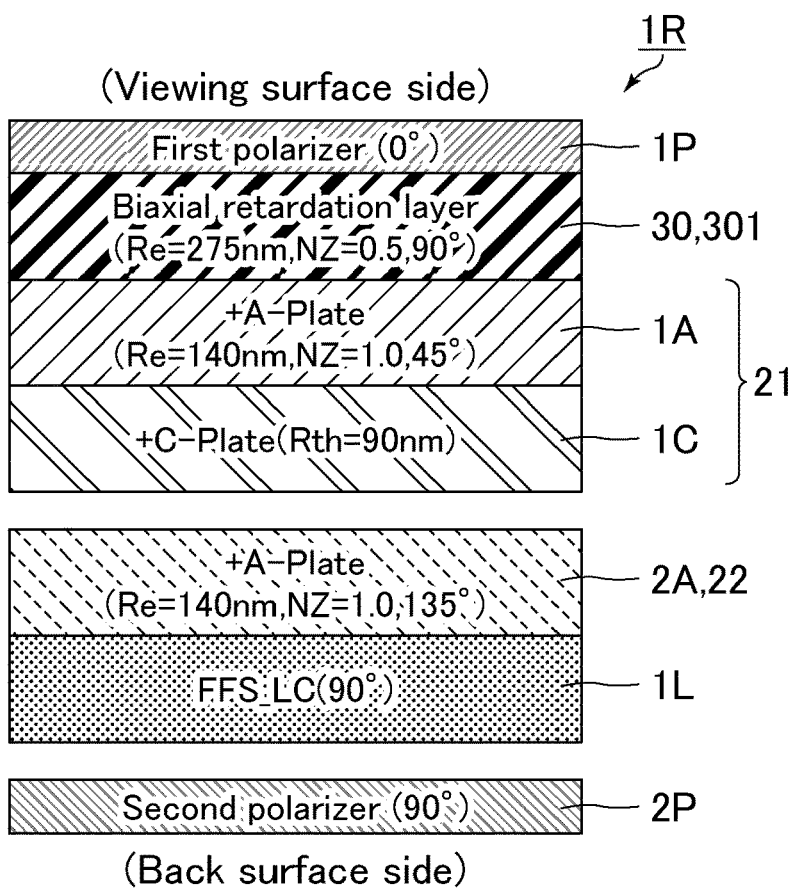
FIG. 57 is a schematic cross-sectional view of a liquid crystal display device of Comparative Example 10.
Figure 58:
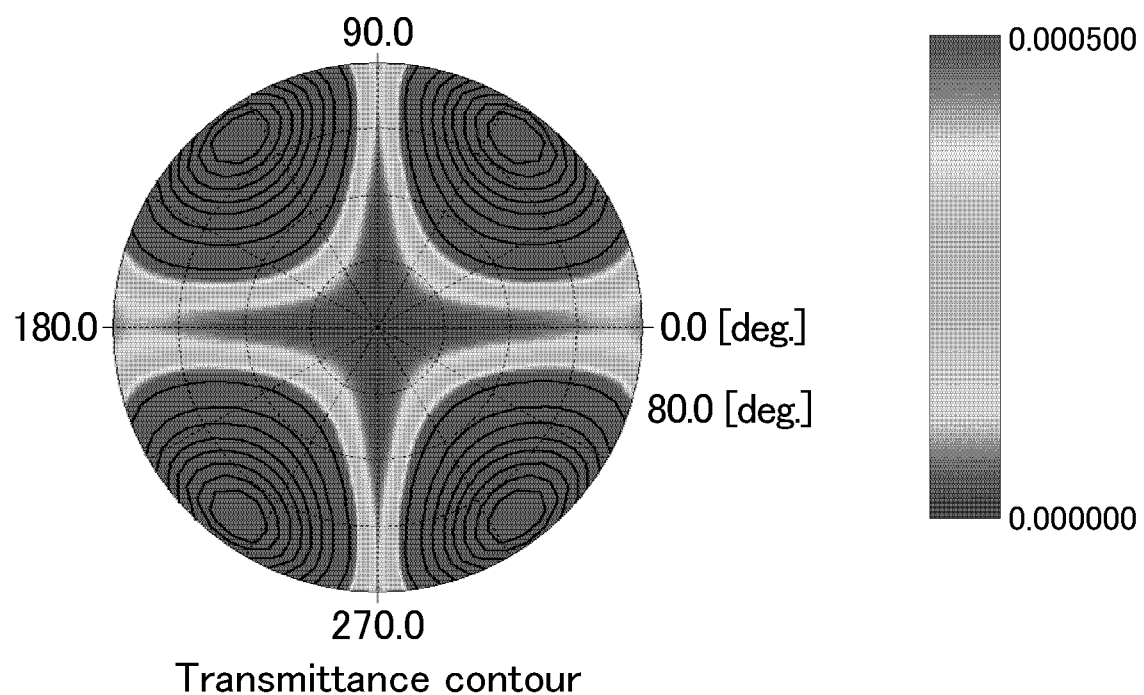
FIG. 58 is a simulation result of the transmittance viewing angle in the black display state of the liquid crystal display device of Comparative Example 10.

FIG. 57 is a schematic cross-sectional view of a liquid crystal display device of Comparative Example 10. A liquid crystal display device 1R of Comparative Example 10 has the same structure as the liquid crystal display device 1 of Example 10 except that the device does not include the positive C plate 11C. The transmittance viewing angle in the black display state was simulated for the liquid crystal display device 1R of Comparative Example 10 in the same manner as in Example 1. FIG. 58 is a simulation result of the transmittance viewing angle in the black display state of the liquid crystal display device of Comparative Example 10. (Comparison Between Example 10 and Comparative Examples 9 and 10)

As shown in FIG. 56, the liquid crystal display device 1R of Comparative Example 9 suppresses light leakage when viewed from oblique directions to achieve a good contrast ratio viewing angle. Unfortunately, the liquid crystal display device 1R does not include an out-cell retardation layer and an in-cell retardation layer and thus cannot suppress reflection of external light. In contrast, the liquid crystal display device 1R of Comparative Example 10 includes the out-cell retardation layer 21 and the in-cell retardation layer 22 to suppress reflection of external light. Unfortunately, as shown in FIG. 58, the device causes a large amount of light leakage when viewed from oblique directions (particularly around positions with a polar angle θ=60° and an azimuth angle φ=45°, 135°, 225°, or 315°) in the black display state to reduce the contrast ratio viewing angle.

The liquid crystal display device 1 of Example 10, which includes the out-cell retardation layer 21 and the in-cell retardation layer 22, can suppress reflection of external light and light leakage when viewed from oblique directions in the black display state as shown in FIG. 34. As described above, a typical horizontally aligned liquid crystal display device including an out-cell retardation layer and an in-cell retardation layer causes light leakage when viewed from oblique directions in the black display state to reduce the CR viewing angle in the black display state. Fortunately, the liquid crystal display device 1 of Example 10 achieved a good contrast ratio viewing angle like in the case of a horizontally aligned liquid crystal display device (liquid crystal display device of Comparative Example 9) without an out-cell retardation layer and an in-cell retardation layer. This is presumably an effect given by disposing the positive C plate 11C in addition to the viewing angle compensation layer 30.

Although Examples 1 to 19 employ different kinds of viewing angle compensation layers 30 with different structures (first laminate 31, second laminate 32, third laminate 33, and λ/2 plate 301), all of the viewing angle compensation layers 30 are optically equal to one another as a whole, as described above. Accordingly, a liquid crystal display device, in which the viewing angle compensation layer 30 in the liquid crystal display device 1 of Example 1 is replaced by the viewing angle compensation layer 30 used in Example 10, which is the λ/2 plate 301, can also suppress reflection of external light and light leakage when viewed from oblique directions in the black display state.

Examples 11 to 14 and Comparative Examples 11 and 12

In each of Examples 11 to 14 and Comparative Examples 11 and 12, the thickness retardation of the positive C plate 11C employed in Example 1 was changed to the value shown in Table 1. Then, the average transmittance value at the polar angle θ=60° was calculated. The average transmittance value is the average of transmittance values in the black display state determined for every 5° in the range of the azimuth angle of 0° to 360°. The transmittance value at each azimuth angle was determined by simulation using a LCD-Master available from Shintec Co., Ltd. The average transmittance value was also determined for Examples 1 and 2 and Comparative Example 2 in the same manner as in Examples 11 to 14 and Comparative Examples 11 and 12. Table 1 shows the results.

TABLE 1

| | Comparative Example 2 | Comparative Example 11 | Example 11 | Example 12 | Example 13 | Example 1 | Example 2 | Example 14 | Comparative Example 12 |
|---|---|---|---|---|---|---|---|---|---|
| Thickness retardation (Rth) of positive C plate between first polarizer and first positive A plate | — | 20 | 30 | 40 | 50 | 60 | 70 | 80 | 90 |
| Average transmittance value | 0.0031 | 0.0014 | 0.0008 | 0.0004 | 0.0002 | 0.0001 | 0.0003 | 0.0006 | 0.0011 |

(Evaluation of Examples 1, 2, and 11 to 14, and Comparative Examples 2, 11, and 12)

Table 1 shows that the average transmittance value in the black display state can be reduced to 0.0010 or lower by setting the thickness retardation of the positive C plate 11C disposed between the first polarizer 1P and the first positive A plate 1A to 30 nm or greater and 80 nm or smaller.

Examples 15 to 19 and Comparative Examples 13 and 14

In each of Examples 15 to 19 and Comparative Examples 13 and 14, the thickness retardation of the positive C plate 11C employed in Example 3 was changed to the value shown in Table 2. Then, the average transmittance value at the polar angle θ=60° was calculated in the same manner as in Examples 11 to 14 and Comparative Examples 11 and 12. The average transmittance value was also determined for Example 3 and Comparative Example 4 in the same manner as in Examples 11 to 14 and Comparative Examples 11 and 12. Table 2 shows the results.

TABLE 2

| | Comparative Example 4 | Comparative Example 13 | Example 15 | Example 16 | Example 3 | Example 17 | Example 18 | Example 19 | Comparative Example 14 |
|---|---|---|---|---|---|---|---|---|---|
| Thickness retardation (Rth) of positive C plate between viewing angle compensation layer and first positive A plate | — | 20 | 30 | 40 | 50 | 60 | 70 | 80 | 90 |
| Average transmittance value | 0.0022 | 0.0008 | 0.0004 | 0.0001 | 0.0001 | 0.0002 | 0.0005 | 0.0010 | 0.0017 |

(Evaluation of Examples 3 and 15 to 19 and Comparative Examples 4, 13, and 14)

Table 2 shows that the average transmittance value in the black display state can be reduced to 0.0010 or lower by setting the thickness retardation of the positive C plate 11C disposed between the viewing angle compensation layer 30 and the first positive A plate 1A to 30 nm or greater and 80 nm or smaller.

As shown in Examples 1 to 3 and 11 to 19 in Table 1 and Table 2, the average transmittance value can be reduced to a half or lower of that in Comparative Example 4 by setting the thickness retardation of the positive C plate 11C disposed between the first polarizer 1P and the first positive A plate 1A or between the viewing angle compensation layer 30 and the first positive A plate 1A to 30 nm or greater and 80 nm or smaller. A positive C plate 11C having a thickness retardation of smaller than 30 nm or greater than 80 nm increases the average transmittance value and reduces the viewing angle, thereby reducing the merit of disposing the positive C plate 11C between the first polarizer 1P and the first positive A plate 1A or between the viewing angle compensation layer 30 and the first positive A plate 1A.

What is claimed is:

1. A liquid crystal display device comprising in the following order from a viewing surface side:
    a first polarizer;
    a viewing angle compensation layer;
    a first positive A plate having an in-plane retardation of 120 nm or greater and 155 nm or smaller;
    a positive C plate having a thickness retardation of 80 nm or greater and 100 nm or smaller;
    a first substrate;
    a second positive A plate having an in-plane retardation of 120 nm or greater and 155 nm or smaller;
    a horizontally aligned liquid crystal layer;
    a second substrate; and
    a second polarizer,
    the liquid crystal display device further comprising between the viewing angle compensation layer and the first positive A plate a positive C plate having a thickness retardation of 30 nm or greater and 80 nm or smaller.

2. The liquid crystal display device according to claim 1, wherein the viewing angle compensation layer is a laminate including in the following order from a first polarizer side a positive A plate having an in-plane retardation of 130 nm or greater and 150 nm or smaller and a positive C plate having a thickness retardation of 80 nm or greater and 100 nm or smaller.

3. The liquid crystal display device according to claim 1, wherein the viewing angle compensation layer is a laminate including in the following order from a first polarizer side a biaxial retardation layer having an in-plane retardation of 80 nm or greater and 100 nm or smaller and an NZ coefficient of 1.3 or greater and 1.5 or smaller and a biaxial retardation layer having an in-plane retardation of 50 nm or greater and 70 nm or smaller and an NZ coefficient of −1.2 or greater and −0.8 or smaller.

4. The liquid crystal display device according to claim 1, wherein the viewing angle compensation layer is a laminate including in the following order from a first polarizer side a biaxial retardation layer having an in-plane retardation of 100 nm or greater and 130 nm or smaller and an NZ coefficient of 1.1 or greater and 1.3 or smaller and a biaxial retardation layer having an in-plane retardation of 10 nm or greater and 30 nm or smaller and an NZ coefficient of −4.5 or greater and −3.5 or smaller.

5. The liquid crystal display device according to claim 1, wherein the viewing angle compensation layer is a λ/2 plate having an in-plane retardation of 230 nm or greater and 320 nm or smaller and an NZ coefficient of 0.4 or greater and 0.6 or smaller.

6. A liquid crystal display device comprising in the following order from a viewing surface side:
   a first polarizer;
   a viewing angle compensation layer;
   a first positive A plate having an in-plane retardation of 120 nm or greater and 155 nm or smaller;
   a positive C plate having a thickness retardation of 80 nm or greater and 100 nm or smaller;
   a first substrate;
   a second positive A plate having an in-plane retardation of 120 nm or greater and 155 nm or smaller;
   a horizontally aligned liquid crystal layer;
   a second substrate; and
   a second polarizer,
   the viewing angle compensation layer being a biaxial retardation layer having an in-plane retardation of 100 nm or greater and 130 nm or smaller and an NZ coefficient of 1.1 or greater and 1.3 or smaller,
   the liquid crystal display device further comprising between the viewing angle compensation layer and the first positive A plate a biaxial retardation layer having an in-plane retardation of 10 nm or greater and 30 nm or smaller and an NZ coefficient of −7.5 or greater and −6.5 or smaller.

* * * * *